United States Patent [19]

Matsunaga et al.

[11] Patent Number: 5,223,389
[45] Date of Patent: Jun. 29, 1993

[54] SILVER HALIDE EMULSION

[75] Inventors: Atsushi Matsunaga; Takanori Hioki, both of Kanagawa, Japan

[73] Assignee: Fuji Photo Film Co., Ltd., Kanagawa, Japan

[21] Appl. No.: 748,600

[22] Filed: Aug. 22, 1991

[30] Foreign Application Priority Data

Aug. 23, 1990 [JP] Japan .................................. 2-221780
Aug. 23, 1990 [JP] Japan .................................. 2-221783

[51] Int. Cl.$^5$ .......................... G03C 1/12; G03C 1/28
[52] U.S. Cl. ..................................... 430/576; 430/581; 430/583; 430/584; 430/585; 430/592
[58] Field of Search ............... 430/576, 581, 583, 584, 430/585, 592

[56] References Cited

U.S. PATENT DOCUMENTS 4,987,064 1/1991 Saitou et al. ........................ 430/583
5,032,500 7/1991 Ikeda et al. ........................ 430/583

FOREIGN PATENT DOCUMENTS 0325235 7/1989 European Pat. Off. .
0372573 6/1990 European Pat. Off. .
0423765A1 4/1991 European Pat. Off. .

Primary Examiner—Janet C. Baxter
Attorney, Agent, or Firm—Sughrue, Mion, Zinn, Macpeak & Seas

[57] ABSTRACT

Disclosed is a silver halide emulsion, which comprises at least one methine dye represented by the general formula (I):

$$[(MET)_{\overline{l_1}}(Q)_{l_2}-Ar]_{l_3} \quad (I)$$

wherein MET represents an atomic group having a methine dye structure; Q represents a divalent linking group containing at least one carbon, nitrogen, sulfur or oxygen atom; $l_1$ represents an integer 1 or 2; $l_2$ represents an integer 0 or 1, $l_3$ represents an integer from 1 to 4; and Ar represents an aromatic polycyclic group formed of 8 or more atoms containing at least one nitrogen atom, with the proviso that said nitrogen atom is in a form such that tautomerism does not produce

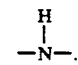

A silver halide photographic material is also disclosed which comprises on a support a silver halide photographic emulsion layer comprising silver halide grains containing iron ions and having a localized phase with a high iron ion concentration and at least one methine dye represented by general formula (I') and which exhibits a blue sensitivity difference of 0.1 or less between when it is developed after exposure in vacuo under $10^{-5}$ torr and when it is developed after exposure in air under 760 torr:

$$[(MET)_{\overline{l_1}}(Q)_{l_2}-Ar']_{l_3} \quad (I')$$

wherein MET, Q, $l_1$, $l_2$, and $l_3$ are as defined for formula I and Ar' represents an aromatic polycyclic group formed of 8 or more atoms.

7 Claims, No Drawings

SILVER HALIDE EMULSION

FIELD OF THE INVENTION

The present invention relates to a silver halide emulsion. More particularly, the present invention relates to a silver halide emulsion which exhibits an improvement in the reduction in the fluctuation of sensitivity during ordinary storage.

The present invention also relates to a silver halide photographic material. More particularly, the present invention relates to a silver halide photographic material which exhibits little sensitivity change during storage before use, rapid processability and a high spectral sensitizability.

BACKGROUND OF THE INVENTION

A technique has been heretofore known which comprises incorporating a sensitizing dye into a silver halide emulsion during the preparation of a silver halide light-sensitive material so that the light-sensitive wavelength range of the silver halide emulsion is widened to effect optical sensitization.

As the spectral sensitizing dyes to be used for this purpose there have heretofore been known many compounds. Examples of such spectral sensitizing dyes include cyanine dyes, melocyanine dyes and xanthene dyes as described in T. H. James, *The Theory of the Photographic Process*, 3rd ed., 1966, Macmillan, N.Y., pp. 198–228.

When used in place of an ordinary silver halide emulsion, these silver halide emulsions must not only widen the light-sensitive range of the silver halide emulsion but also meet the following requirements:

(1) a proper spectral sensitizing range must be given;
(2) a high sensitizing efficiency must be given to obtain a sufficiently high sensitivity;
(3) no fogging occurs;
(4) a small dispersion of sensitivity due to temperature fluctuation upon exposure;
(5) no advese interactions with other kinds of additives, e.g., stabilizer, fog inhibitor, coating aid, color developer;
(6) no sensitivity fluctuation upon storage of a silver halide emulsion containing a sensitizing dye, especially at an elevated temperature and a high humidity; and
(7) no sensitizing dyes are diffused into the other light-sensitive layers to inhibit color stain after development.

These requirements are important particularly when a silver halide emulsion for silver halide color photographic material is prepared.

However, despite many attempts, it is not easy to inhibit the sensitivity drop after the storage of unprocessed specimens to a sufficient extent. In particular, when a polymethylene dye having an oxidation potential of 0.60 or lower (V vs SCE) is used as a sensitizing dye, the sensitivity drop after the storage of the unprocessed specimens becomes great, making it difficult to obtain sufficient properties.

A methine dye containing as a substituent a saturated or unsaturated 5- to 7-membered ring including at least one nitrogen atom is reported in European Patent Application Disclosure (EP) 0372573. However, this nitrogen-containing 5- to 7-membered ring serves as a fog inhibitor in a silver halide light-sensitive material, and there are disclosed as the nitrogen atoms contained in the 5- to 7-membered ring only nitrogen atoms at least one of which is in the form of

by tautomerism.

The nitrogen atom contained in the nitrogen-containing aromatic polycyclic compound of the present invention represented by Ar is neither in the form of

by tautomerism nor serves as a fog inhibitor.

It has also been known that when applied to ordinary silver halide emulsion, such a sensitizing dye not only widens the sensitive wavelength range of the emulsion but also changes the fluctuation in sensitivity of the emulsion during prolonged storage, particularly storage under elevated temperature and high humidity conditions.

However, despite many trials, the sensitivity drop due to prolonged storage cannot be inhibited to a fully satisfactory extent.

On the other hand, products for use in a market which demands finishing a large number of prints at quick delivery date, e.g., light-sensitive materials for color photographic paper, are required to be rapidly processed. It has been well known that when the silver halide emulsion to be incorporated in these light-sensitive materials has a higher silver chloride content, the developing speed is drastically improved.

However, it has also been known that when an emulsion having a high silver chloride content is used, it causes much fog, making it difficult to obtain a high sensitivity.

SUMMARY OF THE INVENTION

It is therefore an object of the present invention to provide a silver halide photographic emulsion which exhibits a high sensitivity and causes little fog increase or sensitivity change upon storage at an elevated temperature and/or high humidity (i.e., excellent unprocessed preservability).

It is an object of the present invention to provide a silver halide photographic material which exhibits rapid processability and a high spectral sensitizability and suffers from little fog increase during storage under elevated temperature and/or humidity conditions and little sensitivity change during prolonged storage.

These and other objects of the present invention will become more apparent from the following detailed description and examples.

The aforementioned objects of the present invention are accomplished with a silver halide emulsion, which comprises at least one methine dye represented by the general formula (I):

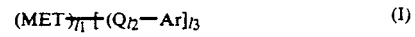
(I)

wherein MET represents an atomic group having a methine dye structure; Q represents a divalent linking group containing at least one carbon, nitrogen, sulfur or oxygen atom; represents an integer 1 or 2; $l_2$ represents an integer 0 or 1, $l_3$ represents an integer from 1 to 4; and Ar represents an aromatic polycyclic group formed of 8 or more atoms containing at least one nitrogen atom, with the proviso that said nitrogen atom-containing polycyclic group has a structure such that tautomerism does not produce $$\begin{matrix} H \\ | \\ -N- \end{matrix}.$$

In a particularly preferred embodiment, the oxidation potential of the methine dye represented by the general formula (I) is 0.60 (V vs SCE) or lower. Lower exidation potential is more preferable. More preferably, MET has a hexamethinemerocyanine structure or heptamethinecyanine structure.

The above objects of the present invention can be effectively accomplished by the use of a specific silver halide photographic material as described later and a spectral sensitizing dye having the specific chemical structure which exhibits a blue sensitivity difference of 0.1 or less between exposure in vacuo and exposure in air.

The photographic material of the present invention comprises on a support a silver halide photographic emulsion layer comprising silver halide grains containing iron ions in an amount of $10^{-7}$ to $10^{-3}$ mol per mol of silver halide and having a localized phase with an iron ion concentration of 10 times or more than that of the other portions in a surface layer falling within 50% or less of the volume of the grain and at least one methine dye represented by the general formula (I') and which exhibits a blue sensitivity difference of 0.1 or less between when developed after exposure in vacuo under $10^{-5}$ torr and when developed after exposure in air under 760 torr:

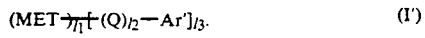
(MET—)$_{l_1}$(Q)$_{l_2}$—Ar')$_{l_3}$. (I')

In this formula MET represents an atomic group having a methine dye structure; Q represents a divalent linking group containing at least one of a carbon, a nitrogen, a sulfur or an oxygen atom; Ar' represents a group obtained by releasing at least one hydrogen atom from an aromatic polycyclic group formed of 8 or more atoms, preferably 10 or more atoms; $l_1$ represents an integer 1 or 2; $l_2$ represents an integer 0 or 1; and $l_3$ represents an integer from 1 to 4.

The halogen composition of the silver halide grains contained in the emulsion layer of this material is silver bromochloride substantially free of silver iodide, 90 mol % or more of which is silver chloride. The grain structure is such that a silver bromide localized phase with a silver bromide content of 10 to 70 mol % is provided inside the grains or on the surface thereof.

DETAILED DESCRIPTION OF THE INVENTION

The present invention will be further described hereinafter.

In the general formulae (I) and (I'), the group represented by MET represents (i) a cyanine structure formed of conjugated double bonds such that a nitrogen-containing heterocyclic group called a basic nucleus and another nitrogen-containing heterocyclic group can be conjugated with each other, (ii) a melocyanine structure formed of conjugated double bonds such that the carbonyl group in the heterocyclic group called the acidic nucleus and a nitrogen atom in the basic nucleus can be conjugated with each other, (iii) a rhodacyanine structure, (iv) an oxonol structure, (v) a hemicyanine structure, (vi) a styryl structure or (vii) a benzylidene structure formed of a combination of these structures.

Examples of these polymethylene dyes are described in T. H. James, Theory of Photographic Process, 1977, Macmillan, Chap. 8, and D. M. Sturmer, The Chemistry of Heterocyclic Compounds, ed. A. Weissberger and E. C. Taylor, 1977, John Wiley and Sons, New York.

Q represents a divalent linking group containing at least one of a carbon atom, a nitrogen atom, a sulfur atom and an oxygen atom.

Q preferably represents a divalent linking group containing 20 or less carbon atoms comprising an alkylene group (e.g., methylene, ethylene, propylene, butylene, pentylene), an arylene group (e.g., phenylene, naphthylene), an alkenylene group (e.g., ethylene, propenylene), a sulfonyl group, a sulfinyl group, a thioether group, an ether group, a carbonyl group, $$\begin{matrix} -N- \\ | \\ R^1 \end{matrix}$$

(in which $R^1$ represents a hydrogen atom, substituted or unsubstituted alkyl group or a substituted or unsubstituted aryl group) or a heterocyclic divalent group (e.g., 6-chloro-1,3,5-triazine-2,4-diyl, pyrimidine-2,4-diyl, quinoxaline-2,3-diyl), either singly or in combination.

The suffix $l_1$ represents an integer 1 or 2.
The suffix $l_2$ represents an integer 0 or 1.
The suffix $l_3$ represents an integer from 1 to 4.
Preferably, $l_1$ represents an integer 1, $l_2$ represents an integer 0 or 1, and $l_3$ represents an integer 1 or 2.

Ar and Ar' will be further described hereinafter. The definition of aromaticity is described in Fumikazu Tamamushi et al., Iwanami Rikagagaku Jiten Dai 3-pan Zohoban, Iwanami Shoten, 1981, pp. 1258–1259.

Specific examples of the nitrogen-containing polycyclic compound constituting Ar are shown below. The following nitrogen-containing polycyclic compound has it's connecting bond to MET via Q at a position of a hydrogen atom connecting to a ring skeleton of the polycyclic compound.

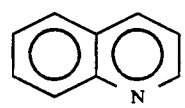
(a)

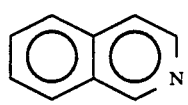
(b)

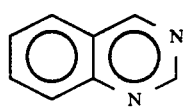
(c)

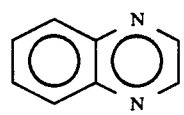
(d)

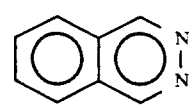 (e)
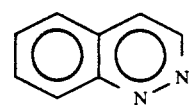 (f)
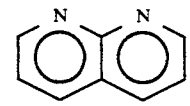 (g)
 (h)
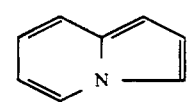 (i)
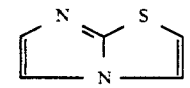 (j)
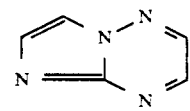 (k)
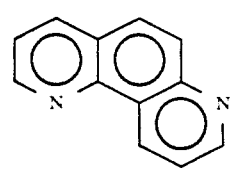 (l)
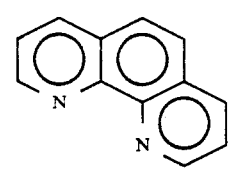 (m)
Preferred among these compounds are Compounds (a) to (h), which have a naphthalene skeleton.
Particularly preferred among Compounds (a) to (h) are Compounds (a) and (b).
Specific examples of polycyclic compounds from which Ar' are derived are shown below:
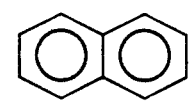 (a)
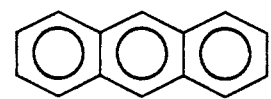 (b)
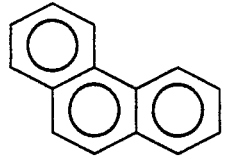 (c)
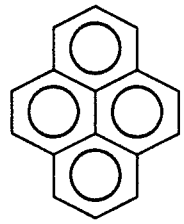 (d)
 (e)
 (f)
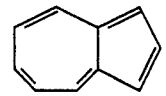 (g)
 (h)
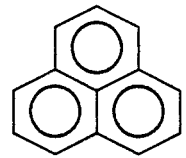 (i)
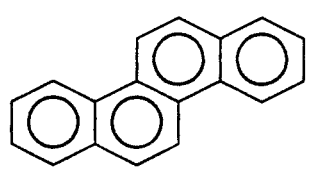 (j)
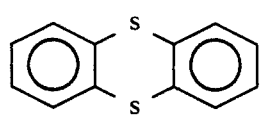 (k)
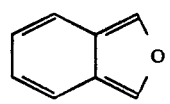 (l)
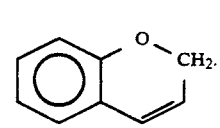 (m)

-continued

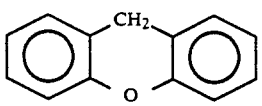 (n)

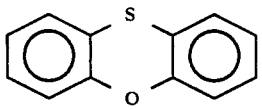 (o)

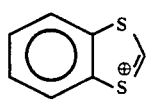 (p)

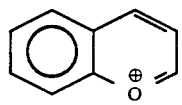 (q)

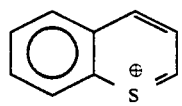 (r)

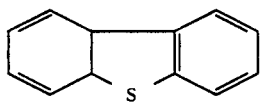 (s)

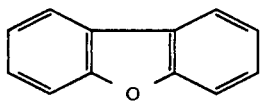 (t)

These polycyclic compounds represented by Ar may be substituted by groups which include a sustituted or unsubstituted alkyl group (e.g., methyl, ethyl, propyl, butyl, hydroxyethyl, trifluoromethyl, benzyl, sulfopropyl, diethylaminoethyl, cyanopropyl, adamantyl, p-chlorophenethyl, ethoxyethyl, ethylthioethyl, phenoxyethyl, carbamoylethyl, carboxyethyl, ethoxycarbonylmethyl, acetylaminoethyl), a substituted or unsubstituted alkenyl group (e.g., allyl, styryl), a substituted or unsubstituted aryl group e.g., phenyl, naphthyl, p-carboxyphenyl, 3,5-dicarboxyphenyl, m-sulfophenyl, p-acetamidophenyl, 3-caprylamidophenyl, p-sulfamoylphenyl, m-hydroxyphenyl, p-nitrophenyl, 3,5-dichlorophenyl, p-anisil, o-anisil, p-cyanophenyl, p-N-methylureidophenyl, m-fluorophenyl, p-tolyl, m-tolyl), heterocyclic residue which may be substituted (e.g., pyridyl, 5-methyl-2-pyridyl, thienyl), a halogen atom (e.g., chlorine, bromine, fluorine), a cyano group, a carboxyl group, a sulfo group, a carbamoyl group, a sulfamoyl group, a nitro group, an alkoxy group which may be substituted (e.g., methoxy, ethoxy, 2-methoxyethoxy, 2-phenylethoxy), an aryloxy group which may be substituted (e.g., phenoxy, p-methylphenoxy, p-chlorophenoxy), an acyl group (e.g., acetyl, benzoyl), a sulfonyl group (e.g., methanesulfonyl, benzenesulfonyl), an alkyl or arylthio group (e.g., methylthio, carboxyethylthio, sulfobutylthio, phenylthio), an alkoxycarbonyl group (e.g., methoxycarbonyl), and an aryloxycarbonyl group (e.g., phenoxycarbonyl). These substituents may further be connected to MET via a divalent linking group Q or a single bond. These polycyclic compounds may further be condensed with condensed rings (e.g., benzo, naphtho, pyrido condensed rings).

These substituents may further be substituted by an alkyl group, an alkenyl group, an aryl group, a hydroxyl group, a carboxyl group, a sulfo group, a nitro group, a cyano group, a halogen atom, an alkoxy group, an aryloxy group, an alkoxycarbonyl group, an acyl group, an acylamino group, a sulfonamino group, a carbamoyl group, a sulfamoyl group, etc.

At least one of these substituents may be connected to MET via a divalent linking group Q or single bond. Ar is connected to $-(Q)_{h2}(MET)_{l_1}$ via at least one substituent or single bond.

Examples of substituents to be contained in the polycyclic compounds represented by Ar' include a hydrogen atom, a sustituted or unsubstituted alkyl group (e.g., methyl, ethyl, propyl, butyl, hydroxyethyl, trifluoromethyl, benzyl, sulfopropyl, diethylaminoethyl, cyanopropyl, adamantyl, p-chlorophenethyl, ethoxyethyl, ethylthioethyl, phenoxyethyl, carbamoylethyl, carboxyethyl, ethoxycarbonylmethyl, acetylaminoethyl), substituted or unsubstituted alkenyl group (e.g., allyl, styryl), a substituted or unsubstituted aryl group (e.g., phenyl, naphthyl, p-carboxyphenyl, 3,5-dicarboxyphenyl, m-sulfophenyl, p-acetamidophenyl, 3-caprylamidophenyl, p-sulfamoylphenyl, m-hydroxyphenyl, p-nitrophenyl, 3,5-dichlorophenyl, p-anisil, o-anisil, p-cyanophenyl, p-N-methylureidophenyl, m-fluorophenyl, p-tolyl, m-tolyl), a heterocyclic residue which may be substituted (e.g., pyridyl, 5-methyl-2-pyridyl, thienyl), a halogen atom (e.g., chlorine, bromine, fluorine), a mercapto group, a cyano group, a carboxyl group, a sulfo group, a hydroxyl group, a carbamoyl group, a sulfamoyl group, an amino group, a nitro group, an alkoxy group which may be substituted (e.g., methoxy, ethoxy, 2-methoxyethoxy, 2-phenylethoxy), an aryloxy group which may be substituted (e.g., phenoxy, p-methylphenoxy, p-chlorophenoxy), an acyl group (e.g., acetyl, benzoyl), an acylamino group (e.g., acetylamino, caproylamino), a sulfonyl group (e.g., methanesulfonyl, benzenesulfonyl), a sulfonylamino group (e.g., methanesulfonylamino, benzenesulfonylamino), a substituted amino group (e.g., diethylamino, hydroxylamino), an alkyl or arylthio group (e.g., methylthio, carboxyethylthio, sulfobutylthio, phenylthio), an alkoxycarbonyl group (e.g., methoxycarbonyl), and an aryloxycarbonyl group (e.g., phenoxycarbonyl). These substituents may further be connected to MET via a divalent linking group Q or a single bond.

These substituents may further be substituted by an alkyl group, an alkenyl group, an aryl group, a hydroxyl group, a carboxyl group, a sulfo group, a nitro group, a cyano group, a halogen atom, an alkoxy group, an aryloxy group, an alkoxyacarbonyl group, an acyl group, an acylamino group, a sulfonamino group, a carbamoyl group, a sulfamoyl group, etc.

At least one of these substituents may be a divalent linking group Q or a single bond.

In order to determine whether the blue sensitivity difference falls below 0.1 which is obtained by developing a light-sensitive material which has been exposed to light in vacuo under $10^{-5}$ torr and in air under 760 torr, the light-sensitive material comprising on a support a silver halide emulsion layer having an iron ion localized phase spectrally sensitized with a methine dye represented by the general formula (I'), a test can be effected by means of the vacuum exposure apparatus described in *Photographic Science and Engineering*, vol. 15, pp. 75-81, 1971. In particular, this reference describes in detail what kind of vacuum exposure apparatus should be used to effect exposure in vacuo and in air. The conditions under which development is effected after exposure and the formulation of the developer to be used depend on the halogen composition of the silver halide emulsion to be spectrally sensitized with the methine dye and in the presence or absence of a color coupler and thus cannot be unequivocally determined. If a silver halide emulsion comprising silver (bromo)-chloride substantially free of silver iodide, 90 mol % or more of which consists of silver chloride and an oil-soluble color coupler is used, typical examples of development conditions and developer formulations which can be preferably used for this test include color development steps (conditions) and developer formulations described in Example 5.

The measurement of the oxidation potential is effected by means of phase discrimination secondary harmonic alternating current polarography. The measurement process will be further described hereinafter. As the solvent there is used acetonitrile (spectral grade) dried in a 4A-1/16 molecular sieve. As the support electrolyte there is used normal tetrapropyl ammonium perchlorate (a special reagent for polarography).

The specimen solution is prepared by dissolving a sensitizing dye in acetonitrile containing 0.1M support electrolyte in an amount of $10^{-3}$ to $10^{-5}$ mol/l. Before measurement, the specimen solution is deoxydized for 15 minutes or more with a high purity (99.999%) argon gas which has been passed through a highly alkaline aqueous solution of pyrogallol and then calcium chloride. As the working electrode there is used a rotary platinum electrode. As the reference electrode there is used a saturated calomel electrode (SCE). As the opposite electrode there is used a platinum electrode. The reference electrode and the specimen solution are connected to each other via a rugin pipe filled with acetonitrile containing 0.1M support electrolyte. The liquid connecting portion is made of Vycor glass.

The measurement is carried out at a temperature of 25° C. with the tip of the rugin pipe positioned 5 mm to 8 mm apart from the tip of the rotary platinum electrode. The measurement of the oxidation potential by phase discrimination secondary harmonic alternating current voltametry is further described in *Journal of Imaging Science*, vol. 30, pp. 27-35, 1986.

The hexamethinemelocyanine structure which can be preferably used as MET in the present invention is represented by the general formula (II). The heptamethinecyanine structure which can be preferably used as MET in the present invention is represented by the general formula (III).

wherein $Z_1$, $Z_2$ and $Z_3$ each represents an atomic group required to form a 5- and 6-membered nitrogen-containing heterocyclic group.

D and D' each represents an atomic group required to form a noncyclic or cyclic acidic nucleus.

$R_1$, $R_2$ and $R_3$ each represents an alkyl group.

$L_1$, $L_2$, $L_3$, $L_4$, $L_5$, $L_6$, $L_7$, $L_8$, $L_9$, $L_{10}$, $L_{11}$, $L_{12}$, $L_{13}$, $L_{14}$, $L_{15}$, $L_{16}$, $L_{17}$, $L_{18}$, $L_{19}$, $L_{20}$ and $L_{21}$ each represents a methine group or substituted methine group. These methine groups may form a ring with other methine groups or may form a ring with auxochromes.

The suffixes $n_1$, $n_2$, $n_3$ and $n_4$ each represents an integer 0 or 1.

$M_1$ and $M_2$ each represents a charge-neutralization paired ion, and $m_1$ and $m_2$ each represents an integer 0 or higher required to neutralize the charge in the molecule.

The general formulae (II) and (III) are each substituted by at least one Ar or Ar' via a divalent linking group Q or single bond.

General formulae (II) and (III) will be further described hereinafter.

$R_1$, $R_2$ and $R_3$ each preferably represents an unsubstituted alkyl group or a substituted alkyl group containing 18 or less carbon atoms (e.g., methyl, ethyl, propyl, butyl, pentyl, octyl, decyl, dodecyl, octadecyl). Examples of the substituents for such a substituted alkyl group include a carboxyl group, a sulfo group, a cyano group, a halogen atom (e.g., fluorine, chlorine, bromine), a hydroxyl group, an alkoxycarbonyl group containing 8 or less carbon atoms (e.g., methoxycarbonyl, ethoxycarbonyl, phenoxycarbonyl, benzyloxycarbonyl), an alkoxy group containing 8 or less carbon atoms (e.g., methoxy, ethoxy, benzyloxy, phenethyloxy), a monocyclic aryloxy group containing 10 or less carbon atoms (e.g., phenoxy, p- tolyloxy), an acyloxy group containing 3 or less carbon atoms (e.g., acetyloxy, propionyloxy), an acyl group containing 8 or less carbon atoms (e.g., acetyl, propionyl, benzoyl, mesyl), a carbamoyl group (e.g., carbamoyl, N,N-dimethylcarbamoyl, morpholinocarbonyl, piperidinocarbonyl), a sulfamoyl group (e.g., sulfamoyl, N,N-dimethylsulfamoyl, morpholinosulfonyl, piperidinosulfonyl), and an aryl group containing 10 or less carbon atoms (e.g., phenyl, 4-chlorophenyl, 4-methylphenyl, α-naphthyl).

Preferred examples of $R_1$, $R_2$ and $R_3$ include an unsubstituted alkyl group (e.g., methyl, ethyl, n-propyl, n-butyl, n-pentyl, n-hexyl), a carboxyalkyl group (e.g., 2-carboxyethyl, carboxymethyl), and a sulfoalkyl group (e.g., 2-sulfoethyl, 3-sulfopropyl, 4-sulfobutyl, 3-sulfobutyl).

$(M_1)_{m1}$ and $(M_2)_{m2}$ in the general formulae indicate the presence or absence of cation or anion when needed to neutralize the ionic charge of the dye. Whether a dye

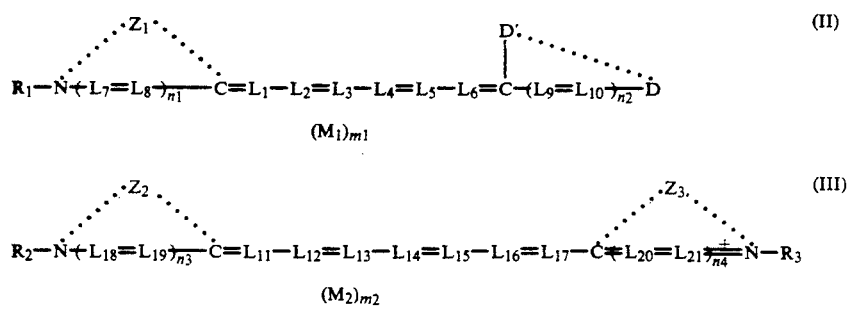

is a cation or anion or has a net ionic charge or not depends on its auxochromes or substituents. Typical examples of the cation include inorganic and organic ammonium ions and alkaline metal ions. On the other hand, the anion may be either inorganic or organic. Examples of these anions include halogen anions (e.g., fluorine ion, chlorine ion, bromine ion, iodine ion), substituted arylsulfonic ions (e.g., p-toluenesulfonic ion, p-chlorobenzenesulfonic ion), aryldisulfonyl ions (e.g., 1,3-benzenedisulfonic ion, 1,5- naphthalenesulfonic ion 2,6-naphthalenedisulfonic ion), alkylsulfuric ions (e.g., methylsulfuric ion), sulfuric ions, thiocyanic ions, perchloric ions, tetrafluoroboric ions, picric ions, acetic ions, and trifluoromethanesulfonic ions.

Preferred among these ions are ammonium ion, iodine ion, and p-toluenesulfonic ion.

Examples of the nucleus formed by $Z_1$, $Z_2$ or $Z_3$ include a thiazole nucleus (e.g., a thiazole nucleus such as thiazole, 4-methylthiazole, 4-phenylthiazole, 4,5-dimethylthiazole, 4,5-diphenylthiazole, 4,5-diphenylthiazole), benzothiazole nucleus such as benzothiazole, 4-chlorobenzothiazole, 5-chlorobenzothiazole, 6-chlorobenzothiazole, 5-nitrobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-ethoxycarbonylbenzothiazole, 5-carboxybenzothiazole, 5-phenethylbenzothiazole, 5-fluorobenzothiazole, 5-chloro-6-methylbenzothiazole, 5,6-dimethylbenzothiazole, 5,6-dimethoxybenzothiazole, 5-hydroxy-6-methylbenzothiazole, tetrahydrobenzothiazole and 4-phenylbenzothiazole, a naphthothiazole nucleus such as naphto[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole and, 8-methoxynaphtho[2,1-d]thiazole, 5-methoxynaphtho[2,3-d]thiazole), a thiazoline nucleus (e.g., thiazoline, 4-methylthiazoline, 4-nitrothiazoline), an oxazole nucleus (e.g., oxazole nucleus such as oxazole, 4-methyloxazole, 4-nitrooxazole, 5-methyloxazole, 4-phenyloxazole, 4,5-diphenyloxazole and 4-ethyloxazole), benzoxazole nucleus such as benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-nitrobenzoxazole, 5-trifluoromethylbenzoxazole, 5-hydroxybenzoxazole, 5-carboxybenzoxazole, 6-methylbenzoxazole, 6-chlorobenzoxazole, 6- nitrobenzoxazole, 6-methoxybenzoxazole, 6-hydroxybenzoxazole, 5,6-dimethylbenzoxazole, 4,6-dimethylbenzothiazole and 5-ethoxybenzoxazole, naphthoxazole nucleus such as naphtho[2,1-d]oxazole, naphtho[1,2-d]oxazole, naphtho[2,3-d]oxazole and 5-nitronaphtho[2,1-d]oxazole, oxazoline nucleus such as 4,4-dimethyloxazoline), a selenazole nucleus (e.g., selenazole nucleus such as 4-methylselenazole, 4-nitroselenazole and 4-phenylselenazole), benzoselenazole nucleus such as benzoselenazole, 5-chlorobenzoselenazole, 5-nitrobenzoselenazole, 5-methoxybenzoselenazole, 5-hydroxybenzoselenazole, 6-nitrobenzoselenazole, 5-chloro-6-nitrobenzoselenazole and 5,6-dimethylbenzoselenazole, naphthoselenazole nucleus such as naphtho[2,1-d]selenazole and naphtho[1,2-d]selenazole, selenazoline nucleus such as selenazoline and 4-methylselenazoline), a terrazole nucleus (e.g., terrazole nucleus such as terrazole, 4-methylterrazole and 4-phenylterrazole, benzoterrazole nucleus such as benzoterrazole, 5-chlorobenzoterrazole, 5-methylbenzoterrazole, 5,6-dimethylbenzoterrazole and 6-methoxybenzoterrazole), naphthoterrazole nucleus such as naphtho[2,1-d]terrazole and naphtho[1,2-d]terrazole), a terrazoline nucleus (e.g., terrazoline, 4-methylterrazoline), a 3,3-dialkylindolenine nucleus (e.g., 3,3-dimethylindolenine, 3,3-diethylindolenine, 3,3-dimethyl-5-cyanoindolenine, 3,3-dimethyl-6-nitroindolenine, 3,3-dimethyl-5-nitroindolenine, 3,3-dimethyl-5-methoxyindolenine, 3,3,5-trimethylindolenine, 3,3-dimethyl- 5-chloroindolenine), an imidazole nucleus [e.g., imidazole nucleus (such as 1-alkylimidazole, 1-alkyl-4-phenylimidazole and 1-arylimidazole), benzoimidazole nucleus such as 1-alkylbenzoimidazole, 1-alkyl-5-chlorobenzoimidazole, 1-alkyl-5,6-dichlorobenzoimidazole, 1-alkyl-5-methoxybenzoimidazole, 1-alkyl-5-cyanobenzoimidazole, 1-alkyl-5-fluorobenzoimidazole, 1-alkyl-5-trifluoromethylbenzoimidazole, 1-alkyl-6-chloro-5-cyanobenzoimidazole, 1-alkyl-6-chloro-5-trifluoromethylimidazole, 1-allyl-5,6-dichlorobenzoimidazole, 1-allyl-5-chlorobenzoimidazole, 1-arylbenzoimidazole, 1-aryl-5-chlorobenzoimidazole, 1-aryl-5,6-dichlorobenzoimidazole, 1-aryl-5-methoxybenzoimidazole and 1-aryl-5-cyanobenzoimidazole), naphthoimidazole nucleus such as alkylnaphtho[1,2-d]imidazole and 1-arylnaphtho[1,2-d]imidazole (preferred among the above mentioned alkyl groups are $C_{1-8}$ alkyl groups such as an unsubstituted alkyl group e.g., methyl, ethyl, propyl, isopropyl, butyl) and a hydroxylalkyl group (e.g., 2-hydroxyethyl, 3-hydroxypropyl); particularly preferred among these alkyl groups are methyl and ethyl groups; the above mentioned aryl group represents a phenyl, a phenyl substituted by a halogen (e.g., chlorine), a phenyl substituted by an alkyl (e.g., methyl) or a phenyl substituted by an alkoxy (e.g., methoxy)], a pyridine nucleus (e.g., 2-pyridine, 4-pyridine, 5-methyl-2-pyridine, 3-methyl-4-pyrdine), a quinoline nucleus [e.g., quinoline nucleus (such as 2-quinoline, 3-methyl-2-quinoline, 5-ethyl-2-quinoline, 6-methyl-2-quinoline, 6-nitro-2-quinoline, 8-fluoro-2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro-4-quinoline, 8-methyl-4-quinoline, 8-methoxy-4-quinoline, 6-methyl-4-quinoline, 6-methoxy-4-quinoline and 6-chloro-4-quinoline, isoquinoline nucleus such as 6-nitro-1-isoquinoline, 3,4-dihydro-1-isoquinoline and 6-nitro-3-isoquinoline)], an imidazo[4,5-b]quinolizaline nucleus (e.g., 1,3-diethylimidazo[4,5-b]quinoxaline, 6-chloro-1,3-dialylimidazo[4,5-b]quinoxaline), an oxadiazole nucleus, a thiadiazole nucleus, a tetrazole nucleus, and a pyrimidine nucleus.

Preferred examples of the nucleus formed of $Z_1$, $Z_2$ or $Z_3$ include a benzothiazole nucleus, a naphthothiazole nucleus, a benzoxazole nucleus, a naphthoxazole nucleus, a benzoimidazole nucleus, a 2-quinoline nucleus, and a 4-quinoline nucleus.

D and D' each represents an atomic group required to form an acidic nucleus and may be in the form of acidic nucleus of any common melocyanine dye. In a preferred embodiment, D represents a thiocarbonyl group or a carbonyl group, and D' represents the residual atomic group required to form an acidic nucleus.

D and D' may together form a 5- or 6-membered heterocyclic group consisting of carbon, nitrogen and a chalcogen (typically, oxygen, sulfur, selenium, tellurium), preferably a 2-pyrazoline-5-one nucleus, a pyrazolidine-3,5-dione nucleus, an imidazoline-5-one nucleus, a hydantoin nucleus, a 2- or 4-thiohydantoin nucleus, a 2- iminoxazolidine-4-one nucleus, a 2-oxazoline-5-one nucleus, a 2-thioxazolidine-2,4-dione nucleus, an isoxazoline-5-one nucleus, a 2-thiazoline-4-one nucleus, a thiazolidine-4-one nucleus, a thiazolidine-2,4-dione nucleus, a rhodanine nucleus, a thiazolidine-2,4-dithione nucleus, an isorhodanine nucleus, an indan-1,3-dione nucleus, a thiophene-3-one nucleus, a thiophene-3-one-1,1-doxide nucleus, an indoline-2-one nucleus, an indoline-3-one nucleus, an indazoline-3-one nucleus, a 2-oxoindazolinium nucleus, a 3-oxoindazolinium nucleus, a 5,7-dioxo-6,7-dihydrothiazolo [3,2-a]pyrimidine nucleus, a cyclohexane-1,3- dione nucleus, a 3,4-dihydroisoquinoline-4-one nucleus, a 1,3-dioxane-4,6-dione nucleus, a barbituric acid nucleus, a 2-thiobarbituric acid nucleus, a chroman-2,4-dione nucleus, an indazoline-2-one nucleus, or a pyrido[1,2-a]pyrimidine-1,3-dione nucleus, more preferably a 3-alkylrhodanine nucleus, a 3-alkyl-2-thioxazolidine-2,4-dione nucleus or a 3-alkyl-2-thiohydantoin nucleus.

Preferred examples of the substituents connected to the nitrogen atom(s) contained in these nuclei include a hydrogen atom; a $C_{1-18}$, preferably a $C_{1-7}$, particularly preferably a $C_{1-4}$ alkyl group (e.g., methyl, ethyl, propyl, isopropyl, butyl, isobutyl, hexyl, octyl, dodecyl, octadecyl); a substituted alkyl group [(e.g., aralkyl group such as benzyl and 2-phenylethyl, hydroxyalkyl group such as 2-hydroxyethyl and 3-hydroxypropyl, carboxyalkyl group such as 2-carboxyethyl, 3-carboxypropyl, 4-carboxybutyl and carboxymethyl, alkoxyalkyl group such as 2-methoxyethyl and 2-(2-methoxyethoxy)ethyl, sulfoalkyl group such as 2-sulfoethyl, 3-sulfopropyl, 3-sulfobutyl, 4-sulfobutyl, 2-[3-sulfopropoxy]ethyl, 2-hydroxy-3-sulfopropyl and 3-sulfopropoxyethoxyethyl, sulfatoalkyl group such as 3-sulfatopropyl and 4-sulfatobutyl), a heterocyclic substituted alkyl group (e.g., 2-(pyrrolidine-2-one-1-il)ethyl, tetrahydrofluorofurfuryl, 2-morpholinoethyl, 2-acetoxyethyl, carboxymethoxymethyl, 2-methanesulfonylaminoethyl)]; an allyl group; an aryl group (e.g., phenyl, 2-naphthyl); a substituted aryl group (e.g., 4-carboxyphenyl, 4-sulfophenyl, 3-chlorophenyl, 3-methylphenyl), and a heterocyclic group (e.g., 2-pyridyl, 2-thiazolyl).

More preferred examples of these substituents include unsubstituted alkyl groups (e.g., methyl, ethyl, n-propyl, n-butyl, n-pentyl, n-hexyl), carboxyalkyl groups (e.g., carboxymethyl, 2-carboxyethyl), and sulfoalkyl groups (e.g., 2-sulfoethyl).

$L_1$, $L_2$, $L_3$, $L_4$, $L_5$, $L_6$, $L_7$, $L_8$, $L_9$, $L_{10}$, $L_{11}$, $L_{12}$, $L_{13}$, $L_{14}$, $L_{15}$, $L_{16}$, $L_{17}$, $L_{18}$, $L_{19}$, $L_{20}$ and $L_{21}$ each represents a methine group or a substituted methine group (e.g., a methine group substituted by substituted or unsubstituted alkyl group such as methyl, ethyl and 2-carboxyethyl; a substituted or unsubstituted aryl group such as phenyl and o-carboxyphenyl; a heterocyclic group such as barbituric acid; a halogen atom such as chlorine atom and bromine atom; an alkoxy group such as methoxy group and ethoxy group; an amino group such as N,N-diphenylamino group, N-methyl-N-phenylamino group and N-methylpiperadino group; an alkylthio group such as methylthio group and ethylthio group, etc.). These groups may form a ring with other methine groups or may form a ring with auxochromes.

Either $L_2$ and $L_4$ or $L_3$ and $L_5$ may preferably form a ring together. $L_{12}$ and $L_{14}$, $L_{13}$ and $L_{15}$, or $L_{14}$ and $L_{16}$ may preferably form a ring together.

Particularly preferred examples of the cyclic structure formed of $L_2$ and $L_4$, $L_{12}$ and $L_{14}$, or $L_{14}$ and $L_{16}$ are shown below.

(1)

(2)

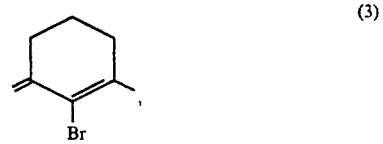
(3)

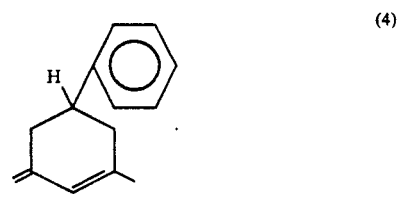
(4)

Particularly preferred examples of the cyclic structure formed of $L_3$ and $L_5$, or $L_{13}$ and $L_{15}$ are shown below.

(1)

(2)

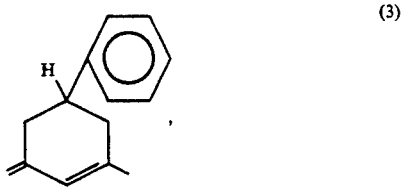
(3)

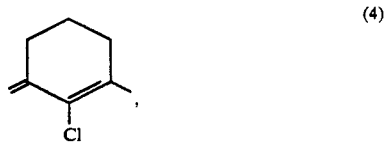
(4)

(5) 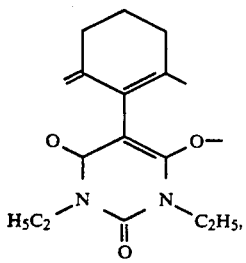

(6) 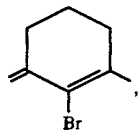

(7) 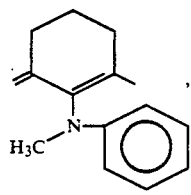

(8) 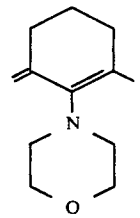

(9) 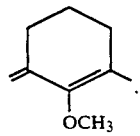

(10) 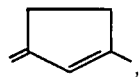

(11) 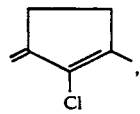

(12) 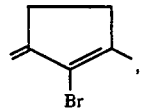

(13) 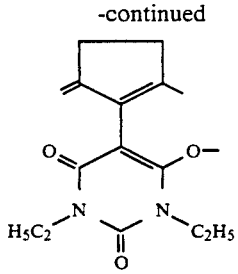

(14) 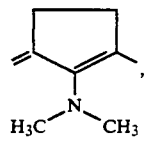

(15) 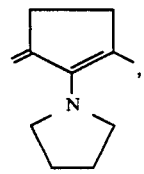

In particular, if $L_3$ and $L_5$, and $L_{13}$ and $L_{15}$ form a cyclic structure together, $L_4$ and $L_{14}$ each is preferably an unsubstituted methine group; or a methine group substituted by unsubstituted alkyl group (e.g., methyl), alkoxy group (e.g., methoxy), amino group (e.g., N,N-diphenylamino), methine group represented by halogen atom (e.g., chlorine) or methine group substituted by the aforementioned acidic nucleus represented by D or D'.

Other preferred examples of L include an unsubstituted methine group.

The compounds of general formulae (II) and (III) are each substituted by at least one $-(Q)_{\overline{n}}$ Ar. The substitution may be made at the 5- or 6-membered nitrogen-containing heterocyclic group represented by $Z_1$, $Z_2$ or $Z_3$, the acidic nucleus represented by D or D', the alkyl group represented by $R_1$, $R_2$ or $R_3$, or the methine group represented by any one of $L_1$ to $L_{21}$.

The substitution may be preferably made at $R_1$, $R_2$, $R_3$, or the nitrogen atom in the acidic nucleus represented by D or D'.

Other examples of spectral sensitizing dyes which can be used in the present invention include a cyanine dye, a melocyanine dye, and a composite melocyanine dye. Further examples of spectral sensitizing dyes which can be used in the present invention include composite cyanine dye, holopolar cyanine dye, hemicyanine dye, styryl dye, and hemioxonol dye. Examples of such cyanine dyes include simple a cyanine dye, a carboncyanine dye, a dicarboncyanine dye, and a tricarboncyanine dye.

Typical examples of the polymethine dye represented by general formula (I) are shown below, but the present invention should not be construed as being limited thereto.

(A) Polymethine dye having an oxidation potential ($E_{ox}(V_{vs}SCE)$) of 0.60 ($V_{vs}SCE$) or higher.

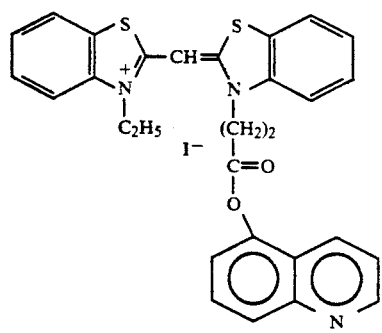
$E_{OX} = 1.33$
(1)
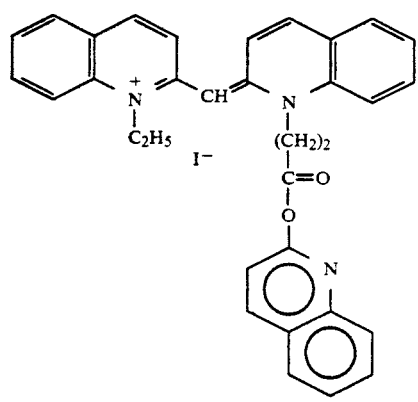
$E_{OX} = 1.068$
(2)
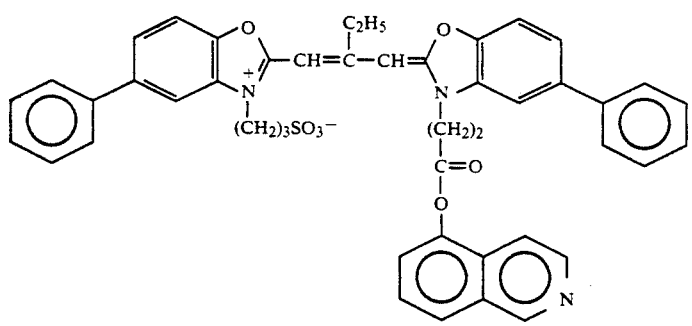
$E_{OX} = 1.99$
(3)
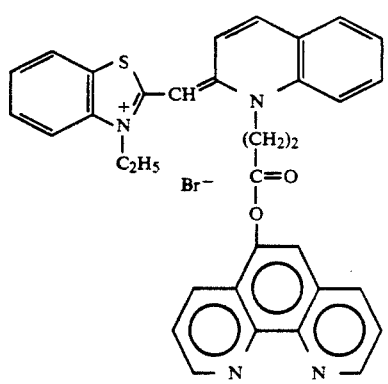
$E_{OX} = 1.173$
(4)

-continued
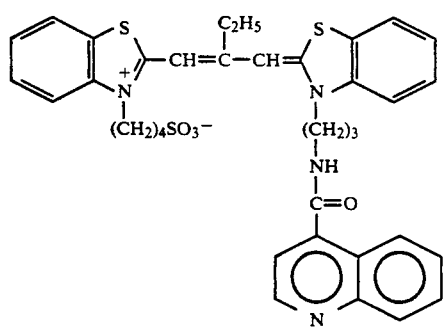
$E_{OX} = 0.862$ (5)
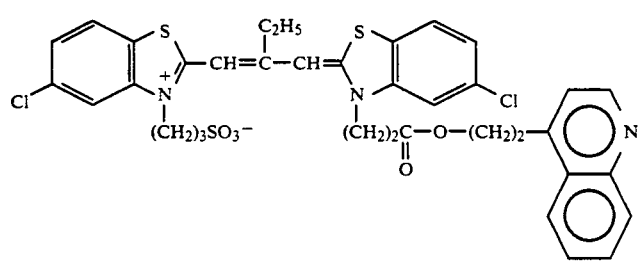
$E_{OX} = 0.935$ (6)
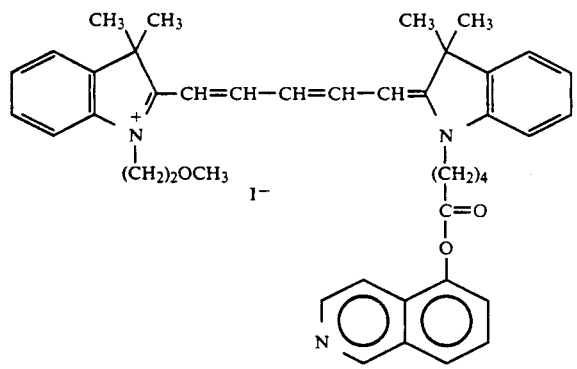
$E_{OX} = 0.735$ (7)
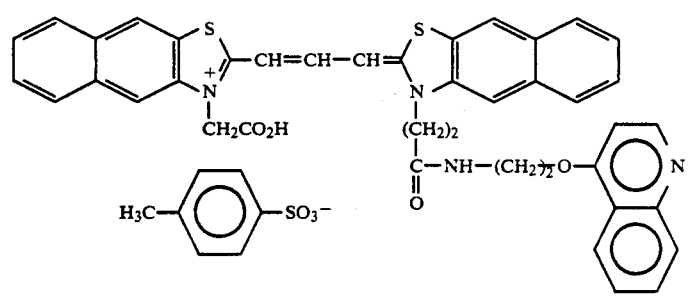
$E_{OX} = 0.985$ (8)

$E_{OX} = 0.657$ $E_{OX} = 0.623$ $E_{OX} = 0.862$ $E_{OX} = 1.32$ (B) Polymethine dye having Eox of 0.60 ($V_{vs}$SCE) or lower.

-continued
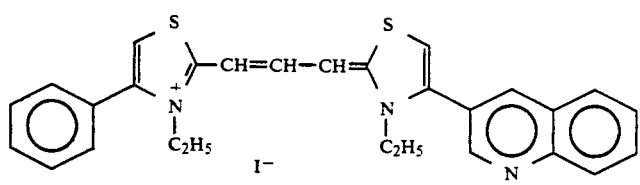
$E_{OX} = 0.594$
(13)
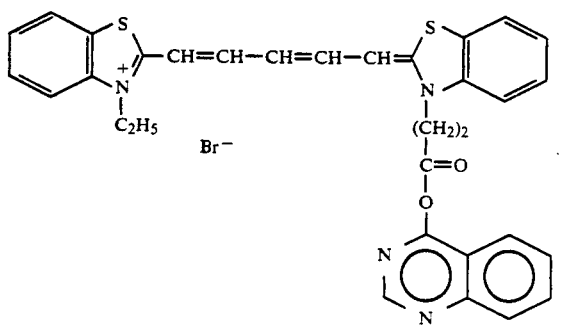
$E_{OX} = 0.60$
(14)
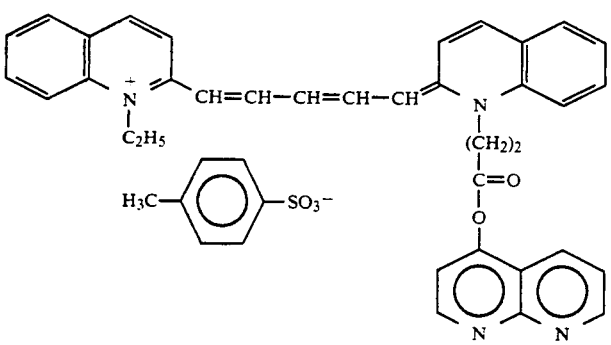
$E_{OX} = 0.472$
(15)
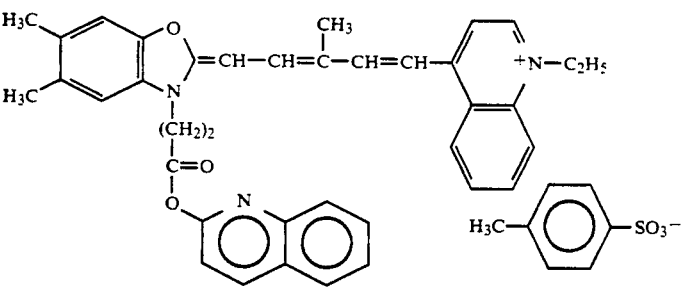
$E_{OX} = 0.495$
(16)
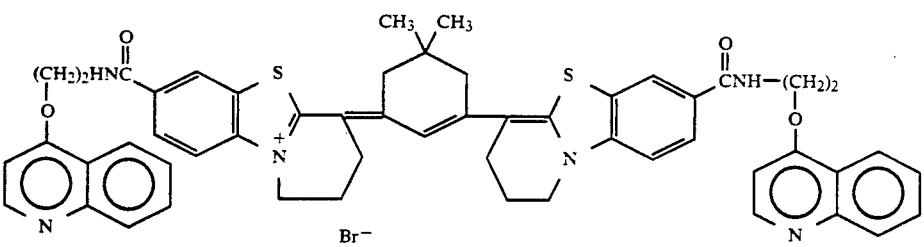
$E_{OX} = 0.413$
(17)

-continued
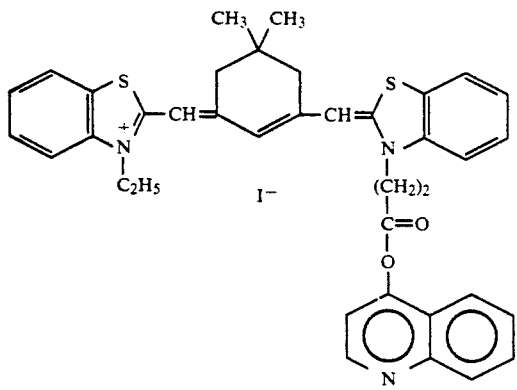
$E_{OX} = 0.52$ (18)
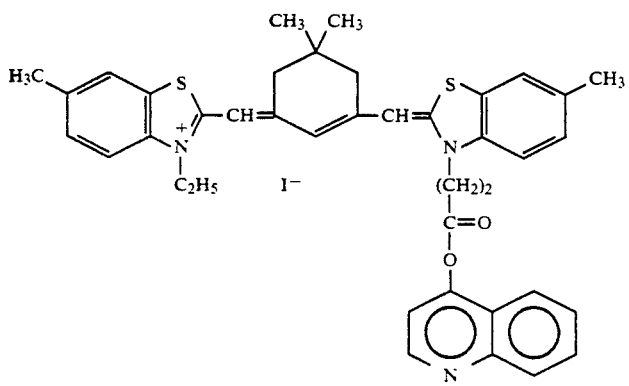
$E_{OX} = 0.48$ (19)
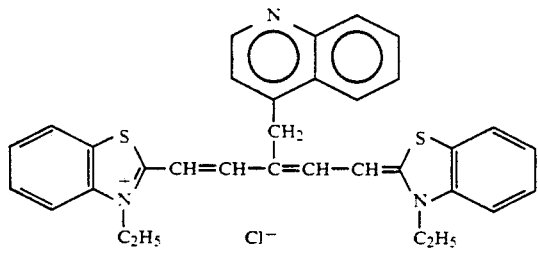
$E_{OX} = 0.573$ (20)
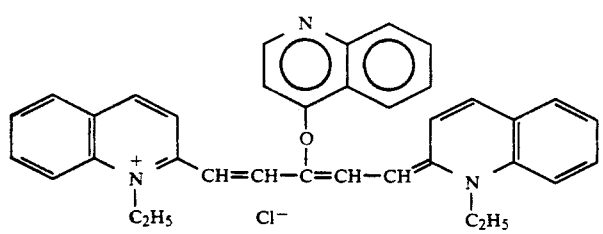
$E_{OX} = 0.408$ (21)
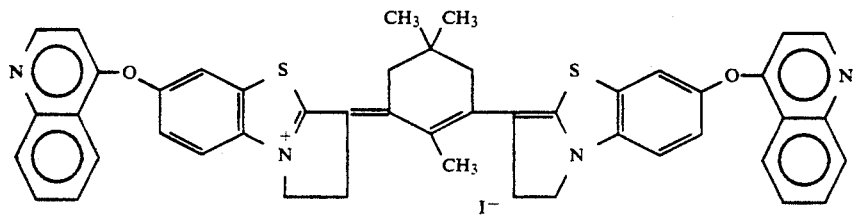
$E_{OX} = 0.380$ (22)

(23)
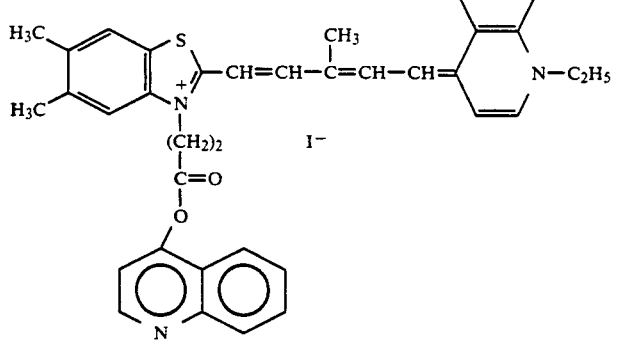
$E_{OX} = 0.40$
(24)
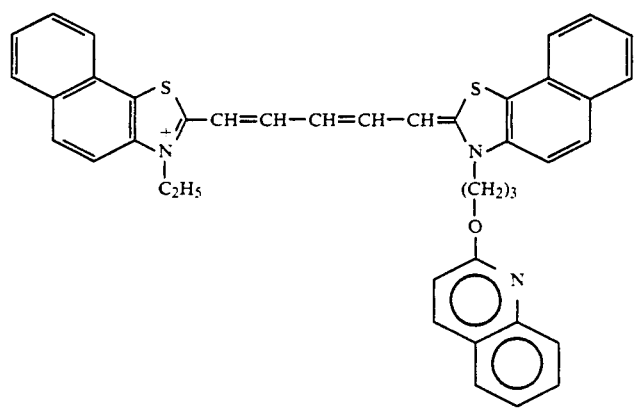
$E_{OX} = 0.51$
(25)
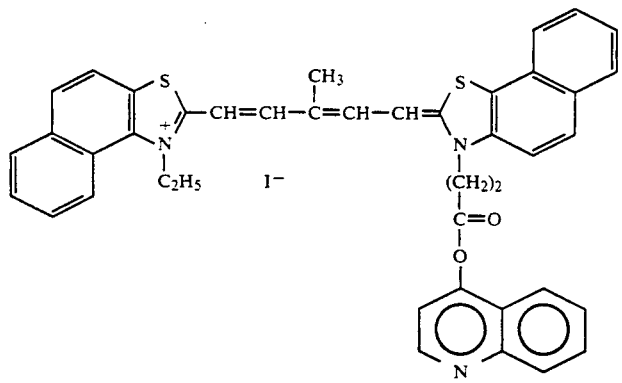
$E_{OX} = 0.45$
(26)
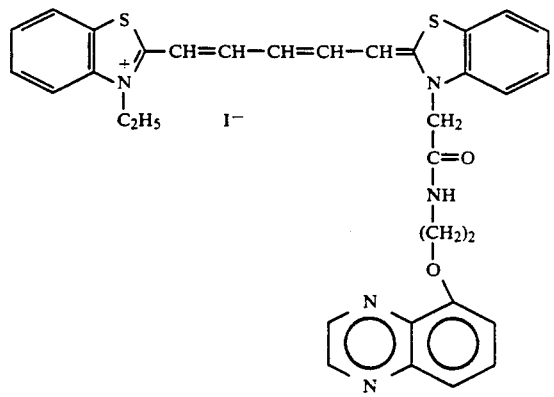

$E_{OX} = 0.63$
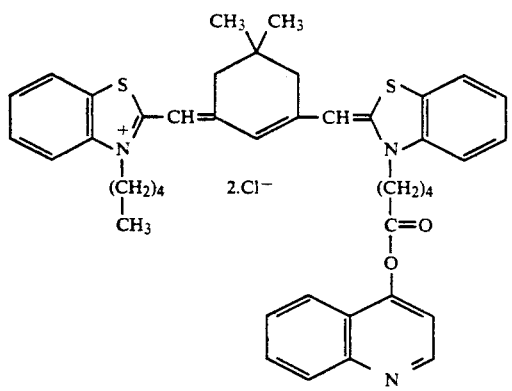
(27)
$E_{OX} = 0.49$
Dyes having a heptamethinecyanine color structure
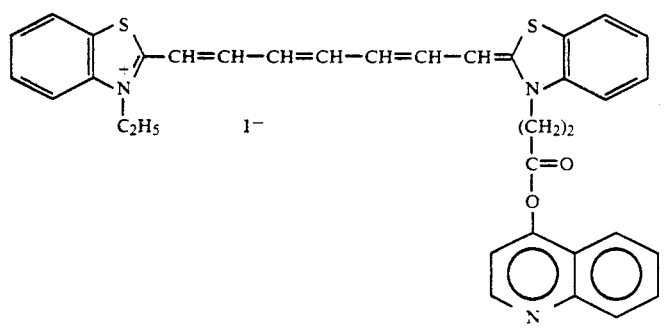
(28)
$E_{OX} = 0.385$
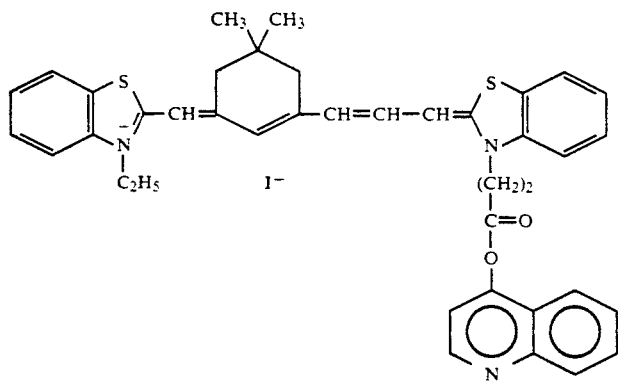
(29)
$E_{OX} = 0.375$
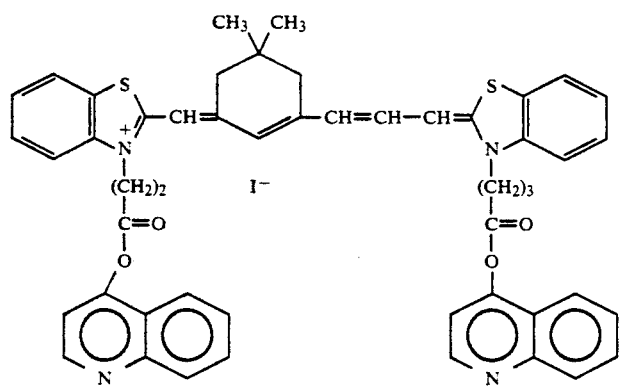
(30)
$E_{OX} = 0.375$

(31)
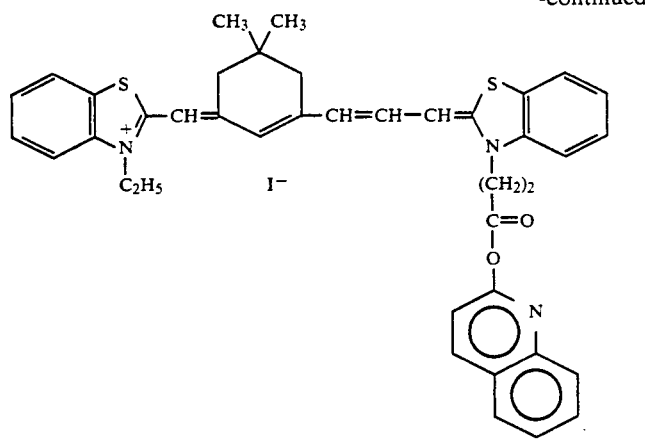
$E_{OX} = 0.375$
(32)
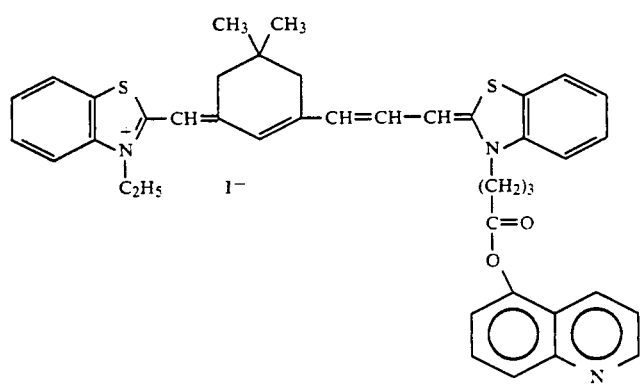
$E_{OX} = 0.376$
(33)
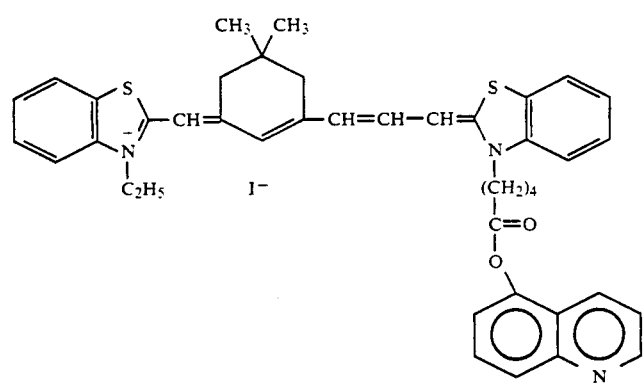
$E_{OX} = 0.375$
(34)
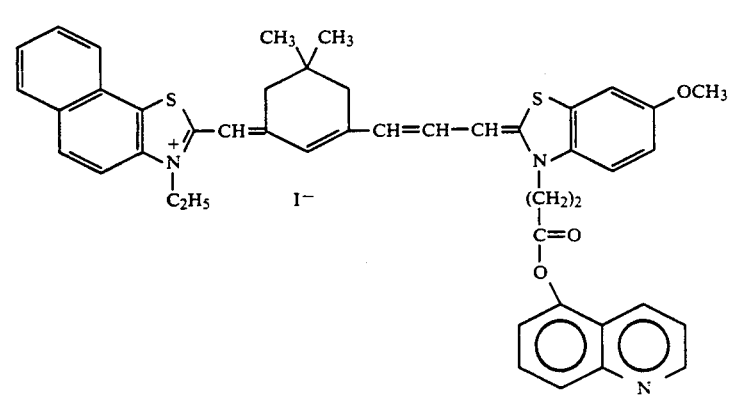
$E_{OX} = 0.30$

(35)
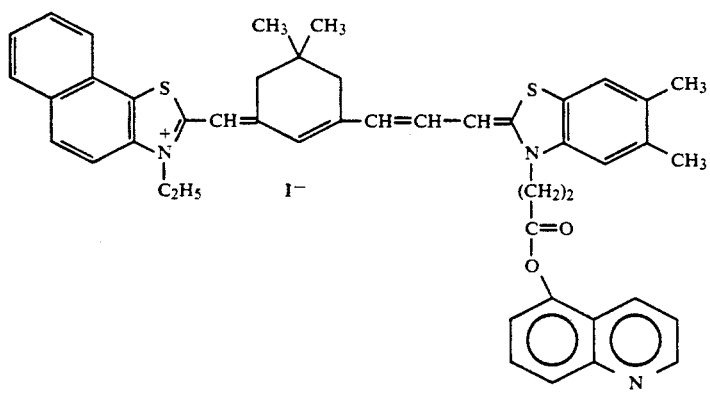
$E_{OX} = 0.30$
(36)
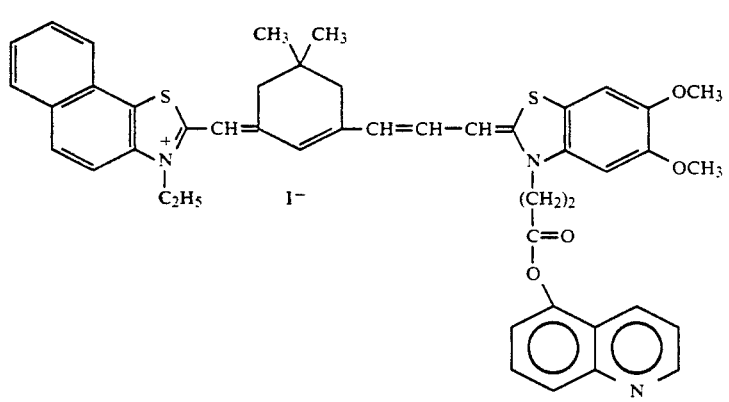
$E_{OX} = 0.23$
(37)
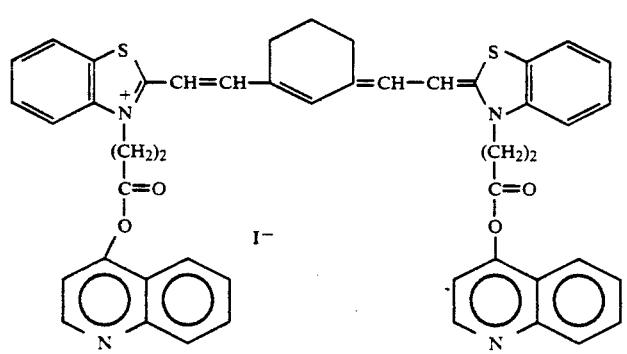
$E_{OX} = 0.295$ -continued
(38)
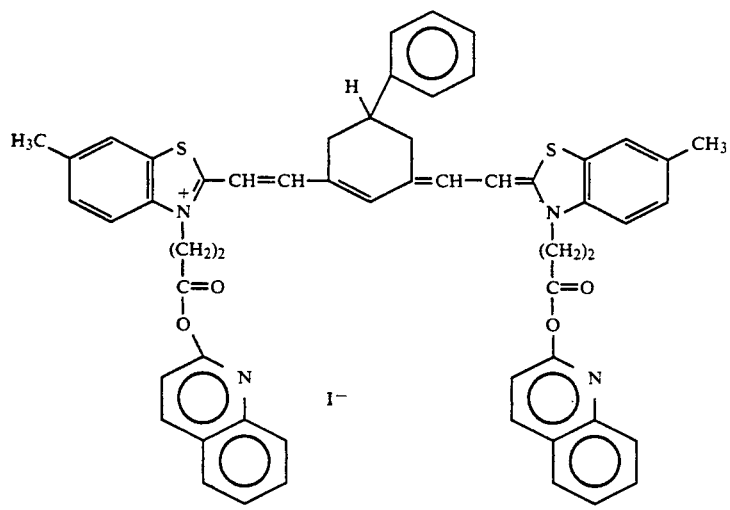
$E_{OX} = 0.274$
(39)
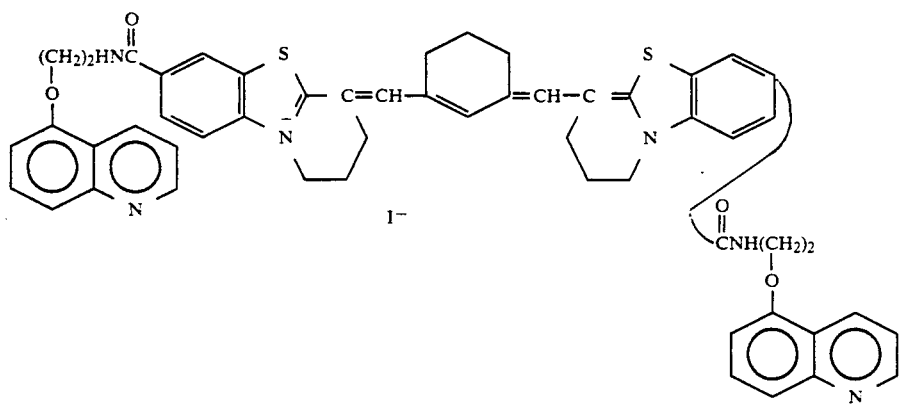
$E_{OX} = 0.18$
(40)
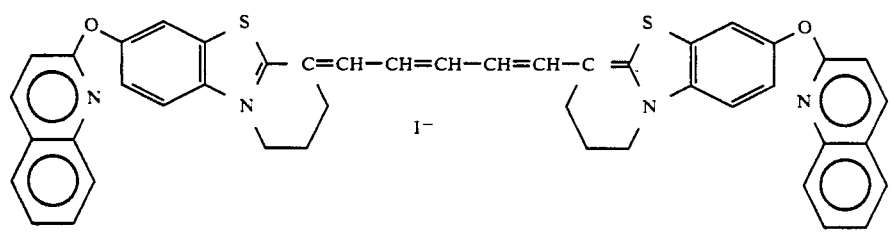
$E_{OX} = 0.255$
(41)
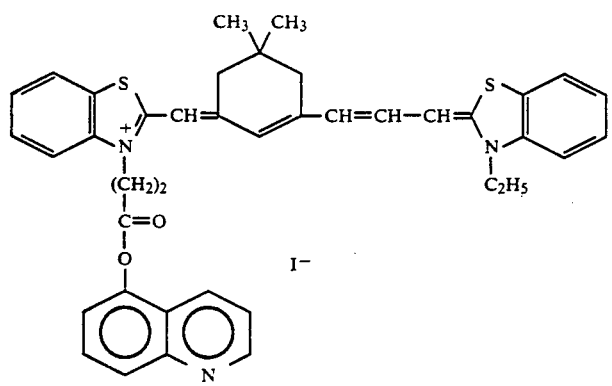
$E_{OX} = 0.374$ -continued
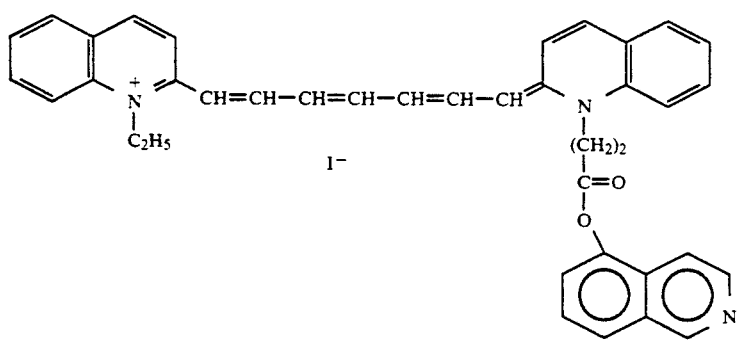
(42)
$E_{OX} = 0.36$
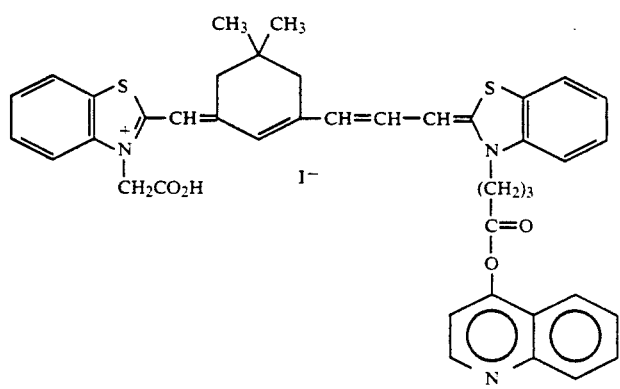
(43)
$E_{OX} = 0.376$
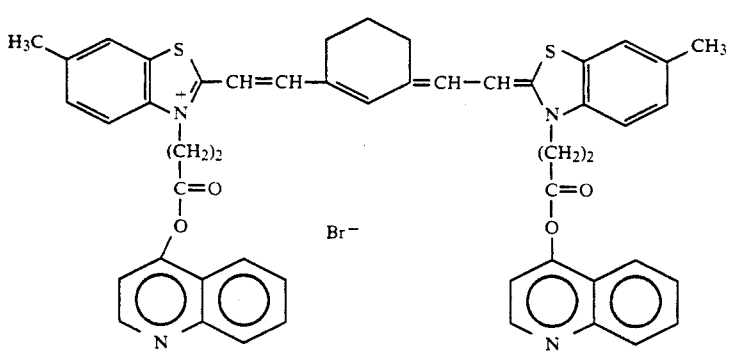
(44)
$E_{OX} = 0.274$
Dyes having a hexamethine-merocyanine structure
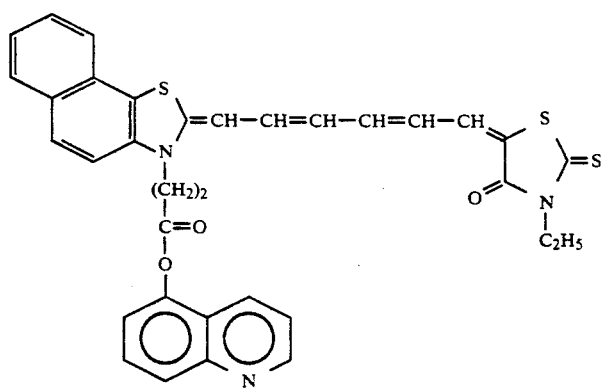
(45)
$E_{OX} = 0.35$

(46)
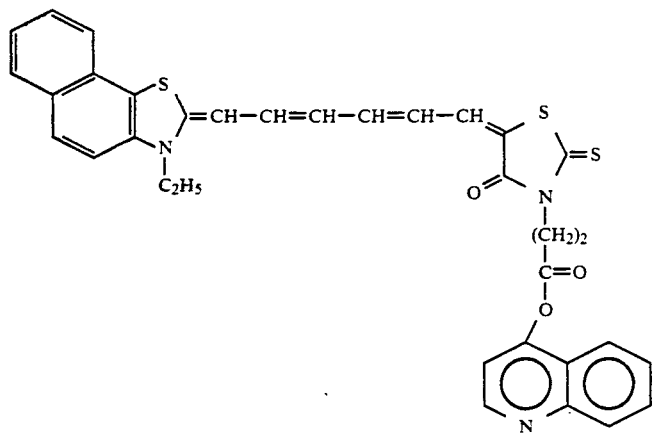
$E_{OX} = 0.35$
(47)
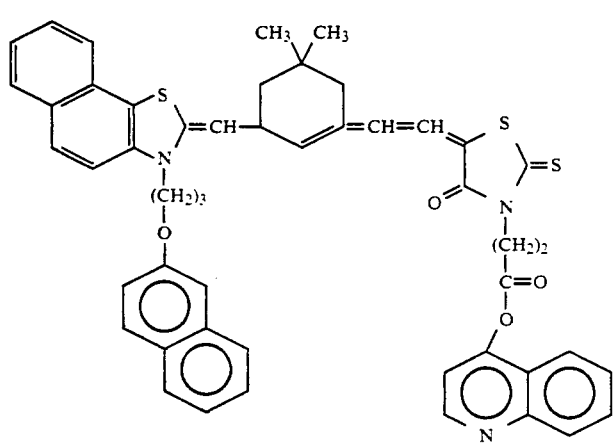
$E_{OX} = 0.30$
(48)
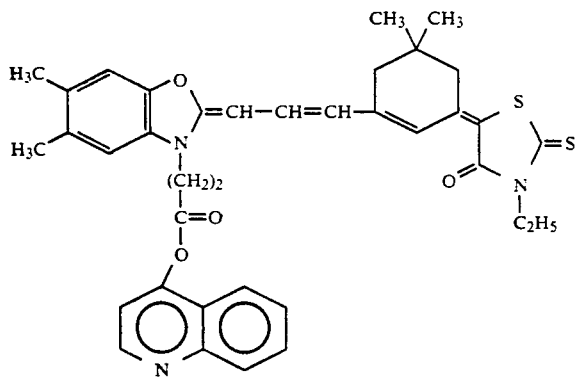
$E_{OX} = 0.40$
(49)
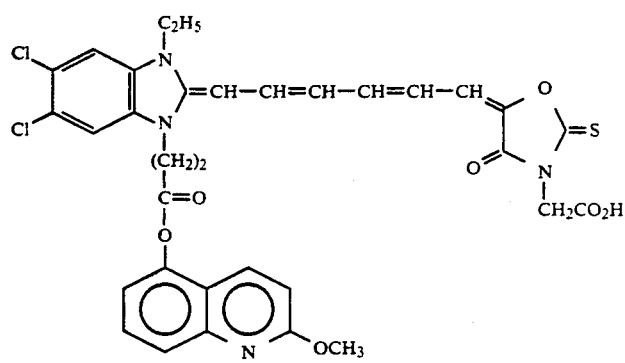

$E_{OX} = 0.25$
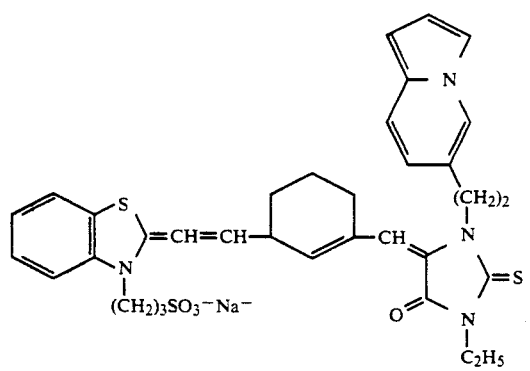
(50)
$E_{OX} = 0.36$
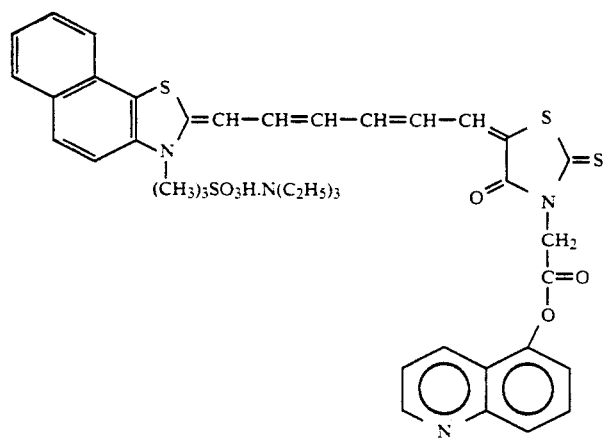
(51)
$E_{OX} = 0.34$
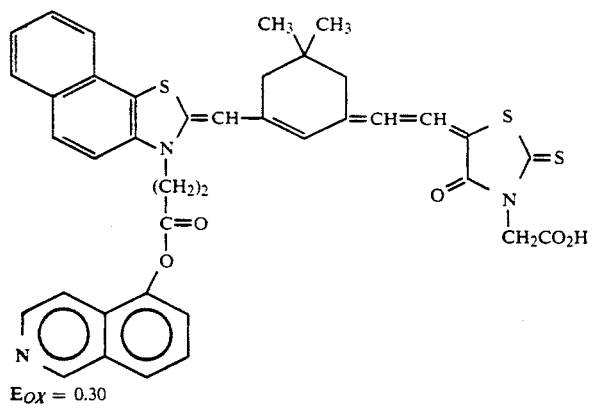
(52)
$E_{OX} = 0.30$
Typical examples of the polymethine dye represented by general formula (I') will be set forth below, but the present invention should not be construed as being limited thereto.
(A) polymethine dye having an oxidation potential ($E_{OX}$ ($V_{VS}SCE$)) of 0.60 ($V_{VS}SCE$) or higher.

-continued
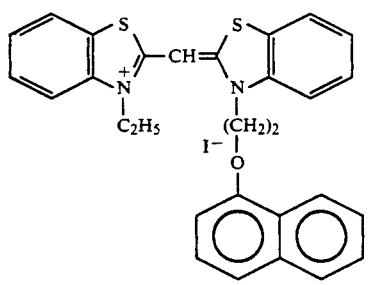
$E_{OX} = 1.33$ (1)
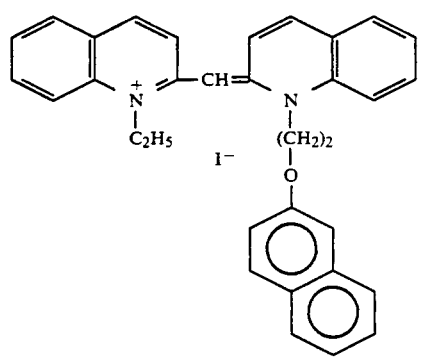
$E_{OX} = 1.067$ (2)
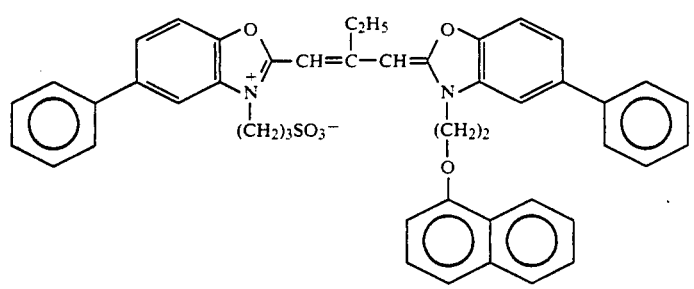
$E_{OX} = 0.99$ (3)
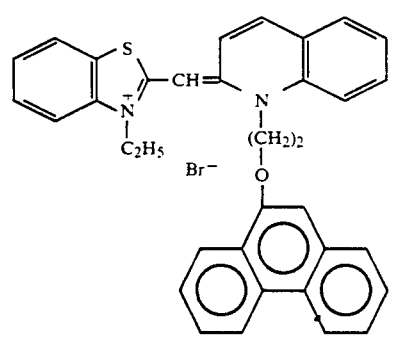
$E_{OX} = 1.173$ (4)
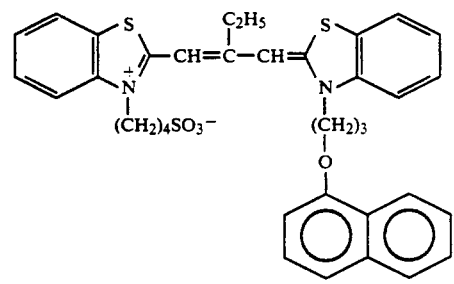
$E_{OX} = 0.862$ (5)

-continued
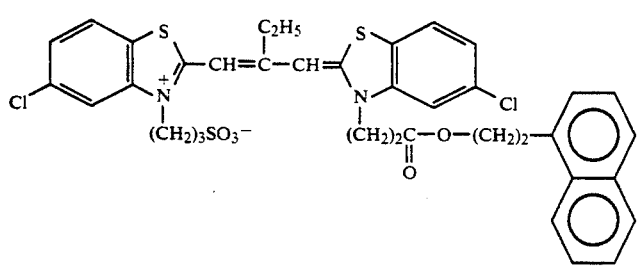
$E_{OX} = 0.936$
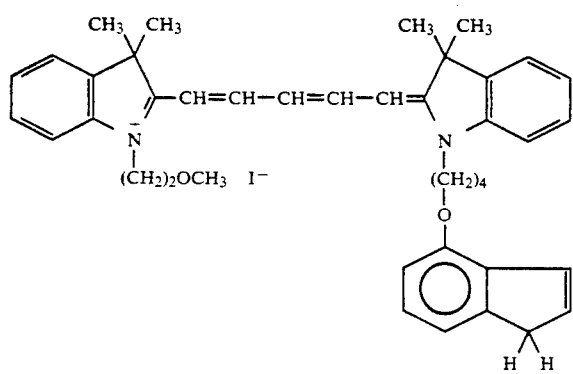
$E_{OX} = 0.735$
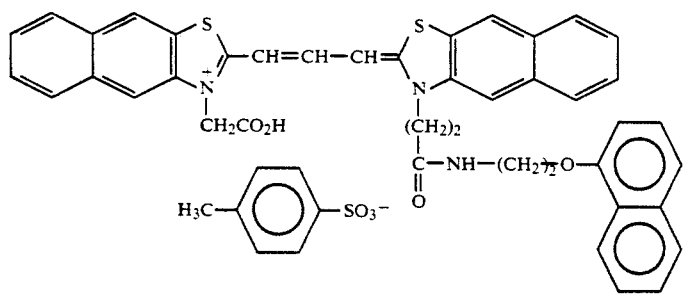
$E_{OX} = 0.985$
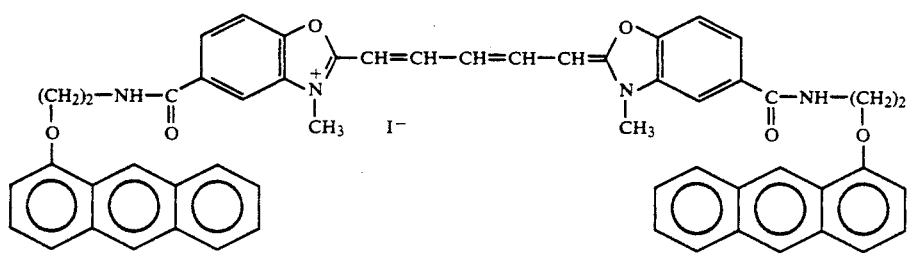
$E_{OX} = 0.657$

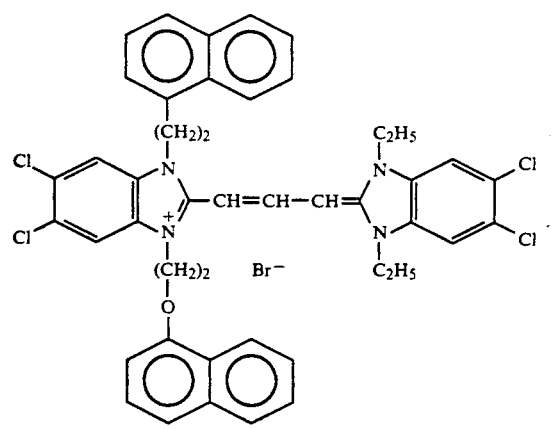
$E_{OX} = 0.622$ (10)
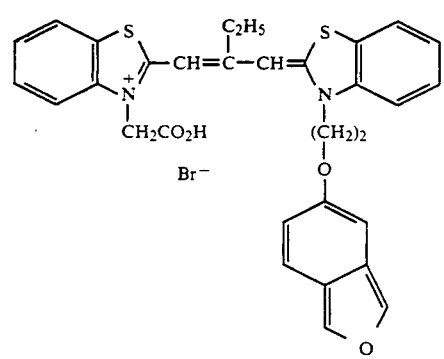
$E_{OX} = 0.863$ (11)
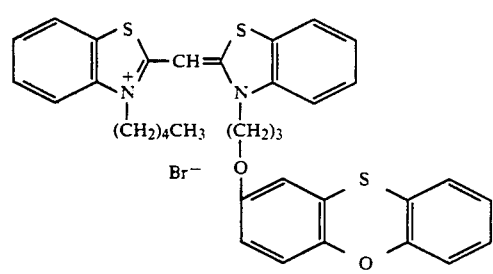
$E_{OX} = 1.32$ (12)
(B) Polymethine dye having $E_{OX}$ of 0.60 (V$_{VS}$SCE) or lower
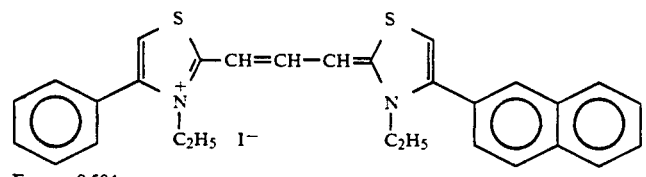
$E_{OX} = 0.594$ (13)
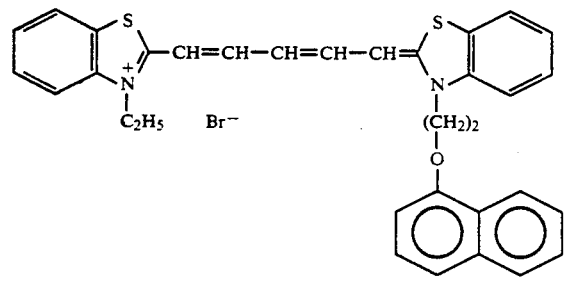
$E_{OX} = 0.59$ (14)

-continued
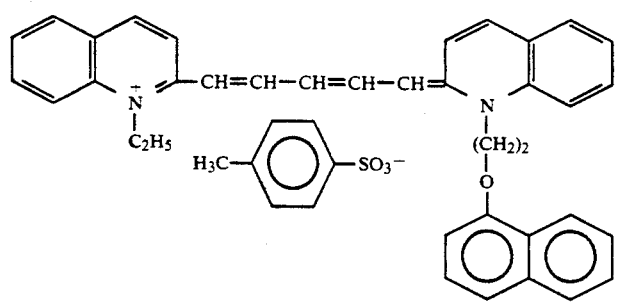
$E_{OX} = 0.473$
(15)
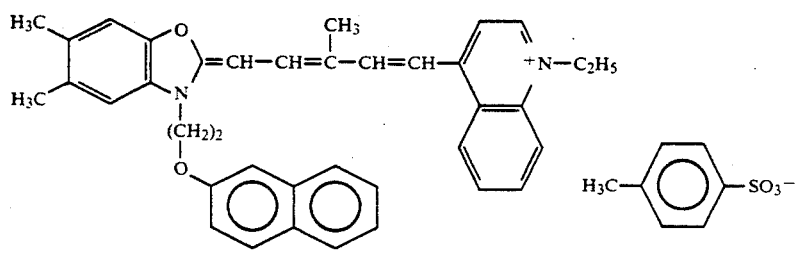
$E_{OX} = 0.495$
(16)
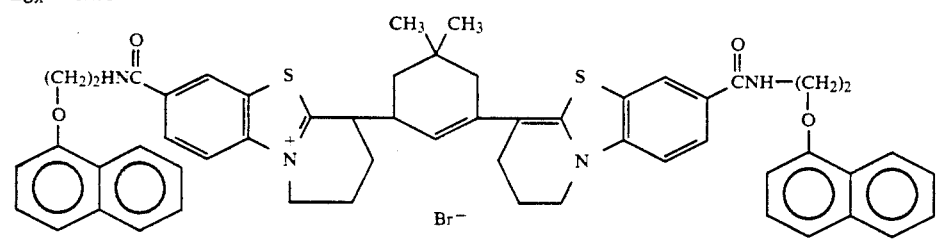
$E_{OX} = 0.413$
(17)
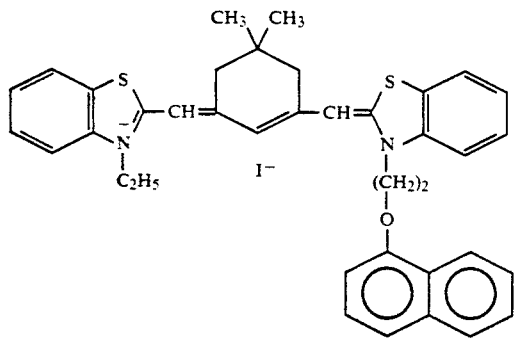
$E_{OX} = 0.50$
(18)
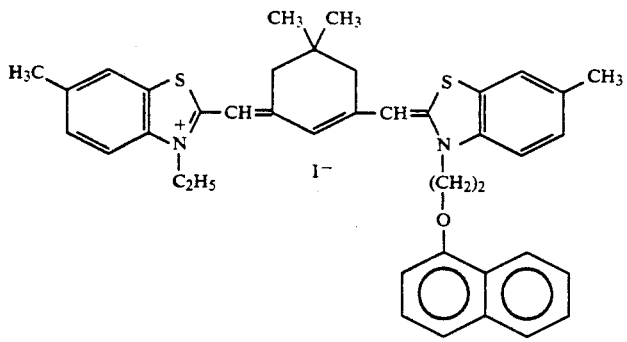
$E_{OX} = 0.48$
(19)

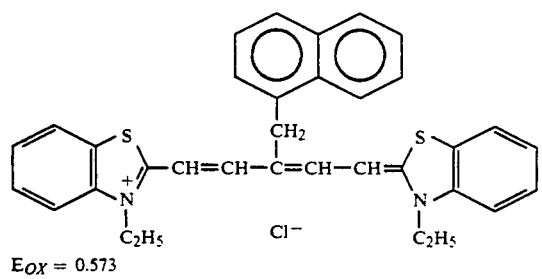
(20)
$E_{OX} = 0.573$
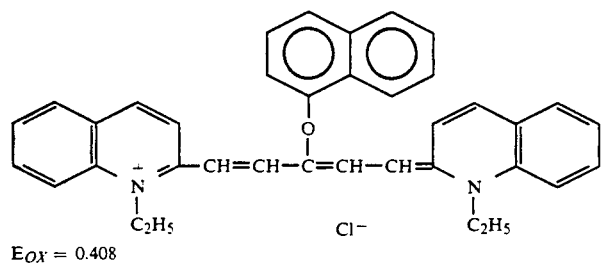
(21)
$E_{OX} = 0.408$
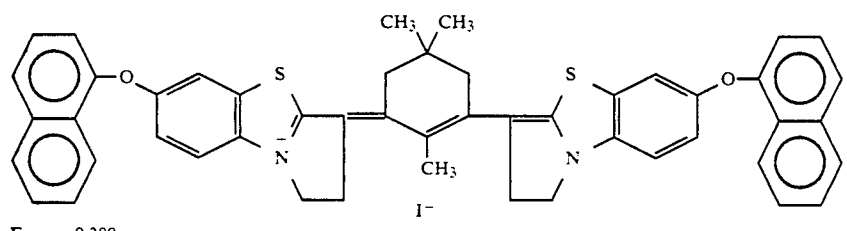
(22)
$E_{OX} = 0.380$
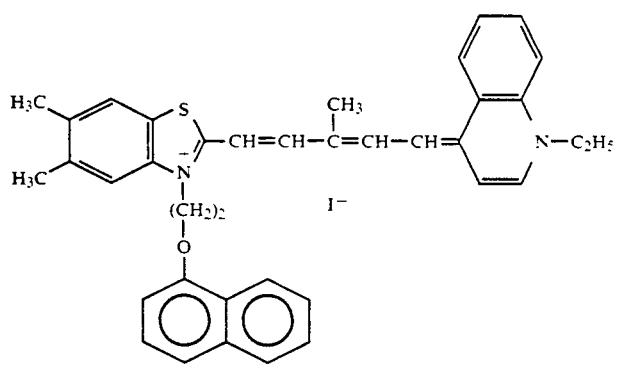
(23)
$E_{OX} = 0.40$
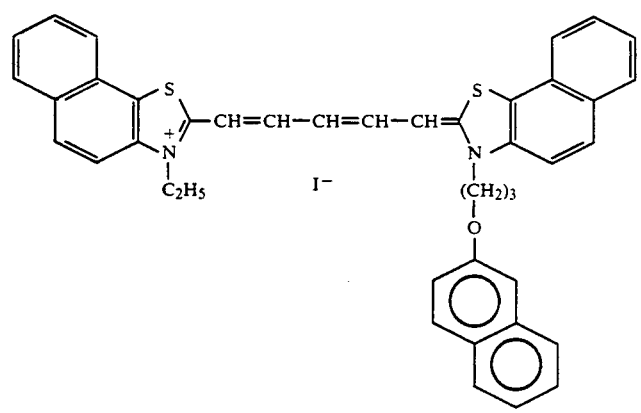
(24)
$E_{OX} = 0.50$

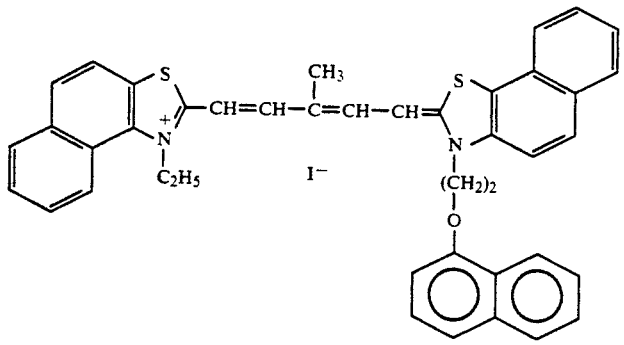
(25)
$E_{OX} = 0.45$
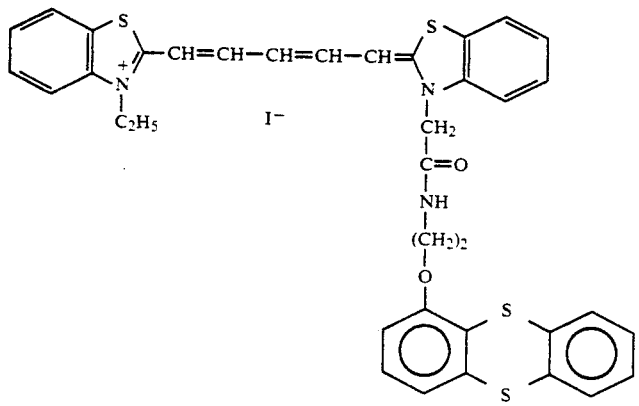
(26)
$E_{OX} = 0.60$
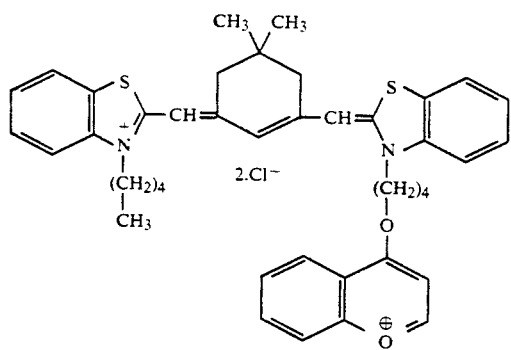
(27)
$E_{OX} = 0.49$
Dyes having a heptamethinecyanine color structure
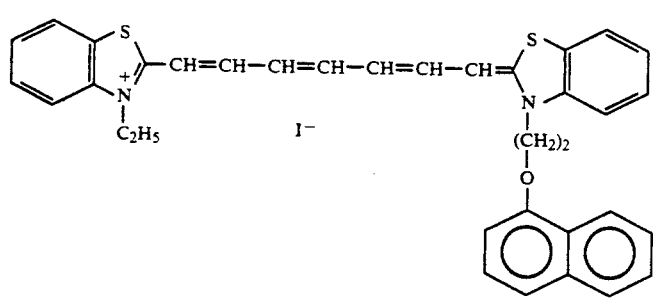
(28)
$E_{OX} = 0.385$

(29)
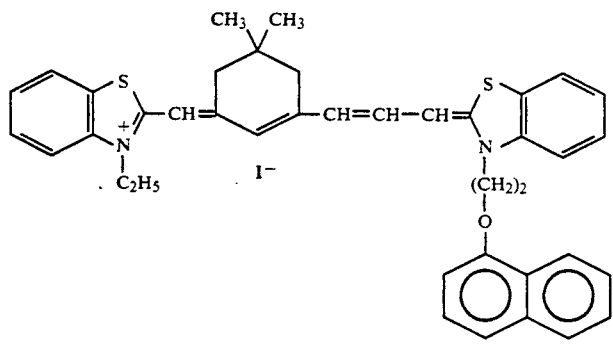
$E_{OX} = 0.375$
(30)
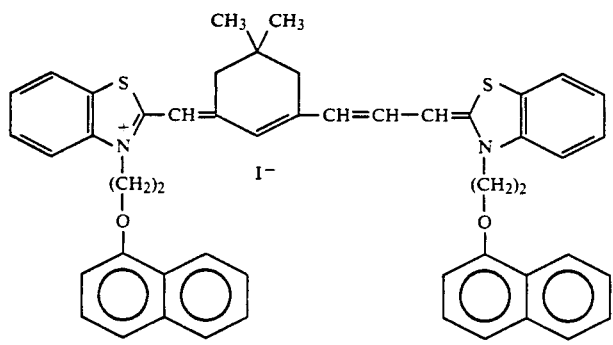
$E_{OX} = 0.374$
(31)
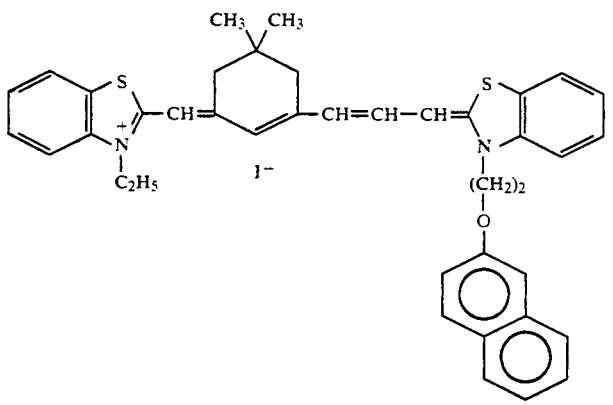
$E_{OX} = 0.375$
(32)
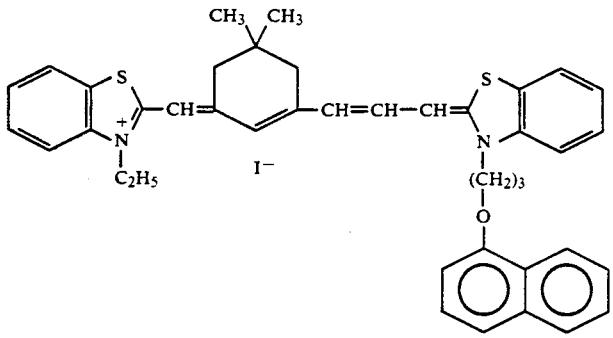
$E_{OX} = 0.376$ -continued
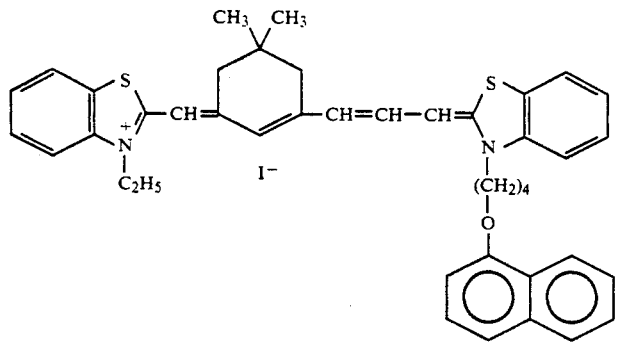
(33)
$E_{OX} = 0.375$
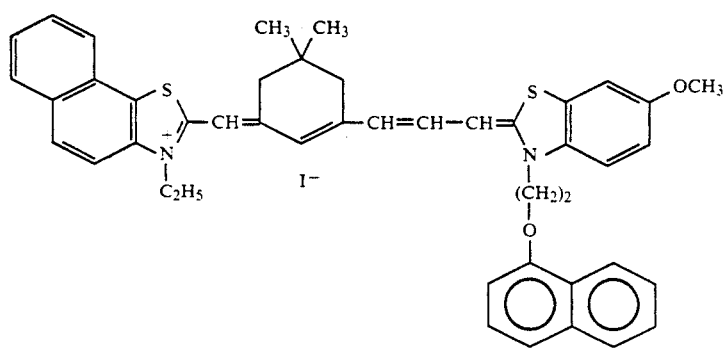
(34)
$E_{OX} = 0.29$
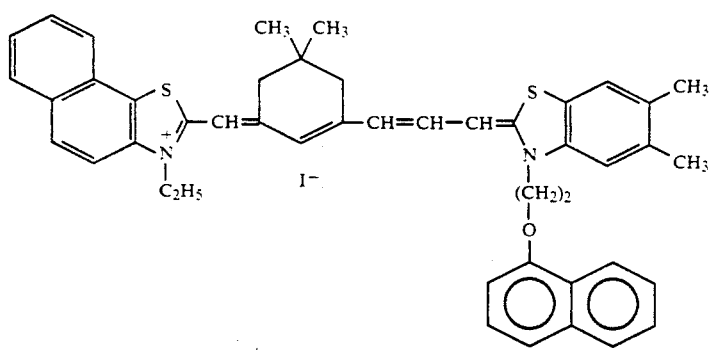
(35)
$E_{OX} = 0.30$
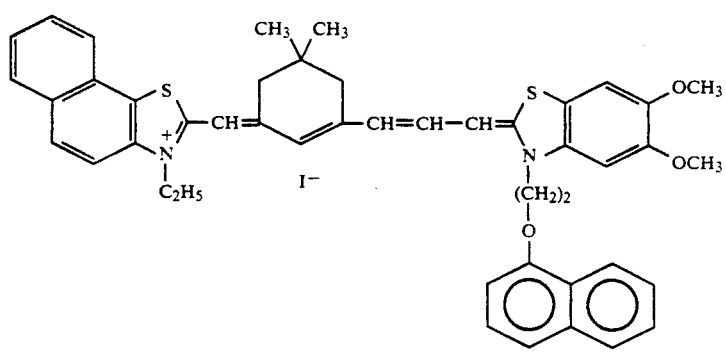
(36)
$E_{OX} = 0.23$

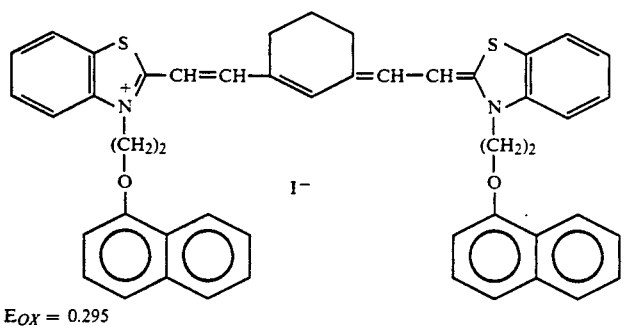
(37)
$E_{OX} = 0.295$
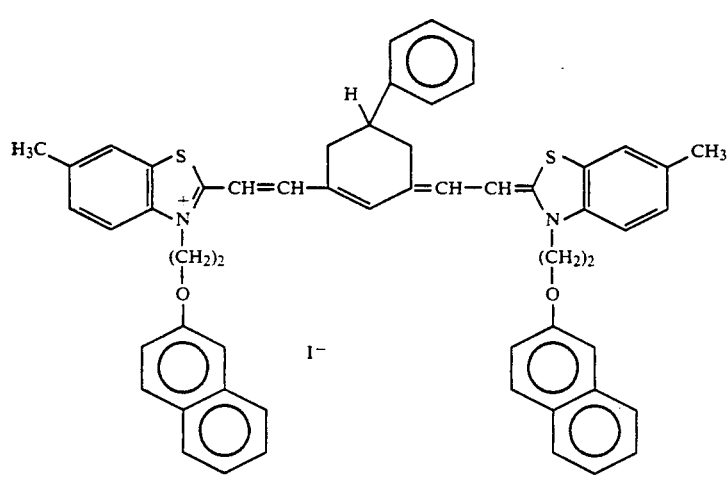
(38)
$E_{OX} = 0.275$
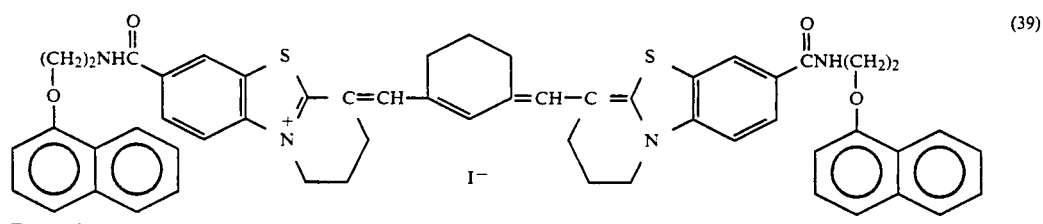
(39)
$E_{OX} = 0.18$
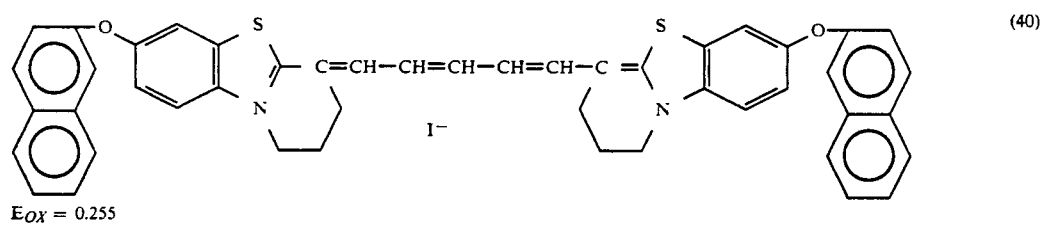
(40)
$E_{OX} = 0.255$
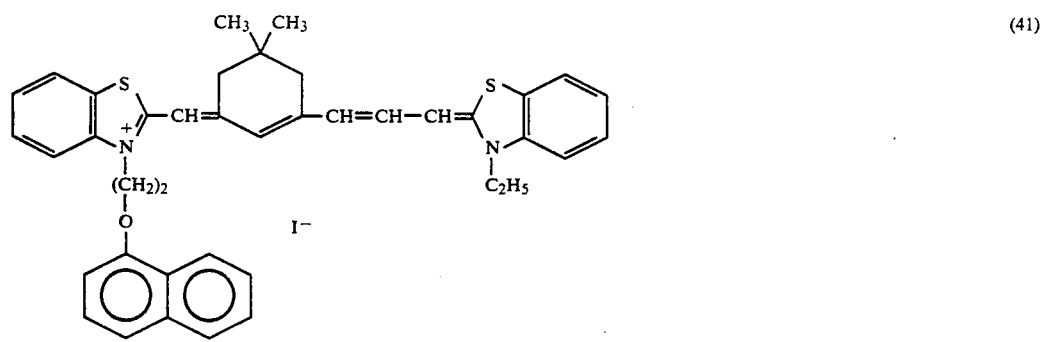
(41)
$E_{OX} = 0.374$

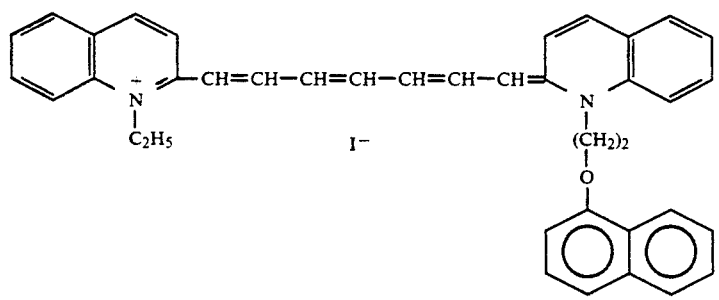
(42)
$E_{OX} = 0.35$
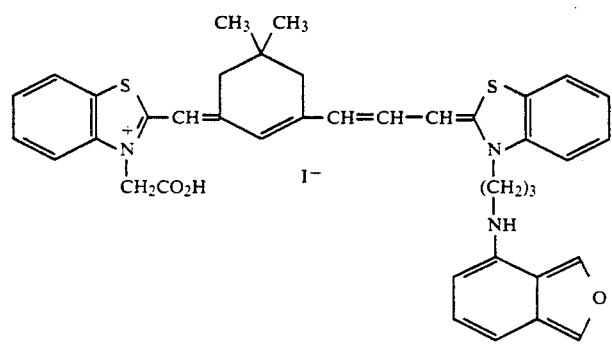
(43)
$E_{OX} = 0.376$
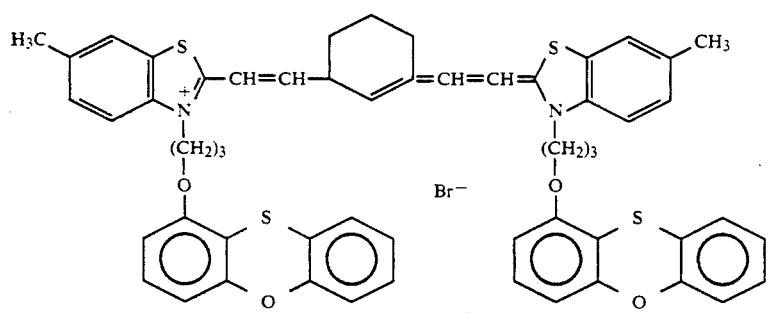
(44)
$E_{OX} = 0.274$
Dyes having a hexamethine-merocyanine structure
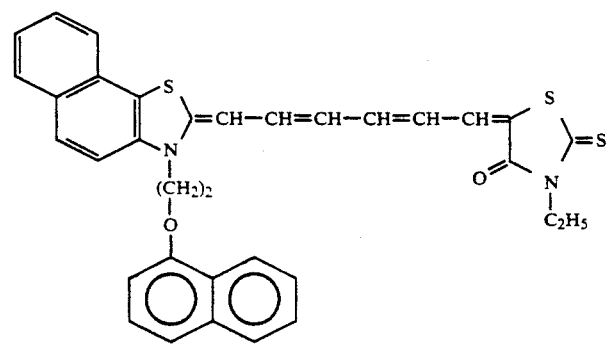
(45)
$E_{OX} = 0.35$ -continued
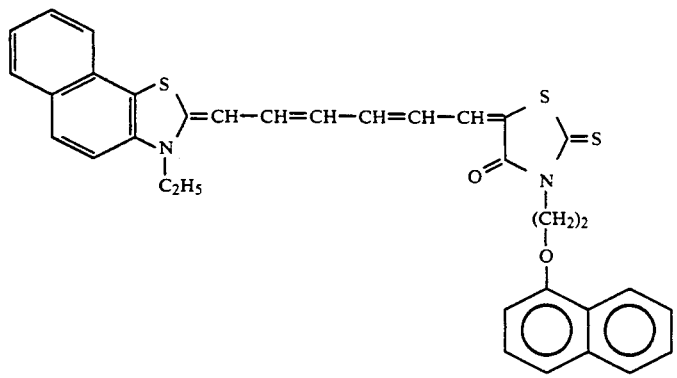
(46)
$E_{OX} = 0.34$
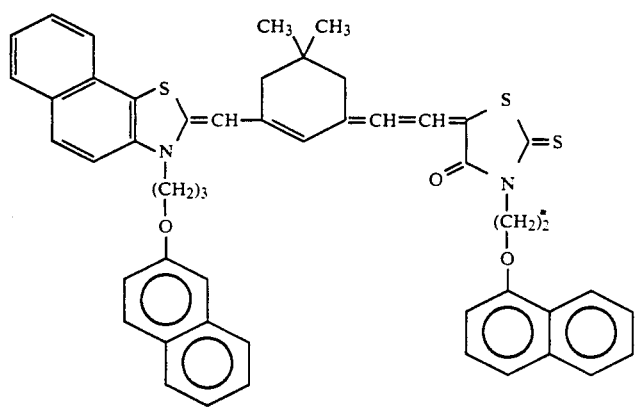
(47)
$E_{OX} = 0.30$
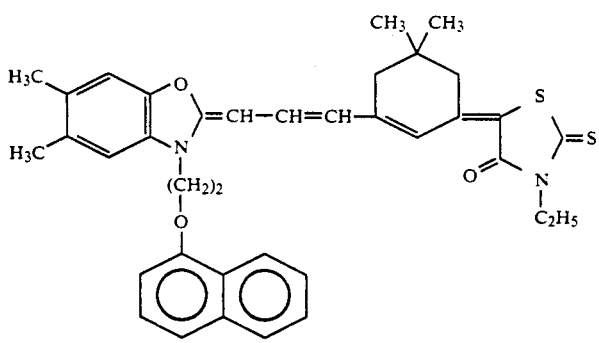
(48)
$E_{OX} = 0.40$
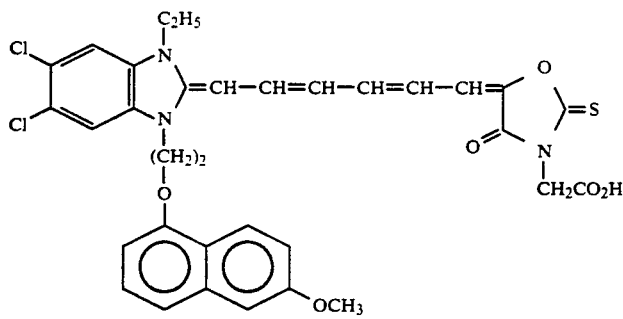
(49)
$E_{OX} = 0.25$

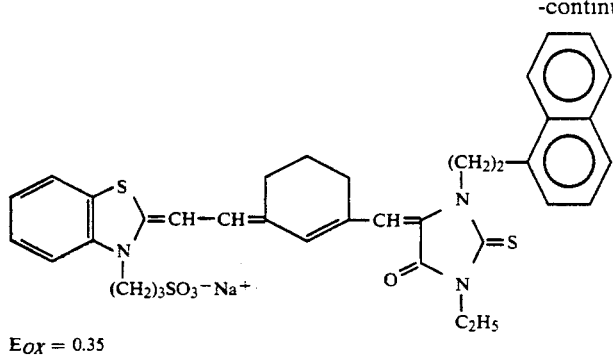

$E_{OX} = 0.35$ (50)

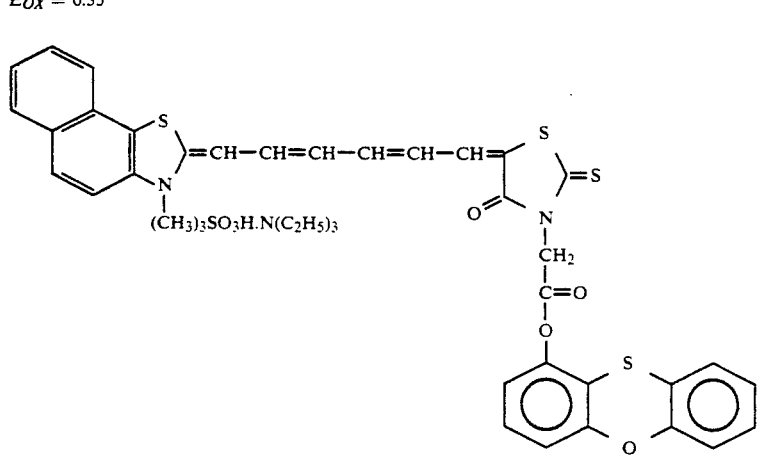

$E_{OX} = 0.34$ (51)

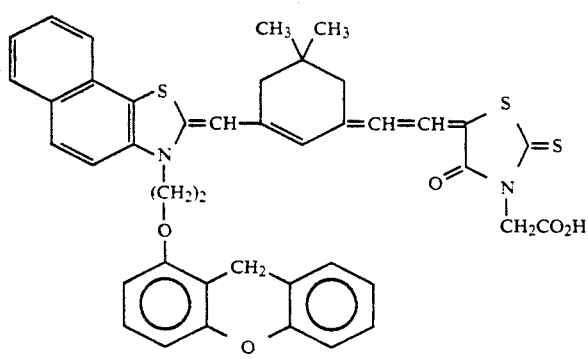

$E_{OX} = 0.30$ (52)

The synthesis of the polymethine dye represented by the general formula (I) to be used in the present invention can be accomplished in accordance with any suitable method as described in the following references:

a) F. M. Hamer, *Heterocyclic Compounds-Cyanine Dyes and Related Compounds*, John Wiley & Sons, New York, 1964;

b) D. M. Sturmer, *Heterocyclic Compounds-Special Topics in Heterocyclic Chemistry*, Section 4, Chapter 8, pp. 482–515, John Wiley & Sons, New York, London, 1977;

c) *Zh. Org. Khim.*, vol. 17, No. 1, pp. 167–169 (1981), vol. 15, No. 2, pp. 400–407 (1979), vol. 14, No. 10, pp. 2214–2221 (1978), vol. 13, No. 11, pp. 2440–2443 (1977), vol. 19, No. 10, pp. 2134–2142 (1983), *UKr. Khim. Zh.*, vol. 40, No. 6, pp. 625–629 (1974), *Khim. Geterotsikl. Soedin*, No. 2, pp. 175–178 (1976), Russion Patents 420,643 and 341,823, JP-A-59-217761 (the term "JP-A" as used herein means an "unexamined published Japanese patent application", U.S. Pat. Nos. 4,334,000, 3,671,648, 3,623,881 and 3,573,921, European Patents 288261A1, 102781A2 and 102781A2, and JP-B-49-46930 (the term "JP-B" as used herein means an "examined Japanese patent publication".

A bond formation reaction such as an ether bond formation reaction, an amido bond formation reaction and an ester bond formation reaction at the portion —Q)ṅAr can be accomplished by any suitable method known in organic chemistry. In one method, the polycyclic portions represented by MET and Ar may be connected to each other. In another method, the polycyclic portion represented by Ar may be connected to the starting material and intermediate of the polymethine dye, and the reaction may then be effected to form the desired dye. In a still another method, the starting material and intermediate of the polycyclic portion represented by Ar may be connected to the polymethine dye portion, and the polycyclic portion represented by Ar may then be connected to the product. Any of these methods can be properly selected to effect the above mentioned synthesis. For the synthesis reaction to make these connections, reference can be made to "Shinjikken Kagaku Koza 14—Synthesis and Reaction of Organic Compounds", Vol. I-V, *Nihon Kagakukai*, Maruzen, Tokyo, 1977, Yoshio Ogata, *Organic Reactions*, Maruzen, Tokyo, 1962, L. F. Fieser and M. Fieser, *Advanced Organic Chemistry*, Maruzen, Tokyo, 1962, and many other references concerning organic synthesis reactions.

SYNTHESIS EXAMPLE 1

Synthesis of Exemplary Compound (1)

One half g of 3-(2-carboxymethyl)-3'-ethylthiacyanine iodide and 0.5 g of 4-hydroxyquinoline were added to 50 ml of pyridine. One g of N,N-dicyclohexylcarbodiimide was then added to the solution. The material was stirred at room temperature for 24 hours. Two hundred ml of ethyl acetate was added to the material, and a crystal was obtained by filtration.

The crystal was purified through silica gel chromatography (elute: 1:4 mixture of methanol and chloroform), and then recrystallized from methanol to obtain 45 mg of a yellow crystal which is Exemplary Compound (1).

$\lambda_{max}{}^{MeOH}$:=424nm ($\epsilon$=8.6×10$^4$)

SYNTHESIS EXAMPLE 2

Synthesis of Exemplary Compound (46)

i. Synthesis of 3-(4-Quinolyloxycarbonylethyl)Rhodanine

Three g of 4-hydroxyquinoline and 2 g of 3-carboxyethylrhodanine were added to 200 ml of tetrahydrofuran. Two g of N,N-dicyclohexylcarbodiimide was added to the solution. The material was stirred at room temperature for 8 hours. The resulting insoluble matters were removed by filtration. One l of ethyl acetate was added to the filtrate. The resulting crystal was filtered off to obtain 2.2 g of 3-(4-quinolyloxycarbonylethyl)rhodanine.

ii. Synthesis of Exemplary Compound (46)

One hundred ml of methanol and 0.5 ml of triethylamine were added to 0.5 g of the rhodanine compound thus obtained and 0.6 g of 2-{6-(N-acetyl-N-phenylamino)-1,3,5-hexatriethyl}-3-ethyl[1,2-d]naphthothiazolium iodide. The mixture was heated under reflux for 1 hour. The material was then allowed to cool. The resulting crystal was filtered off, dissolved in N,N-dimethylformamide, diluted with methanol for precipitation, and then purified through silica gel column chromatography (elute: 9:1 mixture of ethyl acetate and chloroform) to obtain 35 mg of a dark blue crystal which is Exemplary Compound (46).

$\lambda_{max}{}^{MeOH}$:=656nm ($\epsilon$=7.91×10$^4$)

The sensitizing dye to be used in the present invention may be used in an amount of 5×10$^{-8}$ to 5×10$^{-2}$ mol, preferably 1×10$^{-6}$ to 1×10$^{-3}$ mol, particularly preferably 2×10$^{-4}$ mol to 5×10$^{-4}$ mol per mol of silver halide.

The sensitizing dye to be used in the present invention may be directly dispersed in an emulsion. Alternatively, the sensitizing dye may be added to an emulsion in the form of solution in a proper solvent such as methyl alcohol, ethyl alcohol, methyl cellosolve, acetone, water, pyridine and mixture thereof. The dissolution may be facilitated by ultrasonic wave. In order to incorporate the infrared sensitizing dye in the emulsion, many methods can be used. In the method described in U.S. Pat. No. 3,469,987, a dye is dissolved in a volatile organic solvent, the solution is dispersed in a hydrophilic colloid, and the dispersion is then added to an emulsion. In the method described in JP-B-46-24185, a water-insoluble dye is dispersed in a water-soluble solvent without being dissolved in any solvent, and the dispersion is then incorporated into an emulsion. In the method described in U.S. Pat. No. 3,822,135, a dye is incorporated into an emulsion in the form of a solution in a surface active agent. In the method described in JP-A-51-74624, a dye is incorporated into an emulsion in the form of a solution obtained with a compound which provides for red shift. In the method described in JP-A-50-80826, a dye is incorporated into an emulsion in the form of a solution in an acid substantially free of water. Further, the methods described in U.S. Pat. Nos. 2,912,343, 3,342,605, 2,996,287, and 3,429,835 may also be used to incorporate the sensitizing dye into the emulsion. The above mentioned infrared sensitizing dye may be uniformly dispersed in a silver halide emulsion before being coated onto a proper support. The above mentioned infrared sensitizing dye may also be preferably incorporated into the system before chemical sensitization or during the latter half of the formation of silver halide grains.

For red- or infrared-sensitizing dyes among the polymethine dyes of the present invention, M band type sensitization can be effectively accomplished by supersensitization with a compound represented by general formula [IV], [V], [VI], [VII], [VIIIa], [VIIIb] or [VIIIc].

The supersensitizer represented by the general formula [IV] can be used in combination with the supersensitizers represented by general formula [V], [VI], [VII], [VIIIa], [VIIIb] or [VIIIc] to specifically improve its supersensitizing effect.

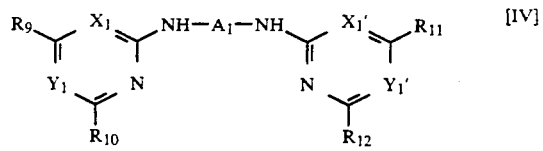

wherein A$_1$ represents a divalent aromatic residue; R$_9$, R$_{10}$, R$_{11}$ and R$_{12}$ each represents a hydrogen atom, a hydroxyl group, an alkyl group, an alkoxy group, an aryloxy group, a halogen atom, a heterocyclic nucleus, an alkylthio group, a heterocyclylthio group, an arylthio group, an amino group, an alkylamino group, an arylamino group, a heterocyclylamino group, an aralkylamino group, an aryl group or a mercapto group which may be substituted, with the proviso that at least one of A$_1$, R$_9$, R$_{10}$, R$_{11}$ and R$_{12}$ contains a sulfo group; and X$_1$ and Y$_1$, and X$_1'$ and Y$_1'$ each represents —CH= or —N=, respectively, with the proviso that at least one of X$_1$ and Y$_1$, and at least one of X$_1'$ and Y$_1'$ represents —N=.

In general formula [IV], more particularly, —A$_1$— represents a divalent aromatic residue which may contain —SO$_3$M group in which M represents a hydrogen atom or a cation which gives water solubility, e.g., sodium ion and potassium ion.

—A$_1$— is preferably selected from the group consisting of —A$_2$— and —A$_3$—. However, if R$_9$, R$_{10}$, R$_{11}$ or $R_{12}$ contains no —$SO_3M_{31}$ group, —$A_1$— is selected from the group consisting of —$A_2$—.
The term —$A_2$— represents one of the following:
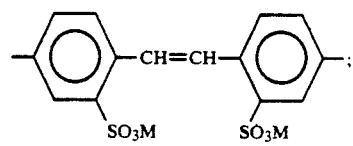 (1)
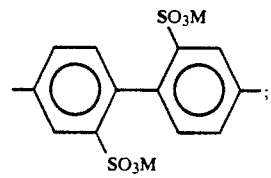 (2)
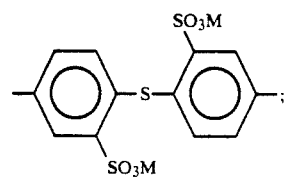 (3)
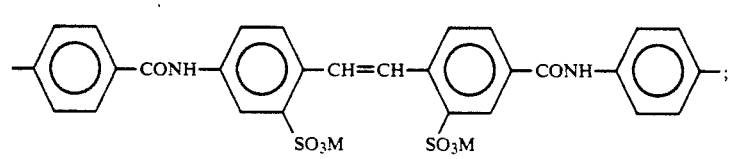 (4)
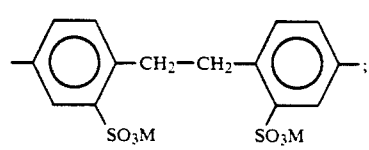 (5)
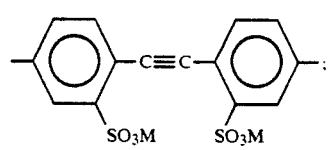 (6)
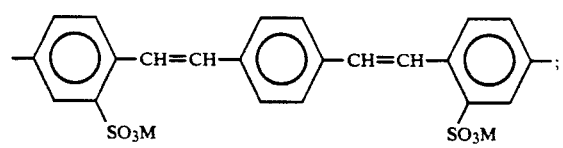 (7)
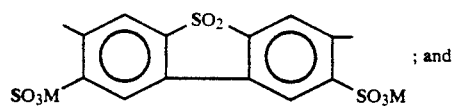 ; and (8)
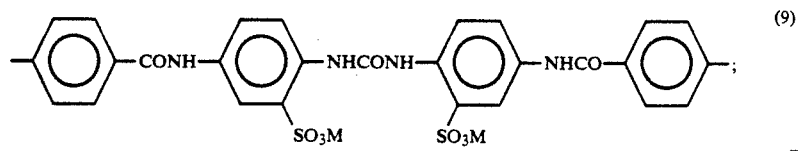 (9)
wherein M represents a hydrogen atom or a cation which gives water solubility.
The term —$A_3$— represents one of the following:
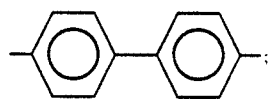 (1)

(2) 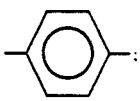

(3) 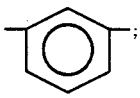

(4) 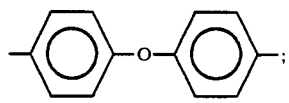

(5) 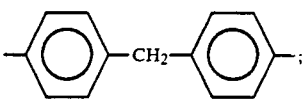

(6) 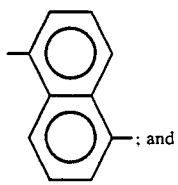

; and (7) 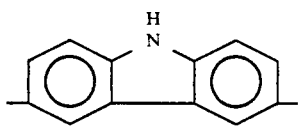

$R_9$, $R_{10}$, $R_{11}$ and $R_{12}$ each represents a hydrogen atom, a hydroxyl group, an alkyl group (preferably $C_{1-8}$ alkyl group, e.g., methyl, ethyl, n-propyl, n-butyl), an alkoxy group (preferably a $C_{1-8}$ alkoxy group, e.g., methoxy, ethoxy, propoxy, butoxy), an aryloxy group (e.g., phenoxy, naphthoxy, o-tolyloxy, p-sulfophenoxy), a halogen atom (e.g., chlorine, bromine), a heterocyclic nucleus (e.g., morpholinyl, piperidyl), an alkylthio group (e.g., methylthio, ethylthio), a heterocyclylthio group (e.g., benzothiazolylthio, benzoimidazolylthio, phenyltetrazolylthio), an arylthio group (e.g., phenylthio, tolylthio), an amino group, an alkylamino group, a substituted alkylamino group (e.g., methylamino, ethylamino, propylamino, dimethylamino, diethylamino, dodecylamino, cyclohexylamino, $\beta$-hydroxyethylamino, di-($\beta$-hydroxyethylamino, $\beta$-sulfoethylamino), arylamino group, substituted arylamino group (e.g., anilino, o-sulfoanilino, m-sulfoanilino, p-sulfoanilino, o-toluidino, m-toluidino, p-toluidino, o-carboxyanilino, m-carboxyanilino, p-carboxyanilino, o-chloroanilino, m-chloroanilino, p-chloroanilino, p-aminoanilino, o-anisidino, m-anisidino, p-anisidino, o-acetaminoanilino, hydroxyanilino, disulfophenylamino, naphthylamino, sulfonaphthylamino), heterocyclylamino group (e.g., 2-benzothiazolylamino, 2-pyridylamino), substituted or unsubstituted aralkylamino group (e.g., benzylamino, o-anisylamino, m-anisylamino, p-anisylamino), aryl group (e.g., phenyl) or mercapto group.

$R_9$, $R_{10}$, $R_{11}$ and $R_{12}$ may be the same or different. When —$A_1$— is —$A_2$—, it is necessary that at least one of $R_9$, $R_{10}$, $R_{11}$ and $R_{12}$ contains one or more sulfo groups (optionally in the form of free acid or salt thereof). $X_1$ and $Y_1$, and $X_1'$ and $Y_1'$ each represents —CH= or —N=. Preferably, $X_1$ and $X_1'$ each represents —CH=, and $Y_1$ and $Y_1'$ each represents —N=.

Specific examples of compounds represented by general formula [IV] to be used in the present invention are shown below, but the present invention should not be construed as being limited thereto:

(IV-1): Disodium 4,4'-bis[2,6-di(2-naphthoxy)pyrimidine-4-ylamino]stilbene-2,2'-disulfonate, (IV-2): Disodium 4,4'-bis[2,6-di(2-naphthylamino)-pyrimidine-4-ylamino]stilbene-2,2'-disulfonate, (IV-3): Disodium 4,4'-bis(2,6-dianilinopyrimidine-4-ylamino)stilbene-2,2'-disulfonate, (IV-4): Disodium 4,4'-bis[2-(2-naphthylamino)-6-anilinopyrimidine-4-ylamino]stilbene-2,2'-disulfonate, (IV-5): Ditriethylammonium 4,4'-bis[2,6-diphenoxypyrimidine-4-ylamino]stilbene-2,2'-disulfonate, (IV-6): Disodium 4,4'-bis[2,6-di(benzoimidazolyl-2-thio)pyrimidine-4-ylamino]stilbene-2,2'-disulfonate, (IV-7): Disodium 4,4'-bis[4,6-di(benzothiazolyl-2-thio)-pyrimidine-2-ylamino]stilbene-2,2'-disulfonate, (IV-8): Disodium 4,4'-bis[4,6-di(benzothiazolyl-2-amino]pyrimidine-2-ylamino]stilbene-2,2'-disulfonate, (IV-9): Disodium 4,4'-bis[4,6-di(naphthyl-2-oxy)pyrimidine-2-ylamino]stilbene-2,2'-disulfonate, (IV-10): Disodium 4,4'-bis(4,6-diphenoxypyrimidine-2-ylamino)stilbene-2,2'-disulfonate, (IV-11): Disodium 4,4'-bis(4,6-diphenylthiopyrimidine-2-ylamino)stilbene-2,2'-disulfonate, (IV-12): Disodium 4,4'-bis(4,6-dimercaptopyrimidine-2-ylamino)biphenyl-2,2'-disulfonate, (IV-13): Disodium 4,4'-bis(4,6-dianilino-triazine-2-ylamino)stilbene-2,2'-disulfonate, (IV-14): Disodium 4,4'-bis(4-anilino-6-hydroxytriazine-2-ylamino)stilbene-2,2'-disulfonate, (IV-15): Disodium 4,4'-bis[4,6-di(naphthyl-2-oxy)-pyrimidine-2-ylamino]bibenzyl-2,2'-disulfonate, (IV-16): Disodium 4,4'-bis(4,6-dianilinopyrimidine-2-ylamino)stilbene-2,2'-disulfonate, (IV-17): Disodium 4,4'-bis[4-chloro-6-(2-naphthyloxy)-pyrimidine-2-ylamino]biphenyl-2,2'-disulfonate, (IV-18): Disodium 4,4'-bis[4,6-di(1-phenyltetrazolyl-5-thio)pyrimidine-2-ylamino]stilbene-2,2'-disulfonate, (IV-19): Disodium 4,4'-bis[4,6-di(benzoimidazolyl-2-thio)pyrimidine-2-ylamino]stilbene-2,2'-disulfonate, and (IV-20): Disodium 4,4'-bis(4-naphthylamino-6-anilino-triazine-2-ylamino)stilbene-2,2''-disulfonate.

Preferred among these specific examples are compounds (IV-1) to (IV-6). Particularly preferred among these examples are compounds (IV-1), (IV-2), (IV-4), (IV-5), (IV-9), (IV-15), and (IV-20). The compound represented by general formula [IV] may be used in an amount of 0.01 to 5 g per mol of silver halide. The optimum amount of the compound represented by general formula [IV] to be used is in the range of 1/1 to 1/100, preferably ½ to 1/50, by weight ratio based on the sensitizing dye. The compound represented by the general formula [IV] may be preferably used in combination with the compound represented by general formula [V].

The compound represented by general formula [V] will be further described hereinafter.

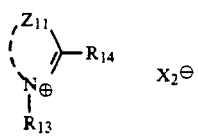
[V]

In general formula (V), $Z_{11}$ represents a nonmetallic atom group required to form a 5- or 6-membered nitrogen-containing heterocyclic group. This heterocyclic group may be condensed with a benzene ring or a naphthalene ring. Examples of such a heterocyclic group include thiazoliums (e.g., thiazolium, 4-methylthiazolium, benzothiazolium, 5-methylbenzothiazolium, 5-chlorobenzothiazolium, 5-methoxybenzothiazolium, 6-methylbenzothiazolium, 6-methoxybenzothiazolium, naphtho[1,2-d]thiazolium, naphtho[2,1-d]thiazolium), oxazoliums (e.g., oxazolium, 4-methyloxazolium, benzoxazolium, 5-chlorobenzoxazolium, 5-phenylbenzoxazolium, 5-methylbenzoxazolium, naphtho[1,2-d]oxazolium), imidazoliums (e.g., 1-methylbenzoimidazolium, 1-propyl-5-chlorobenzoimidazolium, 1-ethyl-5,6-cyclobenzoimidazolium, 1-allyl-5-trifluoromethyl-6-chlorobenzoimidazolium), selenazoliums (e.g., benzopentyl) or an alkenyl group (e.g., allyl). $R_{14}$ represents a hydrogen atom or a lower alkyl group (e.g., methyl, ethyl) $R_{13}$ and $R_{14}$ each may be a substituted alkyl group. $X_2^-$ represents an acid anion (e.g., $Cl^-$, $Br^-$, $I^-$, $ClO_4^-$).

Among the groups represented by $Z_{11}$, thiazoliums can be advantageously used. Substituted or unsubstituted benzothiazoliums can be more advantageously used. These groups include substituted groups regardless of whether there is reference thereto.

Specific examples of the compound represented by general formula [V] are shown below, but the present invention should not be construed as being limited thereto:

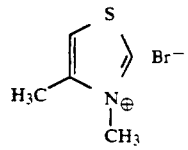
[V-1]

[V-2]

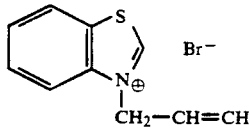
[V-3]

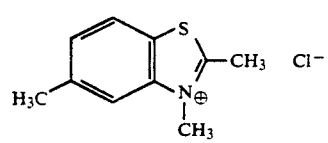
[V-4]

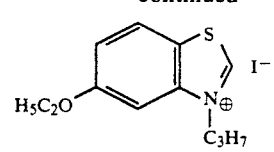
[V-5]

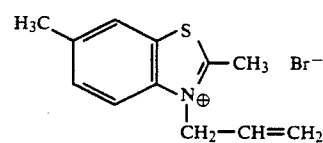
[V-6]

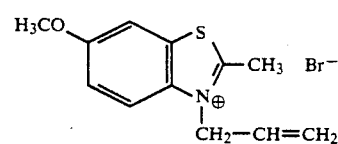
[V-7]

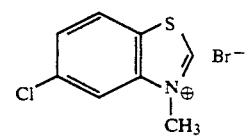
[V-8]

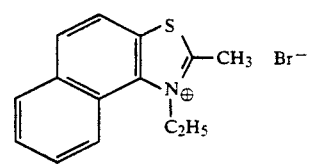
[V-9]

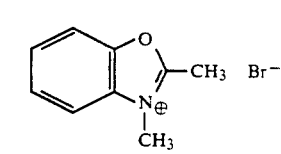
[V-10]

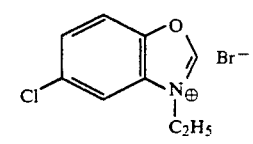
[V-11]

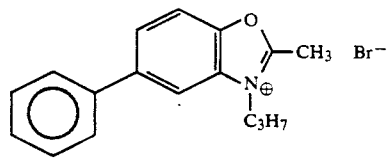
[V-12]

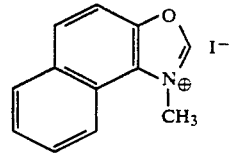
[V-13]

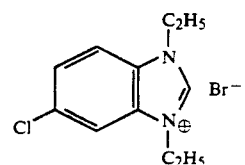
[V-14]

-continued

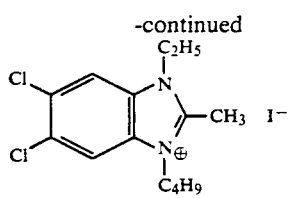
[V-15]

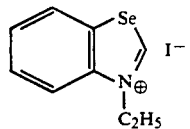
[V-16]

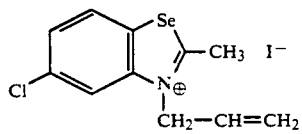
[V-17]

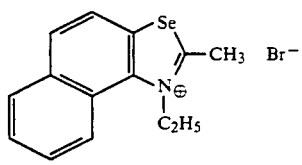
[V-18]

The compound represented by general formula [V] of the present invention can be advantageously used in an amount of about 0.01 to 5 g per mol of silver halide in the emulsion.

The weight ratio of the polymethine dye represented by general formula [I] to the compound represented by general formula [V] is preferably in the range of 1/1 to 1/300, particularly ½ to 1/50.

The compound represented by general formula [V] in the present invention may be dispersed in an emulsion directly or in the form of solution in a suitable solvent such as water, methyl alcohol, ethyl alcohol, propanol, methyl cellosolve and acetone or a mixture thereof. The compound of general formula [V] may be incorporated into the emulsion in the form of dispersion in a solution or colloid depending on the process for the incorporation of the sensitizing dye.

The compound represented by general formula [V] may be incorporated into the emulsion before or after the incorporation of the sensitizing dye represented by general formula [I]. Alternatively, the compound represented by general formula [V] and the sensitizing dye represented by general formula [I] may be dissolved in separate solvents, and then incorporated into an emulsion separately at the same time or in admixture.

The combination of the infrared sensitizing dye represented by general formula [I] and the compound represented by general formula [V] of the present invention may be advantageously used in combination with the compound represented by general formula [IV].

If the infrared-sensitized high silver chloride emulsion of the present invention comprises a heterocyclic mercapto compound in addition to the super-sensitizer represented by general formula [IV] or [V], remarkable improvements can be provided in sensitization and inhibition of fog as well as the stabilization of latent images and the dependence of linearity of gradation on development processing.

Examples of such a heterocyclic mercapto compound include heterocyclic compounds containing mercapto group-substituted thiazole, oxazole, oxazine, thiazoline, selenazole, imidazole, indoline, pyrrolidine, tetrazole, thiadiazole, quinoline or oxadiazole rings. Particularly preferred among these compounds are those comprising a carboxyl, sulfo, carbamoyl, sulfamoyl or hydroxyl group incorporated therein. JP-B-43-22883 descloses that mercapto heterocyclic compounds may be used as supersensitizers. In the present invention, such a mercapto heterocyclic compound can be used in combination with the compound represented by general formula [V] to attain a remarkable fog inhibiting effect and supersensitizing effect. Particularly preferred among these mercapto heterocyclic groups are those represented by general formulae [VI] and [VII]:

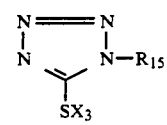
[VI]

wherein $R_{15}$ represents an alkyl group, an alkenyl group or an aryl group; and $X_3$ represents a hydrogen atom, an alkaline metal atom, an ammonium group or a precursor. Examples of such an alkaline metal atom include a sodium atom and a potassium atom. Examples of such an ammonium group include a tetramethylammonium group and a trimethylbenzylammonium group. The above mentioned precursor is a group which can become $X_3$=H or an alkaline metal under alkaline conditions. Examples of such a precursor include an acetyl group, a cyanoethyl group, and a methanesulfonylethyl group.

Examples of the alkyl group and alkenyl group represented by $R_{15}$ include unsubstituted, substituted and alicyclic alkyl and alkenyl groups. Examples of the substituents contained in the substituted alkyl groups include a halogen atom, a nitro group, a cyano group, a hydroxyl group, an alkoxy group, an aryl group, an acylamino group, an alkoxycarbonylamino group, a ureido group, an amino group, a heterocyclic group, an acyl group, a sulfamoyl group, a sulfonamido group, a thioureido group, a carbamoyl group, an alkylthio group, an arylthio group, a heterocyclic thio group, a carboxylic acid group, a sulfonic acid group, and salts thereof.

The above mentioned ureido group, thioureido group, sulfamoyl group, carbamoyl group and amino group may be unsubstituted, N-alkyl-substituted or N-aryl-substituted. Examples of the above mentioned aryl group include a phenyl group and a substituted phenyl group. Examples of the substituents contained in the substituted phenyl group include an alkyl group and the substituents set forth with reference to the above mentioned substituted alkyl group.

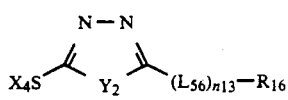
[VII]

wherein $Y_2$ represents an oxygen atom, a sulfur atom, =NH or =N—$(L_{57})n_{14}$—$R_{17}$; $L_{56}$ and $L_{57}$ each represents a divalent linking group; $R_{16}$ and $R_{17}$ each represents a hydrogen atom or an alkyl, alkenyl or aryl group which has the same meaning as those represented by $R_{15}$ in general formula [VI]; and $X_4$ has the same meaning as $X_3$ in general formula [VI].

Specific examples of divalent linking groups represented by L₅₆ and L₅₇ include:

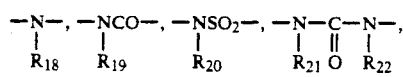

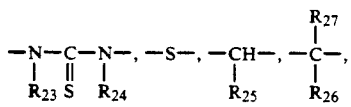

and combinations thereof.

The suffixes $n_{13}$ and $n_{14}$ each represents an integer 0 or 1. $R_{18}$, $R_{19}$, $R_{20}$, $R_{21}$, $R_{22}$, $R_{23}$, $R_{24}$, $R_{25}$ and $R_{26}$ each represents a hydrogen atom, an alkyl group or an aralkyl group.

The compound represented by general formula [VI] or [VII] may be incorporated in any layer in the silver halide photographic material, i.e., the light-sensitive or light-insensitive hydrophilic colloidal layers.

The amount of the compound represented by general formula [VI] or [VII] to be incorporated in the silver halide photographic material is preferably in the range of $1 \times 10^{-5}$ to $5 \times 10^{-2}$ mol, more preferably $1 \times 10^{-4}$ to $1 \times 10^{-2}$ mol per mol of silver halide. The compound represented by the general formula [VI] or [VII] may be incorporated in the color developer as a fog inhibitor, in an amount of $1 \times 10^{-6}$ to $1 \times 10^{-3}$ mol/l, more preferably $5 \times 10^{-6}$ to $5 \times 10^{-4}$ mol/l.

Specific examples of compounds represented by general formulae [VI] and [VII] are shown below, but the present invention should not be construed as being limited thereto. Specific examples of such compounds include those set forth in JP-A-62-269957 pp. 4-8. Particularly preferred among these compounds are the following compounds:

[VI-1]
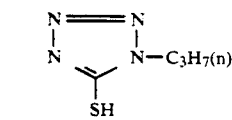

[VI-2]
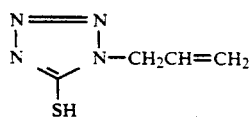

[VI-3]
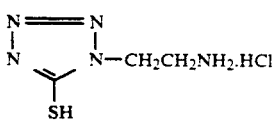

[VI-4]
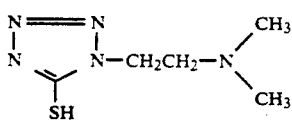

[VI-5]
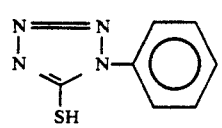

[VI-6]
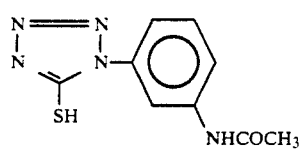

[VI-7]
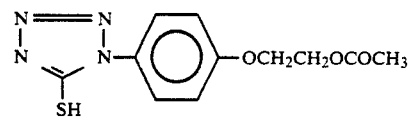

[VI-8]
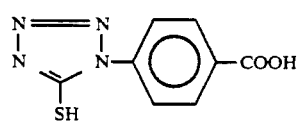

[VI-9]
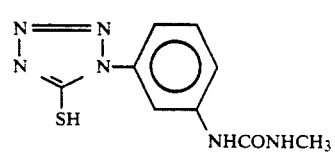

[VI-10]

[VII-1]
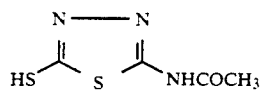

[VII-2]
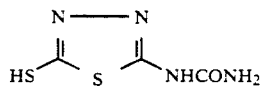

[VII-3]
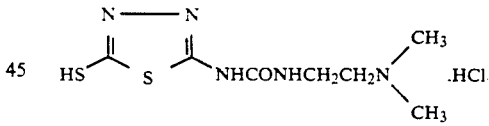

[VII-4]
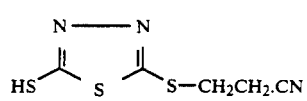

[VII-5]
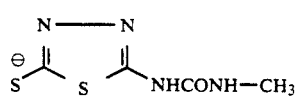

[VII-6]
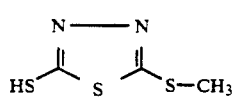

[VII-7]
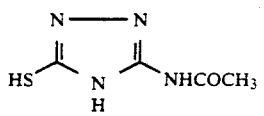

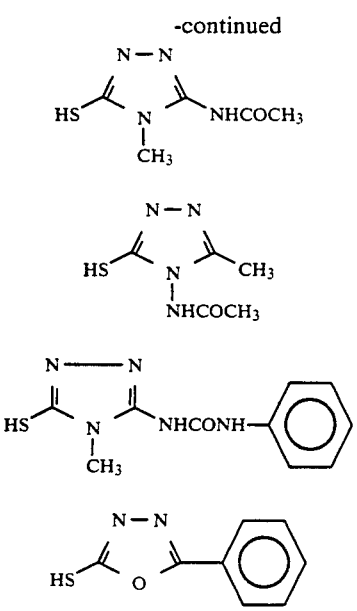

Furthermore, a condensate consisting of 2 to 10 condensed units of substituted or unsubstituted polyhydroxybenzene and formaldehyde represented by general formula [VIIIa], [VIIIb] or [VIIIc] may be used with the polymethine dye of the present invention as a supersensitizer. Such a compound also inhibits the deterioration of latent images over time and the deterioration of gradation as well.

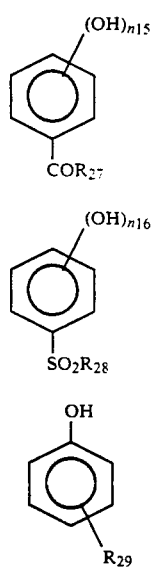

In these general formulae, $R_{27}$ and $R_{28}$ each represents OH, OM', $OR_{30}$, $NH_2$, $NHR_{30}$, $-N(R_{30})_2$, $-NHNH_2$ or $-NHNHR_{30}$ in which $R_{30}$ represents a $C_{1-8}$ alkyl group, allyl group or aralkyl group, and M' represents an alkaline metal or alkali earth metal.

$R_{29}$ represents OH or a halogen atom.

The suffixes $n_{15}$ and $n_{16}$ each represents an integer 1, 2 or 3.

Specific examples of substituted or unsubstituted polyhydroxybenzenes as components of an aldehyde condensate to be used in the present invention are shown below, but the present invention should not be construed as being limited thereto:

(VIII-1)—β-Resorcin
(VIII-2)—γ-Resorcin
(VIII-3)—Hydrazide 4-hydroxybenzoate
(VIII-4)—Hydrazide 3,5-hydroxybenzoate
(VIII-5)—p-Chlorophenol
(VIII-6)—Sodium hydroxybenzenesulfonate
(VIII-7)—p-Hydroxybenzoic acid
(VIII-8)—o-Hydroxybenzoic acid
(VIII-9)—m-Hydroxybenzoic acid
(VIII-10)—p-Dioxybenzene
(VIII-11)—Gallic acid
(VIII-12)—Methyl p-hydroxybenzoate
(VIII-13)—Amide o-hydroxybenzenesulfonate (VIII-14) Amide N-ethyl-o-hydroxybenzoate

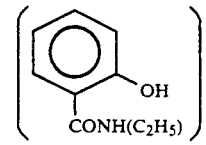

(VIII-15) Amide N-diethyl-o-hydroxybenzoate

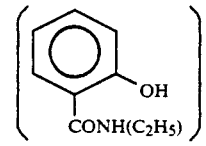

(VIII-16) o-Hydroxybenzoic acid-2-methylhydrazide

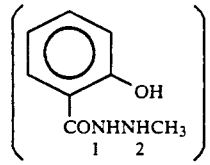

More specifically, the substituted or unsubstituted polyhydroxybenzene can be selected from the derivatives of compounds represented by general formulae (IIa), (IIb) and (IIc) set forth in JP-B-49-49504.

The silver halide emulsion to be used in the present invention may comprise any of silver bromide, silver bromoiodide, silver bromochloroiodide, silver bromochloride and silver chloride.

The silver halide grains to be incorporated in the silver halide emulsion may have a regular crystal form such as cube, octahedron, tetradecahedron and rhombododecahedron, irregular crystal form such as sphere and tablet, or a composite thereof, or a mixture of various crystal forms.

The above mentioned tabular grains are preferably tabular grains having a thickness of 0.5 μm or less, preferably 0.3 μm or less, and a diameter of 0.6 μm or more, wherein those having an average aspect ratio of 5 or more account for 50% or more thereof as calculated in terms of projected area.

The silver halide grains may have different phases or a uniform phase from the inner layer to the surface layer. The silver halide grains may be such that the latent images are formed mainly on the surface thereof (e.g., negative type emulsion) or the latent images are formed mainly inside (e.g., internal latent image type emulsion).

Silver halide emulsions which may be preferably used in the present invention will be further described hereinafter.

The silver halide emulsion of the present invention can enjoy a high sensitivity and its stability, especially the excellent stability of its latent images, by properly constructing silver halide grains, particularly so that a localized phase is provided on the surface thereof to spectrally sensitize the infrared wavelength range. When this structure is combined with a supersensitizing technique, the stability of the latent images can be obtained to an extent such that it can be accepted in a high silver chloride emulsion. This can be a surprising feature.

The silver halide to be used in the present invention may be silver chloride, silver bromide, silver bromochloride, silver bromochloroiodide, silver bromoiodide or the like. In particular, for the purpose of rapid processing, silver bromochloride or silver chloride substantially free of silver iodide and having a silver chloride content of 90 mol % or more, more preferably 95% or more, particularly 98% or more may be preferably used.

The silver halide emulsion which can be preferably used in the present invention is silver bromochloride or silver chloride substantially free of silver iodide 90 mol % or more of which consists of silver chloride. The term "substantially free of silver iodide" as used herein means "containing silver iodide in an amount of 0.5 mol % or less, preferably 0.1 mol % or less, more preferably none." The silver chloride content is preferably 95 mol % or more, particularly 98 mol % or more. Further, an emulsion comprising only pure silver chloride with only iron ions as impurities may be preferably used.

If the silver halide emulsion of the present invention contains silver bromide, the silver bromide may be preferably be present inside the grain or on the surface thereof in the form of silver bromide localized phase having a silver bromide content of 10 to 70 mol %.

In the present invention, the incorporation of iron ions in the silver halide emulsion grains can be easily accomplished by allowing a water-soluble iron compound to be present in the system during the formation of emulsion grains. These iron compounds are divalent or trivalent iron ion-containing compounds. These iron ion-containing compounds may preferably exhibit water solubility in a range which can be used in the present invention. The water solubility of iron ion-containing compound is preferably 10 mg or more, more preferably 100 mg or more, in 100 g of water at 25° C. In particular, these iron ion-containing compounds may be preferably iron complexes which can be easily incorporated into the interior of silver halide grains.

Specific examples of these compounds will be set forth below, but the present invention should not be construed as being limited thereto: ferrous arsenate, ferrous bromide, ferrous carbonate, ferrous chloride, ferrous citrate, ferrous fluoride, ferrous formate, ferrous gluconate, ferrous hydroxide, ferrous iodide, ferrous lactate, ferrous oxalate, ferrous phosphate, ferrous succinate, ferrous sulfate, ferrous thiocyanate, ferrous nitrate, ferrous ammonium nitrate, basic ferric acetate, ferric albuminate, ferric ammonium acetate, ferric bromide, ferric chloride, ferric chromate, ferric citrate, ferric fluoride, ferric formate, ferric glycerophosphate, ferric hydroxide, acidic ferric phosphate, ferric nitrate, ferric phosphate, ferric pyrophosphate, ferric sodium pyrophosphate, ferric thiocyanate, ferric sulfate, ferric ammonium sulfate, ferric guanidinium sulfate, ferric ammonium citrate, potassium hexacyanoferrate (II), ferrous potassium pentacyanoamine, ferric sodium ethylenedinitrilotetraacetate, potassium hexacyanoferrate (III), tris(bipyridyl)ferric chloride, potassium pentacyanitrosylferrate (III).

In particular, among these compounds, hexacyanoferrate (II), hexacyanoferrate (III), ferrous thiocyanate and ferric thiocyanate exhibit a remarkable effect.

These iron compounds can be incorporated in the silver halide grains by being present in a dispersant (e.g., gelatin or polymer having proective colloid properties) solution, an aqueous solution of a halogenated compound, an aqueous solution of a silver salt or other aqueous solutions.

In the present invention, the content of such an iron compound needs to be in the range of $10^{-7}$ to $10^{-3}$ mol, preferably $10^{-6}$ to $5\times 10^{-4}$ mol, per mol of silver halide.

The iron compound to be used in the present invention needs to be concentrated in a surface layer falling within 50% or less of the volume of the silver halide grain. The surface layer falling within 50% or less of the volume of the grain means a surface portion having a volume corresponding to 50% or less of the volume of a grain. The volume of the surface layer in which iron ions are localized is preferably in the range of 40% or less, more preferably 20% or less. By minimizing the volume of the surface layer, i.e., thinning the surface layer as much as possible, the effects of the present invention can be attained more remarkably.

The concentrated incorporation of iron ions into the surface layer can be accomplished by supplying an iron compound to the system at the same time as the supply of a solution of a water-soluble silver salt and an aqueous solution of halogenated compound required to form a surface layer after the formation of a silver halide grain core excluding the surface layer.

In the present invention, if the volumetric ratio of the surface layer into which the iron ions are incorporated to the core is too large, desensitization can easily occur when the emulsion grains are under pressure and a high sensitivity cannot be obtained.

In order to attain fully the effects of the present invention, the layer into which iron ions are incorporated is preferably limited to a surface layer falling within 50% or less of the volume of the grain. However, iron ions may be partially incorporated into the grain core, provided that the iron ion concentration in the surface layer is 10 or more times that in the grain core. If the iron iron concentration in the grain core exceeds this value, desensitization can easily occur when emulsion grains are under pressure, making it impossible to obtain the effects of the present invention.

In the present invention, the amount of iron ions to be incorporated in the silver halide grains is preferably in the aforementioned range. If it falls below the specified range, the effects of the present invention can hardly be obtained. On the contrary, if it exceeds the specified range, desensitization can easily occur under pressure.

In the present invention, metallic impurities other than iron ions may be further incorporated into the silver halide grains. Examples of such metallic impurities include ions of the group VIII metal such as cobalt, nickel, ruthenium, rhodium, palladium, osmium, iridium and platinum. Besides these metallic impurities, ions of metal such as copper, gold, zinc, cadium and lead can be incorporated into the silver halide grains.

The silver halide emulsion to be used in the present invention may be subjected to chemical sensitization such as sulfur sensitization, selenium sensitization, reduction sensitization and noble metal sensitization, singly or in combination. In particular, sulfur sensitization with an active gelatin or sulfur-containing compound reactive with a silver ion (e.g., thiosulfate, thiourea compound, mercapto compound, rhodanine compound), reduction sensitization with a reducing substance (e.g., stannous salt, amine salt, hydrazine derivative, formamidinesulfinic acid, silane compound), and noble metal sensitization with a metallic compound (e.g., metal complex, complexes of the group VIII metal such as Pt, Ir, Pd, Rh and Fe) can be used, singly or in combination. For monodisperse silver bromochloride emulsions which can be used in the present invention, sulfur sensitization or selenium sensitization may be particularly preferably used. In these sensitization processes, a hydroxyazaindene compound may be present in the system.

For the purpose of improving the shaprness of the images, the light-sensitive material of the present invention may preferably comprise in the hydrophilic colloidal layer a dye capable of being decolored by processing (particularly oxonol dye) as described in European Patent EP 0,337,490A2, pp. 27-76 in such an amount that the optical reflective density of the light-sensitive material at 680 nm reaches 0.70 or more or in the water-resistant resin layer in the support titanium oxide which has been subjected to surface treatment with a divalent, trivalent or tetravalent alcohol (e.g., trimethylol ethane) in an amount of 12% by weight or more, more preferably 14% by weight or more.

Further, the light-sensitive material of the present invention may preferably comprise the dye image preservability-improving compound described in European Patent EP 0,277,589A2 in combination with a coupler, particularly a pyrazoloazole coupler.

In particular, Compound (F) which undergos chemical bonding with an aromatic amine developing agent remaining after color development to produce a chemically inert and substantially colorless compound and/or Compound (G) which undergoes chemical bonding with the oxidation product of an aromatic amine developing agent left after color development to produce a chemically inert and substantially colorless compound, may be preferably used singly or in combination to inhibit the occurrence of stain or other side effects caused by the production of colored dyes due to the reaction of a color developing agent or its oxidation product remaining in the film and a coupler during storage after processing.

Moreover, the light-sensitive material of the present invention may preferably comprise the fungicides described in JP-A-63-271247 to inhibit the proliferation of various fungi or bacteria in the hydrophilic colloidal layer which causes the deterioration of images.

As the support to be used in the light-sensitive material of the present invention, a white polyester support or a support provided with a white pigment-containing layer on the silver halide emulsion layer side for display may be used. Further, in order to improve sharpness, an antihalation layer may be preferably coated on the silver halide emulsion layer side or the other side of the support. In particular, the transmission density of the support may be preferably set at 0.35 to 0.8 so that the display can be observed by reflected light or transmitted light.

The light-sensitive material of the present invention may be exposed to visible light or infrared light. The exposure may be effected under low intensity or under high intensity for a short period of time. In the latter case, a laser scanning exposure process in which the exposure time per picture element is less than $10^{-4}$ seconds may be preferably used.

The exposure may be preferably effected with a band stop filter as described in U.S. Pat. No. 4,880,726. In this manner, light color stain can be eliminated to improve remarkably color reproducibility.

The light-sensitive material which has been exposed to light is then subjected to ordinary black-and-white or color development. For color light-sensitive materials, color development may be preferably followed by a blix for the purpose of rapid processing. In particular, if the aforementioned high silver chloride emulsion is used, the pH value of the blix solution is preferably in the range of about 6.5 or less, more preferably about 6 or less, for the purpose of improving desilvering.

With the silver halide emulsion of the present invention, other materials (e.g., additives), photographic constituent layers (e.g., layer arrangement) and processing methods and processing additives for the processing of the light-sensitive material of the present invention, those described in the following patents, particularly European Patent EP 0,355,660A2 (Japanese Patent Application No. 1-107011) may be used.

| Photographic constituent element | JP-A-62-215272 | JP-A-2-33144 | EP0,355,660A2 |
| --- | --- | --- | --- |
| Silver halide emulsion | Line 6, upper right column on p 10-line 5, lower left column on p 12 & last line 4, lower right column on p 12 - line 17, upper left column on p 13 | Line 16, upper right column on p 28-line 11, lower right column on p 29 & line 2 - line 5 on p 30 | Line 53 on p 45-line 3 on p 47 & line 20-line 22 on p 47 |
| Silver halide solvent | Line 6 - line 14, lower left column on p 12 & last line 3, upper left column on p 13 - last line, lower left column on p 18 | — | — |
| Chemical sensitizer | Last line 3, lower left column - last line 5, lower right column on p 12 & line 1, lower right column on p 18 - last line 9, upper right column on p 22 | Line 12 - last line, lower right column on p 29 | Line 4 - line 9 on p 47 |
| Spectral sensitizer | Last line 8, upper right column on p 22 - last | Line 1 - line 13, upper left column on p 30 | Line 10 - line 15 on p 47 |

| Photographic constituent element | JP-A-62-215272 | JP-A-2-33144 | EP0,355,660A2 |
|---|---|---|---|
| (spectral sensitizing process) | line on p 38 | | |
| Emulsion stabilizer | Line 1, upper left column on p 39 - last line, upper right column on p 72 | Line 14, upper left column - line 1, upper right column on p 30 | Line 16 - line 19 on p 47 |
| Development accelerator | Line 1, lower left column on p 72 - line 3, upper right column on p 91 | — | — |
| Color coupler (cyan, magenta, yellow couplers) | Line 4, upper right column on p 91 - line 6, upper left column on p 121 | Line 14, upper right column on p 3 - last line, upper left column on p 18 & line 6, upper right column on p 30 - line 11, lower right column on p 35 | Line 15 - line 27 on p 4, line 30 on p 5 - last line on p 28, line 29 - line 31 on p 45 & line 23 on p 47 - line 50 on p 63 |
| Color intensifier | Line 7, upper left column on p 121 - line 1, upper right column on p 125 | — | — |
| Ultraviolet absorbent | Line 2, upper right column on p 125 - last line, lower left column on p 127 | Line 14, lower right column on p 37 - line 11, upper left column on p 38 | Line 22 - line 31 on p 65 |
| Discoloration inhibitor (image stabilizer) | Line 1, lower right column on p 127 - line 8, lower left column on p 137 | Line 12, upper right column on p 36 - line 19, upper left column on p 37 | Line 30 on p 4 - line 23 on p 5, line 1 on 39 - line 25 on p 45, line 33 - line 40 on p 45 & line 2 - line 21 on p 65 |
| High boiling and/or low boiling organic solvent | Line 9, lower left column on p 137 - last line, upper right column on p 144 Line 1, lower | Line 14, lower right column on p 35 - last line 4, upper left column on p 36 | Line 1 - line 51 on p 64 |
| Method for dispersion of photographic additives | lower left column on p 144 - line 7, upper right column on p 146 | Line 10, lower right column on p 27 - last line, upper left column on p 28 & line 12, lower right column on p 35 - line 7, upper right column on p 36 | Line 51 on p 63 - line 56 on p 64 |
| Film hardener | Line 8, upper right column on p 146 - line 4, lower left column on p 155 | — | — |
| Developing agent precursor | Line 5, lower left column on p 155 - line 2, lower right column on p 155 | | |
| Development inhibitor-releasing compound | Line 3 - line 9, lower right column on p 155 | — | — |
| Support | Line 19, lower right column on p 155 - line 14, upper left column on p 156 | Line 18, upper right column on p 38 - line 3, upper left column on p 39 | Line 29 on p 66 - line 13 on p 67 |
| Arrangement of light-sensitive layers | Line 15, upper left column on p 156 - line 14, lower right column on p 156 | Line 1 - line 15, upper right column on p 28 | Line 41 - line 52 on p 45 |
| Dye | Line 15, lower right column on p 156 - last line, lower right column on p 184 | Line 12, upper left column - line 7, upper right column on p 38 | Line 18 - line 22 on p 66 |
| Color stain inhibitor | Line 1, upper left column on p 185 - line 3, lower right column on p 188 | Line 8 - line 11, upper right column on p 36 | Line 57 on p 64 - line 1 on p 65 |
| Gradation adjustor | Line 4 - line 8, lower right column on p 188 | — | — |
| Stain inhibitor | Line 9, lower right column on p 188 - line 10, lower right column on p 193 | Last line, upper left column - line 13, lower right column on p 37 | Line 32 on p 65 line 17 on p 66 |
| Surface active agent | Line 1, lower left column on p 201 - last line, upper right column on p 210 | Line 1, upper right column on p 18 - last line, lower right column on p 24 & last line 10, lower left column - line 9, lower right column on p 27 | — |
| Fluorine-containing compound (as antistatic agent, coating aid, lubricant, | Line 1, lower left column on p 210 - line 5, lower left column on p 222 | Line 1, upper left column on p 25 - line 9, lower right column on p 27 | — |

| Photographic constituent element | JP-A-62-215272 | JP-A-2-33144 | EP0,355,660A2 |
|---|---|---|---|
| adhesion inhibitor) | | | |
| Binder (hydrophilic colloid) | Line 6, lower left column on p 222 - last line, upper left column on p 225 | Line 8 - line 18, upper left column on p 38 | Line 23 - line 28 on p 66 |
| Thickening agent | Line 1, upper right column on p 225 - line 2, upper right column on p 227 | — | — |
| Antistatic agent | Line 3, upper right column on p 227 - line 1, upper left column on p 230 | — | — |
| Polymer latex | Line 2, upper left column on p 230 - last line on p 239 | — | — |
| Matting agent | Line 1, upper left column on p 240 - last line, upper right column on p 240 | — | — |
| Photographic processing method (processing step, additives, etc.) | Line 7, upper right column on p 3 - line 5, upper right column on p 10 | Line 4, upper left column on p 39 - last line, upper left column on p 42 | Line 14 on p 67 - line 28 on p 69 |

Note) Items set forth in the above cited JP-A-62-215272 include those set forth in Amendment filed on March 16, 1987, attached thereto.

As the yellow coupler among the above mentioned color couplers, there may be preferably used a short wavelength type yellow coupler as described in JP-A-63-231451, JP-A-63-123047, JP-A-63-241547, JP-A-1-173499, JP-A-1-213648 and JP-A-1-250944.

Dyes to be used in the present invention will be further described hereinafter.

In the silver halide photographic material, the photographic emulsion layer and other hydrophilic colloidal layers are frequently colored for the purpose of absorbing a specific long wavelength light.

When it is necessary to control the spectral composition of light to be incident on the photographic emulsion layer, colored layer is normally provided farther from the support than is the photographic emulsion layer. This colored layer is called a filter layer. When there is a plurality of photographic emulsion layers, the filter layer may be positioned in between these photographic emulsion layers.

In order to inhibit image blurring or halation caused by the light scattered during or after transmission through the photographic emulsion layer when it is reflected by the interface between the emulsion layer and the support or the surface of the light-sensitive material opposite the emulsion layer and then again incident on the photographic emulsion layer, a colored layer called antihalation layer may be provided between the photographic emulsion layer and the support or on the opposite side of the support from the photographic emulsion layer. When there is a plurality of photographic emulsion layers, an antihalation layer may be provided between these layers.

In order to inhibit the deterioration of image sharpness (the phenomenon called irradiation) due to the scattering of light in the photographic emulsion layer, the photographic emulsion layer may be colored.

A dye is normally incorporated into these hydrophilic colloidal layers to be colored. Such a dye needs satisfy the following requirements:

(1) such a dye must exhibit a proper spectral absorption depending on its purpose ;

(2) such a dye must be photochemically inert, specifically, such a dye must not give chemically adverse effects for the properties of silver halide photographic emulsion layer, e.g., sensitivity drop, latent image deterioration and fogging;

(3) such a dye must not be decolored or eluted in the processing solution or washing water during photographic processing to leave harmful colors on the photographic light-sensitive material after processing;

(4) such a dye must not be diffused from the layer thus dyed to other layers; and (5) such a dye must exhibit an excellent age stability in solutions or photographic light-sensitive materials so that it is not discolored.

In particular, if the colored layer is a filter layer or an antihalation layer provided on the same side of the support as the photographic emulsion layer, it is frequently necessary that these layers be selectively colored so that other layers are not substantially colored. If these specific layers are not selectively colored, harmful spectral effects are exerted on the other layers and the effects of the filter or antihalation layer are eliminated. However, if the layer containing such a dye and other hydrophilic colloidal layers are brought into contact with each other under wet conditions, the dye is frequently partly diffused from the former layer to the latter layers. In order to inhibit this phenomenon, the following methods can be effectively used.

For example, in the method disclosed in U.S. Pat. Nos. 2,548,564, 4,124,386 and 3,625,694, a hydrophilic polymer having a charge opposite that of the anionic dye dissociated is allowed to be present with the dye in the layer as a mordant so that the dye is localized in a specific layer by an interaction with the dye molecules.

In another method as disclosed in JP-A-56-12639, JP-A-55-155350, JP-A-55-155351, JP-A-63-27838 and JP-A-63-197943, and European Patent 15,601, a water-insoluble dye solid is used to dye a specific layer.

In a further method disclosed in U.S. Pat. Nos. 2,719,088, 2,496,841 and 2,496,843, and JP-A-60-45237, finely divided metallic salt grains having a dye adsorbed thereon are used to dye a specific layer.

Examples of the dyes which can be used for this purpose include oxonol dyes containing pyrazolone nucleus or barbituric acid nucleus as described in British Patents 506,385, 1,177,429, 1,311,884, 1,338,799, 1,385,371, 1,467,214, 1,433,102 and 1,553,516, JP-A-48-85130, JP-A-49-114420, JP-A-52-117123, JP-A-55-161233 and JP-A-59-111640, JP-B-39-22069, JP-B-43-13168 and JP-B-62-273527, and U.S. Pat. Nos. 3,247,127, 3,469,985 and 4,078,933, other oxonol dyes as described in U.S. Pat. Nos. 2,533,472 and 3,379,533, British Patent 1,278,621, and JP-A-1-13447 and JP-A-1-183652, azo dyes as described in British Patents 575,691, 680,631, 599,623, 786,907, 907,125 and 1,045,609, U.S. Pat. No. 4,255,326, and JP-A-59-211,043, azomethine dyes as described in JP-A-50-100116 and JP-A-54-118247, and British Patents 2,014,598 and 750,031, anthraquinone dyes as described in U.S. Pat. No. 2,865,752, arylidene dyes as described in U.S. Pat. Nos. 2,538,009, 2,688,541 and 2,538,008, British Patents 584,609 and 1,210,252, JP-A-50-40625, JP-A-51-3623, JP-A-51-10927 and JP-A-54-118247, and JP-B-48-3286 and JP-B-59-37303, styryl dyes as described in JP-B-28-3082, JP-B-44-16594 and JP-B-59-28898, triarylmethane dyes as described in British Patents 446,583 and 1,335,422, and JP-A-59-228250, melocyanine dyes as described in British Patents 1,075,653, 1,153,341, 1,284,730, 1,475,228 and 1,542,807, and cyanine dyes as described in U.S. Pat. Nos. 2,843,486 and 3,294,539, and JP-A-1-291247.

In particular, as the near infrared light-absorbing dye there may be preferably used a compound having a structure represented by general formula (A):

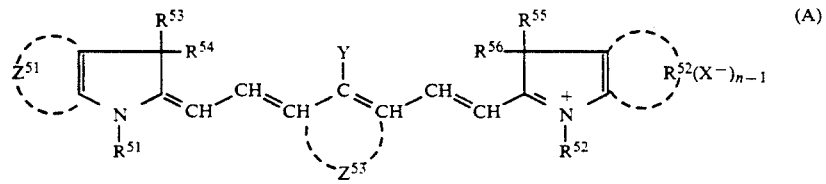

(A)

wherein $R^{51}$, $R^{52}$, $R^{53}$, $R^{54}$, $R^{55}$ and $R^{56}$ may be the same or different and each represents a substituted or unsubstituted alkyl group; $Z^{51}$ and $Z^{52}$ each represents a nonmetallic atom group required to form a naphtho condensed ring containing two or more sulfonic acid groups or a nonmetallic atom group required to form a benzo condensed ring containing one or more sulfonic acid groups; $Z^{53}$ represents a nonmetallic atom group required to form a 5- or 6-membered ring; Y represents a hydrogen atom or a monovalent group; X represents an anion; and n represents an integer 1 or 2, with the proviso that when the dye molecules form an intramolecular salt, n is 1.

As cyan couplers there may be preferably used diphenylimidazole cyan couplers as described in JP-A-2-33144. In addition to these couplers, 3-hydroxypyridine cyan couplers as described in European Patent EPO,333,185A2 (particularly couplers obtained by incorporating chlorine-separatable group in a 4-equivalent coupler (42) such that it is converted to a 2-equivalent coupler, and Couplers (6) and (9)), and cyclic active methylene cyan couplers as described in JP-A-64-32260 (particularly Exemplary Couplers 3, 8, 34) may be preferably used.

In order to obtain photographic images, exposure may be effected by an ordinary method. In particular, any of known various light sources such as natural light (sunlight), a tungsten lamp, a fluorescent lamp, a mercury vapor lamp, a xenon arc lamp, a carbon arc lamp, a xenon flash lamp and a cathode tube flying spot can be used. The exposure time can of course range from 1/1000 seconds to 1 second, which range is normally used by cameras. The exposure time can be less than 1/1000 seconds, e.g., $1/10^4$ to $1/10^5$ seconds, which range is provided by a xenon flash lamp or a cathode ray tube. The exposure time also can be greater than 1 second. If necessary, a color filter can be used to adjust the spectral composition of light to be used for exposure. A laser light can be used for exposure. Light emitted from a fluorescent substance excited by an electron ray, X ray, γ ray, α ray or the like can be also used for exposure.

In order to emit a laser light, a semiconductor laser may be preferably used. Specific examples of such a semiconductor laser include those made of $In_{1-x}Ga_xP$ (~700 nm), $GaAs_{1-x}P_x$ (610–900 nm), $Ga_{1-x}Al_xAs$ (690–900 nm), InGaAsP (1100–1670 nm), AlGaAsSb (1250–1400 nm), etc. In addition to the above mentioned semiconductor lasers, YAG laser (1064 nm) in which Nb:YAG crystal is excited by $GaAs_xP_{(1-x)}$ light-emitting diode may be used. Preferably, an optimum laser is selected from semiconductor lasers which emit light fluxes of 670 nm, 680 nm, 750 nm, 780 nm, 810 nm, 830 nm and 880 nm.

Further, a nonlinear optical effect can be utilized. A second harmonic generating element (SHG element) is adapted to utilize a nonlinear optical effect to halve the wavelength of the laser light. Examples of such SHG elements include those utilizing as a nonlinear optical crystal CD*A and KD*P (see Laser Gakkai, "Laser Handbook", Dec. 15, 1982, pp. 122–139). Moreover, an LiNbO3 light guide element in which a light guide passage has been formed in a LiNbO3 crystal by ion-exchanging Li+ with H+ can be used (see NIKKEI ELECTRONICS, Jul. 14, 1986, No. 399, pp. 89–90).

In the present invention, an output apparatus as described in Japanese Patent Application No. 63-226552 can be used.

The light-sensitive material of the present invention may comprise on a support a yellow coupler-containing light-sensitive layer (YL), a magenta coupler-containing light-sensitive layer (ML), a cyan coupler-containing light-sensitive layer (CL), a protective layer (PL), an interlayer (IL), and optionally a colored layer capable of being decolored during development, particularly an antihalation layer (AH). YL, ML and CL are spectrally sensitive to at least three light fluxes having different main wavelengths, respectively. The main sensitive wavelength of YL, ML and CL are 30 nm or more, preferably 50 to 100 nm apart from each other. In its main sensitive wavelength, one light-sensitive layer exhibits a sensitivity difference of at least 0.8 log E (quantity of light), preferably 1.0 or more, from the other sensitive layers. Preferably, at least one of these light-sensitive layers is sensitive to light of a wavelength longer than 670 nm. More preferably, at least one further light-sensitive layer is sensitive to light of a wavelength longer than 750 nm.

For example, any light-sensitive layer arrangement can be used as set forth in the table below. In the table, R indicates red-sensitization. IR-1 and IR-2 indicate spectral sensitization in different infrared wavelength ranges.

TABLE A

|  | 1 | 2 | 3 | 4 | 5 |
|---|---|---|---|---|---|
| Protective layer | PL | PL | PL | PL | PL |
| Light-sensitive layer unit | YL = R<br>ML = IR-1<br>CL = IR-2<br>(AH) | YL = IR-2<br>ML = IR-1<br>CL = R<br>(AH) | YL = R<br>CL = IR-1<br>ML = IR-2<br>(AH) | ML = R<br>YL = IR-1<br>CL = IR-2<br>(AH) | CL = R<br>YL = IR-1<br>ML = IR-2<br>(AH) |
| Support |  |  |  |  |  |

|  | 6 | 7 | 8 | 9 |
|---|---|---|---|---|
| Protective layer | PL | PL | PL | PL |
| Light-sensitive layer unit | CL = R<br>ML = IR-1<br>YL = IR-2<br>(AH) | CL = IR-2<br>ML = IR-1<br>YL = R<br>(AH) | ML = IR-2<br>CL = IR-1<br>YL = R<br>(AH) | ML = R<br>CL = IR-1<br>YL = IR-2<br>(AH) |
| Support |  |  |  |  |

In the present invention, the light-sensitive layer which is spectrally sensitive to light of a wavelength longer than 670 nm can be imagewise exposed to a laser light flux. Therefore, such a light-sensitive layer preferably exhibits a spectral sensitivity distribution of main sensitivity wavelength ±25 nm, preferably main sensitivity wavelength ±15 nm. On the other hand, the spectral sensitivity distribution of the present invention in a wavelength range longer than 670 nm, particularly in infrared range relatively becomes broad. Therefore, the spectral sensitivity distribution of the light-sensitive layer may be preferably modified with a dye, preferably by fixing a dye in a specific layer. To this end, the dye is incorporated into a colloidal layer in a nondiffusive state in such a manner that it can be decolored during development. In one approach, a fine dispersion of a dye solid substantially insoluble in water having a pH value of 7 and insoluble in water of a pH value of 7 or more may be used. In another approach, an acidic dye may be used in combination with a polymer or polymer latex which provides cation sites. For these approaches, there can be effectively used dyes represented by general formulae (VI) and (VII) in JP-A-63-197947. In particular, for the former approach, a dye containing carboxyl group may be effectively used.

The photographic light-sensitive material of the present invention can be applied to color negative films for picture taking (general-purpose, motion picture, etc.), color reversal films (slide, motion picture, etc.), color photographic papers, color positive films (motion picture, etc.), color direct positive films, color reversal photographic papers, heat-developable color light-sensitive materials, color photographic light-sensitive materials for picture taking (lithographic film, scanner film, etc.), color x-ray photographic light-sensitive materials (direct/indirect medical use, industrial use, etc.), color diffusion transfer photographic light-sensitive materials (DTR), etc.

The present invention will be further described in the following examples, but the present invention should not be construed as being limited thereto.

EXAMPLE 1

To a gold/sulfur-sensitized emulsion of tabular silver bromoiodide grains (mean diameter: 0.82 μm; mean diameter/thickness ratio: 11.2; pAg: 8.2; pH: 6.5) prepared according to the method disclosed in Example 1 in JP-A-60-131533 were added compounds set forth in Table 1 at a temperature of 40° C. To the material was then added sodium salt of 2,4-dichloro-6-hydroxy-1,3,5-triazine as a gelatin hardener. The material was coated on a cellulose triacetate support. At the same time, a protective layer containing as the main component a gelatin containing a surface active agent and the aforementioned gelatin hardener was coated on the emulsion layer.

These specimens thus prepared were then each divided into three batches. One of these bathes was stored at a temperature of −30° C. for 1 year. Another batch was stored under natural conditions for 1 year. The remaining batch was stored at a temperature of −30° C., and then at a temperature of 50° C. and a relative humidity of 80% for 3 days before exposure. These three batches of specimens were then subjected to exposure for sensitometry through a sharp cut filter transmitting light of a wavelength longer than 520 nm by means of Type FWH sensitometer available from Fuji Photo Film Co., Ltd. (equipped with an ultraviolet-absorbing filter and a tungsten light source with a color temperature of 2,854° K.), developed with the developer described later, bleached, rinsed, and then dried.

The specimens thus processed were then measured for density and sensitivity by means of a densitometer available from Fuji Photo Film Co., Ltd. The sensitivity value is represented by the reciprocal of the quantity of light required to give a density of fog density plus 0.2. Table 1 shows sensitivity values relative to that of the specimens which had been stored at a temperature of −30° C. as 100. For fog density, Table 1 also shows values relative to that of specimens which had been stored at a temperature of −30° C. as 100.

| Composition of developer | |
|---|---|
| Methol | 2.5 g |
| 1-Ascorbic acid | 10.0 g |
| Potassium bromide | 1.0 g |
| Navox | 35.0 g |
| Water to make | 1.0 l (pH 9.8) |

TABLE 1

| Specimen No. | Polymethine dye and its added amount $\times 10^{-5}$ mol/molAg | | Stored at $-30°$ C. | | Stored at 80% RH, 50° C., 3 days | | Stored under natural conditions | |
|---|---|---|---|---|---|---|---|---|
| | | | Sensitivity | Fog | Relative sensitivity | Fog | Relative sensitivity | Fog |
| 1-1 | A-1 | 70 | 100 | 0.02 | 93 | 0.02 | 94 | 0.02 |
| 1-2 | A-2 | 70 | 100 | 0.02 | 96 | 0.03 | 94 | 0.02 |
| 1-3 | A-3 | 70 | 100 | 0.02 | 94 | 0.02 | 95 | 0.02 |
| 1-4 | (11) | 70 | 100 | 0.02 | 100 | 0.02 | 98 | 0.02 |
| 1-5 | A-4 | 1.0 | 100 | 0.02 | 65 | 0.04 | 55 | 0.03 |
| 1-6 | A-5 | 1.0 | 100 | 0.02 | 73 | 0.03 | 64 | 0.03 |
| 1-7 | (29) | 1.0 | 100 | 0.02 | 93 | 0.03 | 86 | 0.02 |
| 1-8 | (31) | 1.0 | 100 | 0.02 | 99 | 0.02 | 87 | 0.02 |

(Note: Specimens 1-1, 1-2, 1-3, 1-5 and 1-6 are comparative while the others are according to the present invention)

Table 1 shows that the specimens of the present invention exhibit a small increase or decrease in sensitivity during ageing. In particular, the polymethine dyes A-4 and A-5, which exhibit Eox of 0.60 (VvsSCE) or lower, have a tendency to show a greater decrease in sensitivity than the polymethine dyes (29) and (31). The polymethine dyes A-1, A-2, and A-3, which exhibit Eox of 0.60 (VvsSCE) or higher, have a tendency to show a greater decrease in sensitivity than the polymethine dye (11). The tendency shown in a case of the polymethine dye A-4 or A-5 is more remarkable than in a case of the polymethine dye A-1, A-2 or A-3. On the other hand, the polymethine dyes of the present invention (29) and (31) exhibit less decrease in sensitivity than A-4 and A-5 and thus are extremely useful.

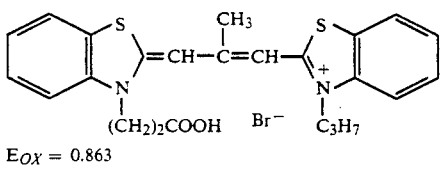

$E_{OX} = 0.863$

A-1

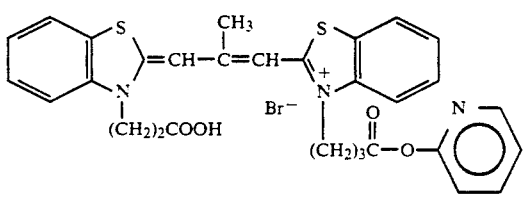

$E_{OX} = 0.863$

A-2

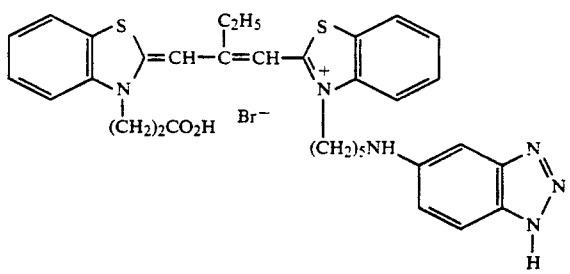

$E_{OX} = 0.862$

A-3

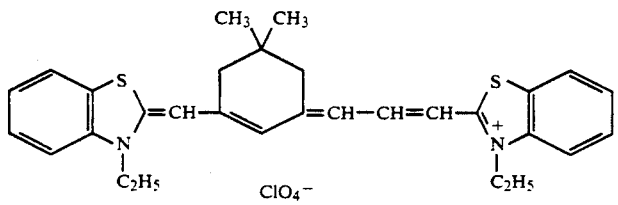

$E_{OX} = 0.374$

A-4

-continued

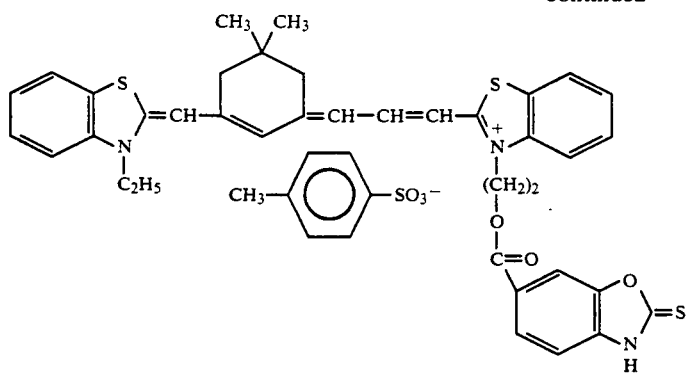

A-5

$E_{OX} = 0.375$

EXAMPLE 2

An emulsion of cubic silver bromide grains was prepared according to a method disclosed in Example 1 in JP-A-1-223441. The silver bromide grains contained in the silver bromide emulsion thus obtained were monodisperse grains with a mean side length of 0.74 μm (fluctuation coefficient: 10.6%). This emulsion was adjusted at a temperature of 40° C. at a pH value of 6.3 and a pAg value of 8.4. The emulsion was then ripened with chloroauric acid and sodium thiosulfate at a temperature of 55° C. so that it was thereby subjected to optimum gold and sulfur sensitization.

The compounds set forth in Table 2 were then added to the emulsion at a temperature of 40° C. To the emulsion were then added sodium salt of 2-hydroxy-4,6-dichloro-1,3,5-triazine and sodium dodecylbenzenesulfonate in amounts of 0.1 g per kg of emulsion, respectively. The emulsion was coated on a polyethyleneterephthalate film base with a protective layer in the same manner as in Example 1.

These specimens thus prepared were each then divided into three batches. One of these batches was stored at a temperature of $-30°$ C. for 3 days. Another batch was stored at a temperature of 50° C. and a relative humidity of 80% for 3 days. The remaining batch was stored at room temperature under an oxygen partial pressure of 10 atms. for 3 days. These batches were then subjected to exposure for sensitometry, developed, and the measured for sensitivity in the same manner as in Example 1. The sensitivity was represented by the reciprocal of the quantity of light required to give a density of fog density plus 0.2. Table 2 shows the results. Table 2 shows values relative to that of the respective specimens which had been stored at a temperature of $-30°$ C. as 100.

TABLE 2

| Specimen No. | Additive compound and its added amount $\times 10^{-4}$ mol/molAg | | | | Relative sensitivity | | |
|---|---|---|---|---|---|---|---|
| | | | | | Stored at $-30°$ C. (reference) | Stored at 80% RH, 50° C. 3 days | Stored under oxygen partial pressure of 10 atms., 3 days |
| 2-1 | A-7 | 0.45 | | | 100 | 35 | 44 |
| 2-2 | (17) | 0.45 | | | 100 | 77 | 77 |
| 2-3 | (17) | 0.45 | (V-6) | 3.0 | 100 | 91 | 78 |
| 2-4 | A-8 | 0.05 | | | 100 | 68 | 48 |
| 2-5 | A-8 | 0.05 | (V-3) | 3.0 | 100 | 81 | 49 |
| 2-6 | (41) | 0.05 | | | 100 | 88 | 71 |
| 2-7 | (41) | 0.05 | (V-3) | 3.0 | 100 | 99 | 77 |
| 2-8 | A-9 | 0.07 | | | 100 | 72 | 35 |
| 2-9 | A-9 | 0.07 | (IV-1) | 3.4 | 100 | 85 | 60 |
| 2-10 | (44) | 0.07 | | | 100 | 89 | 76 |
| 2-11 | (44) | 0.07 | (IV-1) | 3.4 | 100 | 99 | 90 |

(Note: Specimens 2-1, 2-4, 2-5, 2-8 and 2-9 are comparative while the others are according to the present invention)

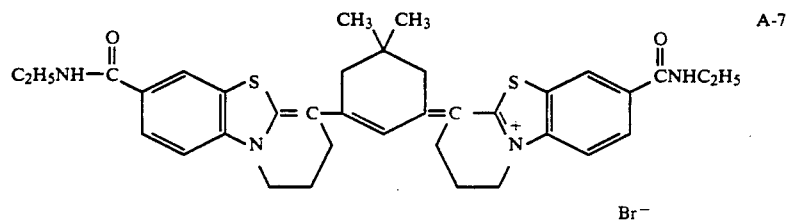

A-7

$E_{OX} = 0.411$

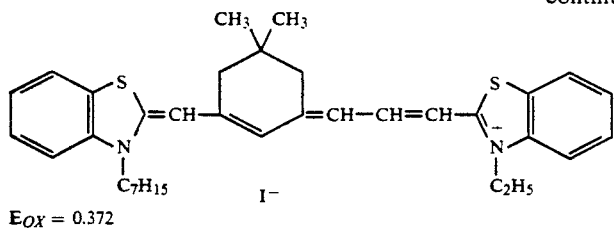

A-8

$E_{OX} = 0.372$

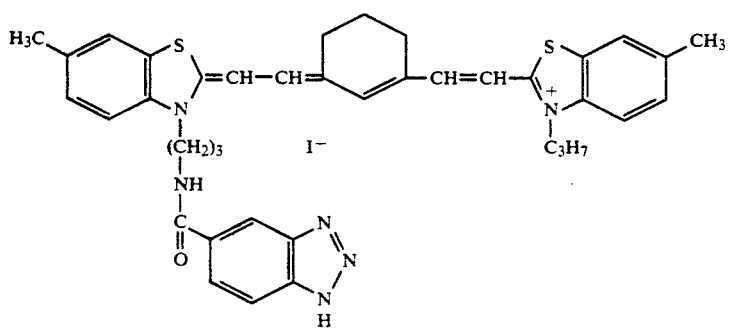

A-9

$E_{OX} = 0.272$

Table 2 shows that the specimens of the present invention exhibit a small drop in sensitivity under such conditions. Furthermore, as in Specimens 2-3 and 2-7, the combined use of a compound represented by general formula (V), e.g., (V-6) and (V-3) provides a less sensitivity drop under elevated temperature and high humidity conditions of 50° C. and 80% RH. On the other hand, Specimen 2-1, which comprises Compound (IV-1) in combination, exhibits less of a drop in sensitivity under elevated temperature and high humidity conditions of 50° C. and 80% RH and an oxygen partial pressure of 10 atms. than Specimen 2-10, which is free of such a compound. These compounds exhibit similar effects for polymethine dyes departing from the present invention. When combined with the polymethine dye of the present invention, these compounds can exhibit remarkable improvements in inhibition of sensitivity drop under such storage conditions.

EXAMPLE 3

Preparation of Emulsion 3.3 g of sodium chloride was added to a 3% aqueous solution of lime-treated gelatin. 3.2 ml of a 1% aqueous solution of N,N'-dimethylimidazolidine-2-thione was then added to the material. An aqueous solution containing 0.2 mol of silver nitrate and an aqueous solution 0.2 mol of sodium chloride and 15 μg of rhodium trichloride were added to the material under vigorous stirring at a temperature of 56° C. Subsequently, an aqueous solution containing 0.780 mol of silver nitrate and an aqueous solution containing 0.780 mol of sodium chloride and 4.2 mg of potassium ferrocyanate were added to the material under vigorous stirring at a temperature of 56° C. Five minutes after completion of the addition of the aqueous solution of silver nitrate and the aqueous solution of halogenated alkali, an aqueous solution containing 0.020 mol of silver nitrate and an aqueous solution containing 0.015 mol of potassium bromide, 0.005 mol of sodium chloride and 0.8 mg of potassium hexachloroiridiumate (IV) were then added to the material under stirring at a temperature of 40° C. The emulsion was then desalted and rinsed. The emulsion was then subjected to optimum chemical sensitization with 90.0 g of lime-treated gelatin and triethyl thiourea.

The resulting silver bromochloride (A) was then examined for crystal shape, grain size and grain size distribution from its electron photomicrophotograph. These silver halide grains were all cubic and exhibited a grain size of 0.52 μm and a fluctuation coefficient of 0.08. The grain size is represented by the average of diameteter of circles equivalent to the projected area of grains. The grain size distribution is calculated by dividing the standard deviation of grain sizes by the average grain size.

The halogen composition of emulsion grains was determined by measuring the X-ray diffraction from silver halide crystals. In particular, the diffraction angle from (200) plane was exactly measured with a monochromatized CuKα ray as the radiation source. Diffraction rays from a crystal having a uniform halogen composition give a single peak while diffraction rays from a crystal having a localized phase differing in composition from other phases give a plurality of peaks corresponding to these compositions. By calculating the lattice constant from the peak diffraction angles thus measured, the composition of silver halide constituting the crystal can be determined. The silver bromochloride emulsion (A) was observed to have a broad diffraction pattern with a main peak of 100% silver chloride and a central peak of 70% silver chloride (30% silver bromide) with a skirt dragged to around 60% silver chloride (40% silver bromide).

Preparation of Light-Sensitive Material

A multilayer color photographic paper was prepared by coating various layers having the following structures on a polyethylene double-laminated paper support. The coating solutions for these layers were prepared as follows:

Preparation of 1st Layer Coating Solution

To 19.1 g of a yellow coupler (ExY), 4.4 g of a dye image stabilizer (Cpd-1), and 1.4 g of a dye image stabilizer (Cpd-7) were added 27.2 cc of ethyl acetate and 8.2 g of a solvent (Solv-1) so that they were dissolved in these solvents. The solution was then emulsion dispersed in 185 cc of a 10% aqueous solution of gelatin containing 8 cc of 10% sodium dodecylbenzenesulfonate. On the other hand, an emulsion was prepared by adding a red-sensitive sensitizing dye (Dye-1) as described later to the silver bromochloride emulsion (A). The above mentioned emulsion dispersion A and this emulsion were then mixed and dissolved to prepare a 1st layer coating solution having the composition described later.

The coating solutions for the 2nd to 7th layers were prepared in the same manner as in the 1st layer coating solution. As the gelatin hardener, there was added to each of these layers sodium salt of 2,4-dichloro-6-hydroxy-1,3,5-triazine.

As spectral sensitizing dyes to be incorporated into the 1st red-sensitive yellow coloring layer there were used the following compounds:

1st Layer: Red-Sensitive Yellow Coloring Layer

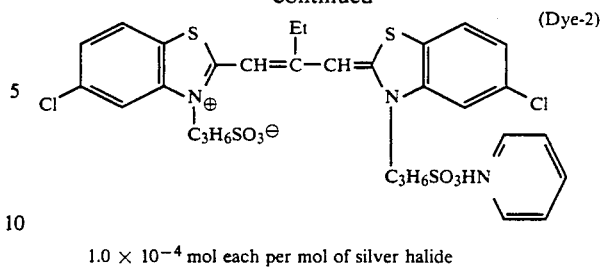

$1.0 \times 10^{-4}$ mol each per mol of silver halide

To the 3rd red-sensitive magenta coloring layer and the 5th red-sensitive cyan coloring layer were added polymethine dyes as set forth in Tables 3 and 4 in amounts of $2.5 \times 10^{-5}$ mol and $0.6 \times 10^{-5}$ mol per mol of silver halide, respectively. Further, Compound IV-1 was incorporated into the system in an amount of $1.8 \times 10^{-3}$ mol per mol of silver halide.

To each of the yellow coloring emulsion layer, magenta coloring emulsion layer and cyan coloring emulsion layer was added 1-(5-methylureidophenyl)-5-mercaptotetrazole in an amount of $8.0 \times 10^{-4}$ mol.

In order to inhibit irradiation, the following dyes were added to these emulsion layers:

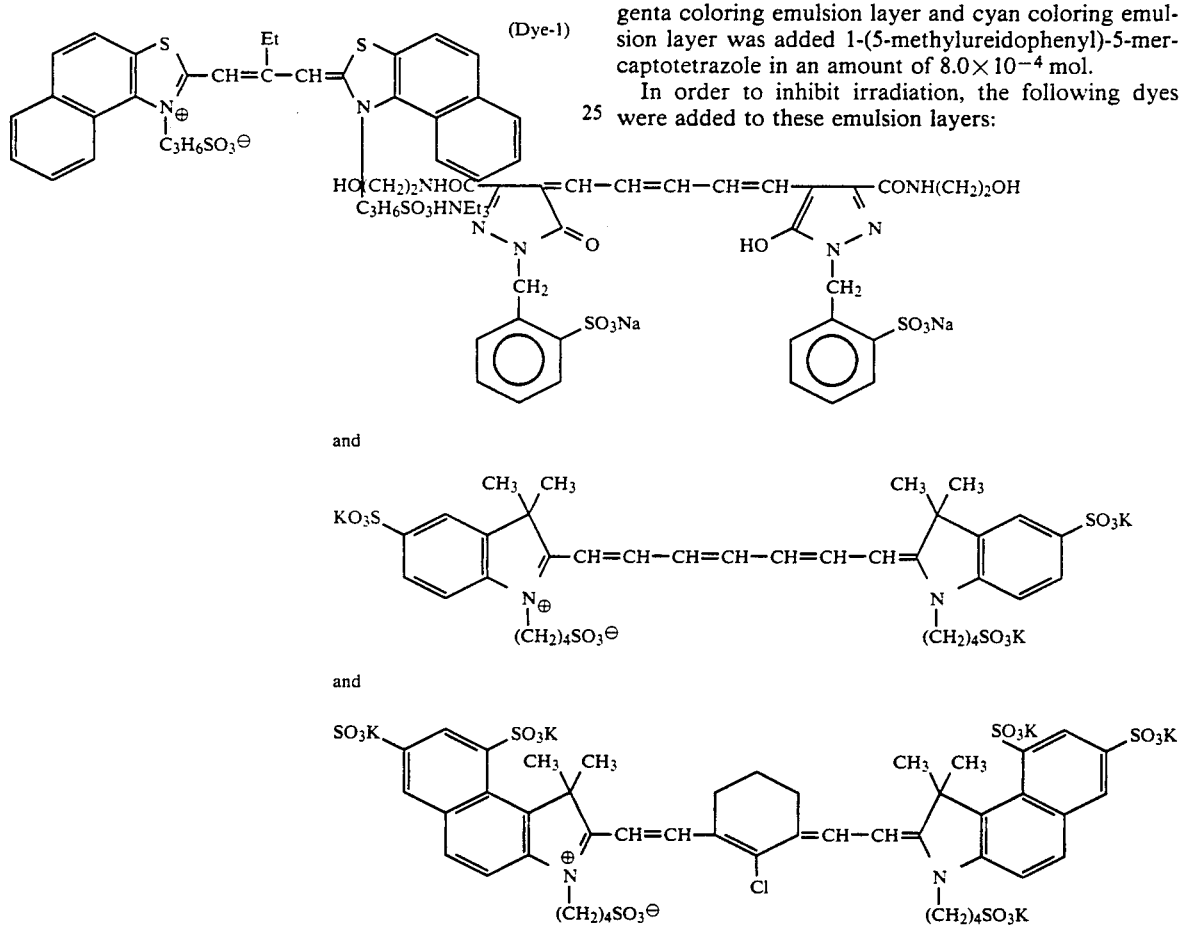

and and

Layer Structure

The composition of the various layers is set forth below. The figures indicate the coated amount (g/m²). The coated amount of silver halide emulsion is represented in terms of silver.

Support:

Polyethylene-laminated paper [containing a white pigment (TiO)₂ and a bluish dye (ultramarine) on the 1st layer side]

1st Layer: red-sensitive yellow coloring layer

Silver bromochloride emulsion A as set forth above ............................................. 0.30

| | |
|---|---:|
| Gelatin | 1.86 |
| Yellow coupler (ExY) | 0.82 |
| Dye image stabilizer (Cpd-1) | 0.19 |
| Solvent (Solv-1) | 0.35 |
| Dye image stabilizer (Cpd-7) | 0.06 |
| 2nd Layer: color stain inhibiting layer | |
| Gelatin | 0.99 |
| Color stain inhibitor (Cpd-5) | 0.08 |
| Solvent (Solv-1) | 0.16 |
| Solvent (Solv-4) | 0.08 |
| 3rd Layer: red-sensitive magenta coloring layer | |
| Silver bromochloride emulsion A | 0.12 |
| Gelatin | 1.24 |
| Magenta coupler (ExM) | 0.20 |
| Dye image stabilizer (Cpd-2) | 0.03 |
| Dye image stabilizer (Cpd-3) | 0.15 |
| Dye image stabilizer (Cpd-4) | 0.02 |
| Dye image stabilizer (Cpd-9) | 0.02 |
| Solvent (Solv-2) | 0.40 |
| 4th Layer: ultraviolet-absorbing layer | |
| Gelatin | 1.58 |
| Ultraviolet absorbent (UV-1) | 0.47 |
| Color stain inhibitor (Cpd-5) | 0.05 |
| Solvent (Solv-5) | 0.24 |
| 5th Layer: red-sensitive cyan coloring layer | |
| Silver bromochloride emulsion A | 0.23 |
| Gelatin | 1.34 |
| Cyan couple (ExC) | 0.32 |
| Dye image stabilizer (Cpd-6) | 0.17 |
| Dye image stabilizer (Cpd-7) | 0.40 |
| Dye image stabilizer (Cpd-8) | 0.04 |
| Solvent (Solv-6) | 0.15 |
| 6th Layer: ultraviolet-absorbing layer | |
| Gelatin | 0.53 |
| Ultraviolet absorbent (UV-1) | 0.16 |
| Color stain inhibitor (Cpd-5) | 0.02 |
| Solvent (Solv-5) | 0.08 |
| 7th Layer: protective layer | |
| Gelatin | 1.33 |
| Acryl-modified copolymer of polyvinyl alcohol (modification degree: 17%) | 0.17 |
| Liquid paraffin | 0.03 |

Yellow Coupler (ExY)

1:1 Mixture (molar ratio) of:

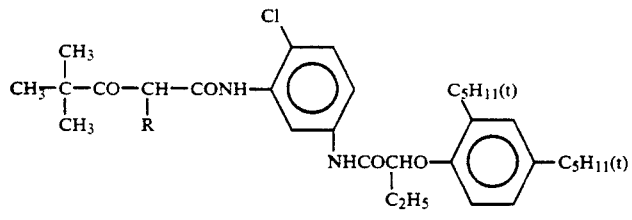

Magenta Coupler (ExM)

1:1 Mixture (molar ratio) of:

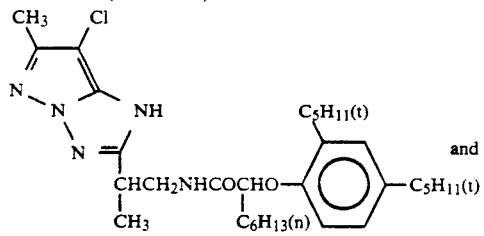

and

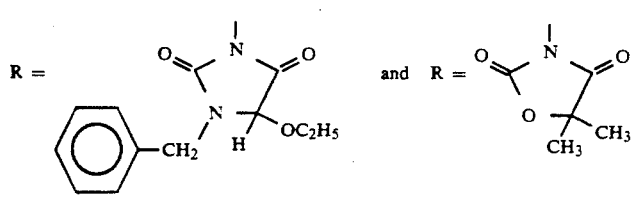

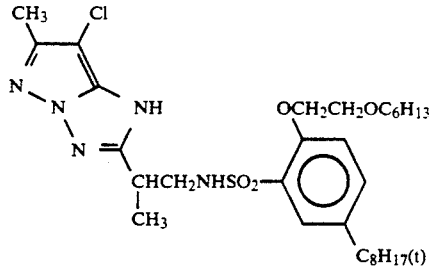

Cyan Coupler (ExC)

2:2:4 Mixture (weight ratio) of:

-continued
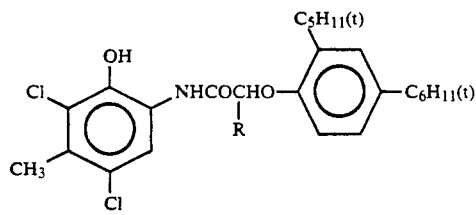 and 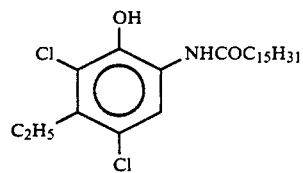
R = C₂H₅ and C₄H₉
Dye Image Stabilizer (Cpd-1)
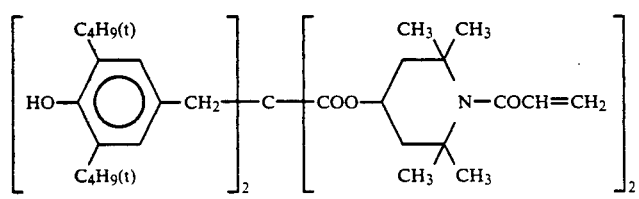
Dye Image Stabilizer (Cpd-2)
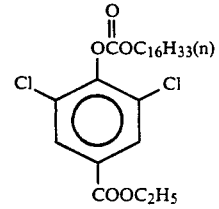
Dye Image Stabilizer (Cpd-3)
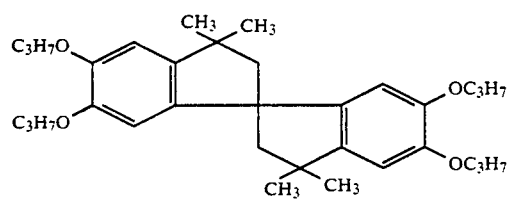
Dye Image Stabilizer (Cpd-4)
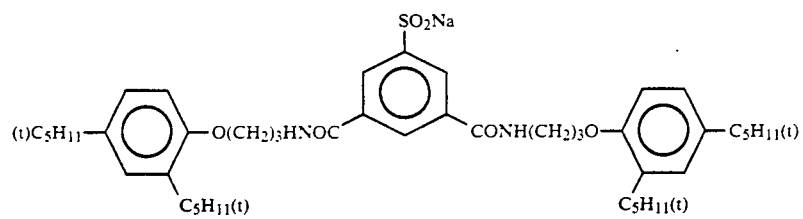
Color Stain Inhibitor (Cpd-5)
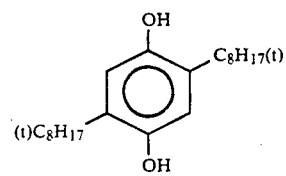
Dye Image Stabilizer (Cpd-6)
2:4:4 Mixture (by weight) of:
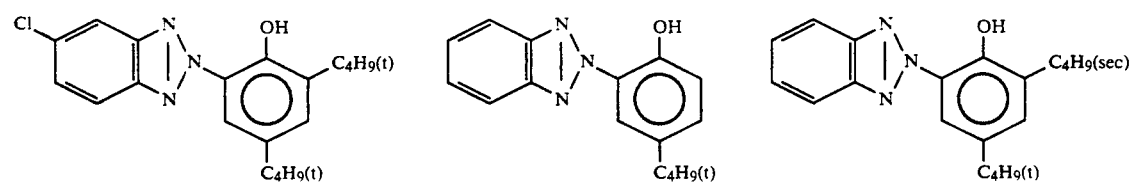
Dye Image Stabilizer (Cpd-7)
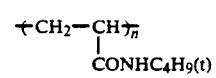
Average molecular weight 60,000
Dye Image Stabilizer (Cpd-8)
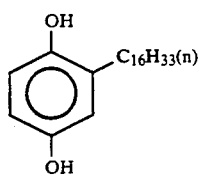
Dye Image Stabilizer (Cpd-9)
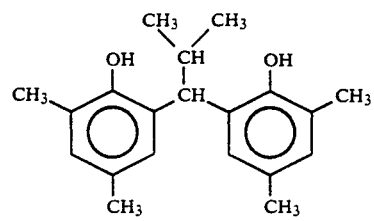
Ultraviolet Absorbent (UV-1)
4:2:4 Mixture (by weight) of:

-continued

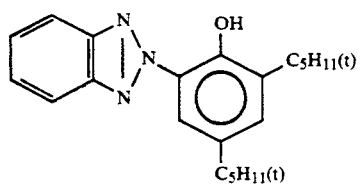 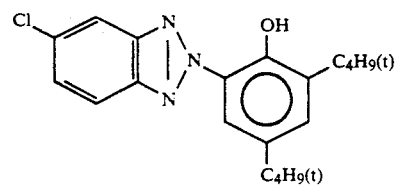 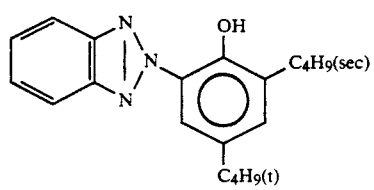

Solvent: (Solv-1)

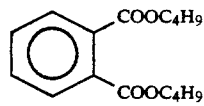

Solvent (Solv-2)

2:1 Mixture (by volume) of:

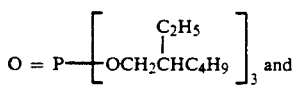 and

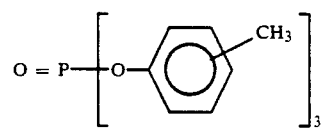

Solvent (Solv-4)

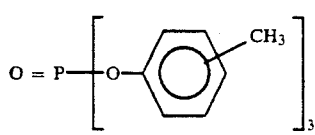

Solvent (Solv-5)

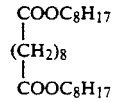

Solvent (Solv-6)

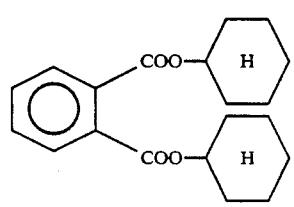

These specimens were then divided into 3 batches. One of the three batches was stored at room temperature under an oxygen partial pressure of 10 atms. for 3 days. Another batch was stored at a temperature of 50° C. and a relative humidity of 80% for 3 days. The remaining batch was stored at a temperature of −30° C. in a sealed argon-filled vessel for 3 days.

These color photographic paper specimens were then exposed to laser light from semiconductor lasers AlGaInP (oscillation wavelength: about 670 nm), GaAlAs (oscillation wavelength: about 750 nm), and GaAlAs (oscillation wavelength: about 830 nm). The scanning exposure apparatus was designed to scan the laser light sequentially over the specimens by means of a rotation polyhedron while the specimens are moved in a direction perpendicular to the scanning direction. The exposure was electrically controlled by adjusting the exposure time and the quantity of light from the semiconductor laser.

These specimens thus exposed were then subjected to color development by means of a paper processing machine in the following processing steps:

| Processing step | Temperature | Time | Replenishment rate* | Tank capacity |
|---|---|---|---|---|
| Color development | 35° C. | 20 sec. | 60 ml | 2 l |
| Blix | 30–35° C. | 20 sec. | 60 ml | 2 l |
| Rinse 1 | 30–35° C. | 10 sec. | — | 1 l |
| Rinse 2 | 30–35° C. | 10 sec. | — | 1 l |
| Rinse 3 | 30–35° C. | 10 sec. | 120 ml | 1 l |
| Drying | 70–80° C. | 20 sec. | | |

*per m² of light-sensitive material

The rinse step was effected in a countercurrent process wherein the rinse solution flows backward.

The various processing solutions had the following compositions:

Color developer

Running

-continued

| | Solution | Replenisher |
|---|---|---|
| Water | 800 ml | 800 ml |
| Ethylenediamine-N,N,N',N'-tetraphosphonic acid | 1.5 g | 2.0 g |
| Potassium bromide | 0.015 g | — |
| Triethanolamine | 8.0 g | 12.0 g |
| Sodium chloride | 4.9 g | — |
| Potassium carbonate | 25 g | 37 g |
| 4-Amino-3-methyl-N-ethyl-N-(3-hydroxypropyl)aniline.2.p-toluenesulfonic acid | 12.8 g | 19.8 g |
| N,N-bis(carboxymethyl) hydrazine | 5.5 g | 7.0 g |
| Fluorescent brightening agent (WHITEX 4B, available from Sumitomo Chemical Co., Ltd.) | 1.0 g | 2.0 g |
| Water to make | 1,000 ml | 1,000 ml |
| pH (25° C.) | 10.05 | 10.45 |

Blix solution
(Running solution was used also as replenisher)

| | |
|---|---|
| Water | 400 ml |
| Ammonium thiosulfate (700 g/l) | 100 ml |
| Sodium sulfite | 17 g |
| Ferric ammonium ethylenediamine-tetraacetate | 55 g |
| Disodium ethylenediamine tetraacetate | 5 g |
| Ammonium bromide | 40 g |
| Water to make | 1,000 ml |
| pH (25° C.) | 6.0 |

Rinse Solution (Running Solution was Used also as Replenisher

Ion-exchanged water (calcium and magnesium concentration: 3 ppm each)

These specimens thus developed were then measured for cyan density, magenta density and yellow density. The sensitivity was determined by calculating the reciprocal of the exposure required to give a color density of fog density plus 0.5. The sensitivity values thus obtained were compared.

Table 3 shows the results of the magenta coloring layer (3rd layer), and Table 4 shows the results of the cyan coloring layer (5th layer). The sensitivity of the specimens which had been stored at a temperature of −30° C. in an argon-filled vessel were represented relative to that of Specimen 3-1 as 100 for each coloring layer. The sensitivity of the specimens which had been stored at a temperature of 50° C. and a relative humidity of 80% for 3 days and the specimens which had been stored at room temperature under an oxygen partial pressure of 10 atms. were represented relative to that of the specimens which had been stored at a temperature of −30° C. in an argon-filled vessel as 100 for each coloring layer.

Table 3 and Table 4 show that the specimens of the present invention exhibit remarkably less of a sensitivity drop under such strict conditions than those using the polymethine dyes distinguishable from the present invention but having the similar structures. Heretofore, infrared-sensitive polymethine dyes have exhibited an extremely poor stability. Conventional commercially available silver halide photographic materials comprising such a dye can maintain the desired sensitivity for only a few months even when stored at a low temperature, e.g., as in a freezer. This is because such a polymethine is susceptible to air oxidation. As a result, it was found that the lower the oxidative potential (Eox) polymethine dye exhibits, the more it is susceptible to air oxidation. It was further found that when the oxidative potential is lower than 0.60 VvsSCE, the polymethine dye is remarkably susceptible to air oxidation. The polymethine dyes of the present invention can stay extremely stable even if they have an oxidative potential of much lower than 0.60 $V_{vs}SCE$.

The use of the present invention can provide a light-sensitive material which exhibits a remarkably small sensitivity drop even after prolonged storage at room temperature as in ordinary silver halide photographic materials even if it is used for infrared-sensitive light-sensitive material.

TABLE 3

(magenta coloring layer)

| Specimen No. | Poly-methine dye | Argon-substituted Stored, −30° C. Relative sensitivity | Fog | Relative sensitivity 80% RH, 50° C., 3 days | Oxygen partial pressure of 10 atms, 3 days |
|---|---|---|---|---|---|
| 3-1 | A-10 | 100 (reference) | 0.04 | 68 | 42 |
| 3-2 | (15) | 115 | 0.04 | 86 | 75 |
| 3-3 | A-11 | 135 | 0.03 | 73 | 48 |
| 3-4 | (16) | 120 | 0.02 | 96 | 88 |

(Note: Specimens 3-1 and 3-3 are comparative while the others are according to the present invention)

TABLE 4

(cyan coloring layer)

| Specimen No. | Poly-methine dye | Argon-substituted Stored, −30° C. Relative sensitivity | Fog | Relative sensitivity 80% RH, 50° C., 3 days | Oxygen partial pressure of 10 atms, 3 days |
|---|---|---|---|---|---|
| 3-1 | A-12 | 100 (reference) | 0.02 | 72 | 66 |
| 3-2 | (34) | 115 | 0.02 | 95 | 89 |
| 3-3 | A-13 | 83 | 0.03 | 77 | 70 |
| 3-4 | (38) | 98 | 0.02 | 99 | 94 |

(Note: Specimens 3-1 and 3-3 are comparative while the others are according to the present invention)

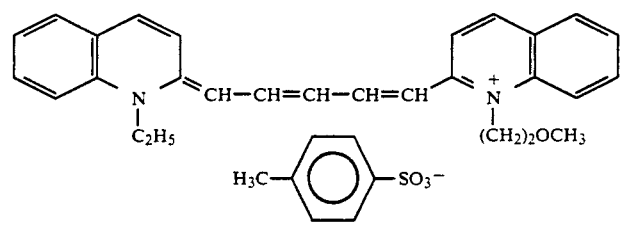

A-10

$E_{OX} = 0.472$

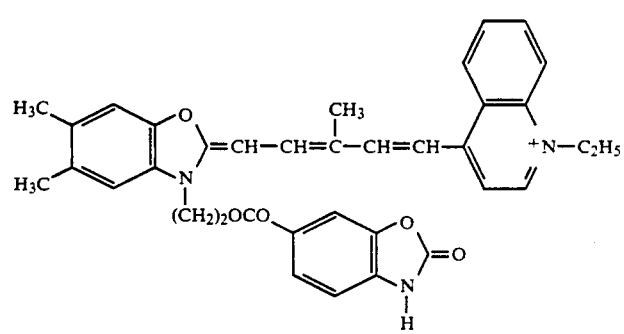

A-11

$E_{OX} = 0.495$

-continued

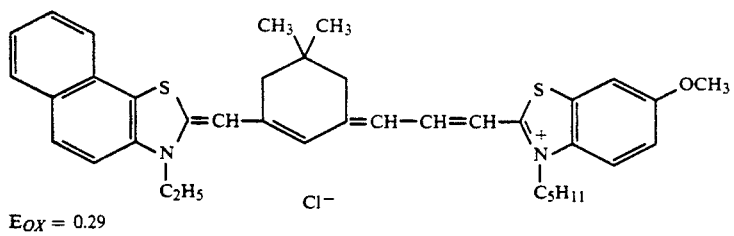

A-12

$E_{OX} = 0.29$

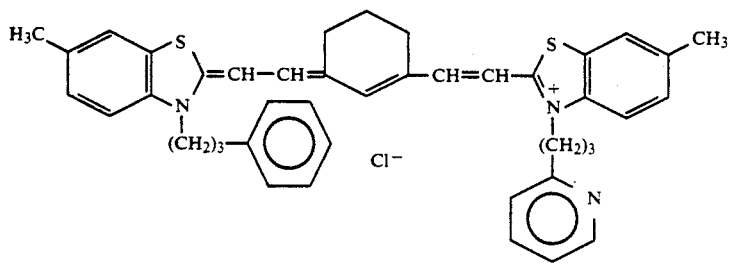

A-13

$E_{OX} = 0.271$

EXAMPLE 4

A silver chloride emulsion was prepared according to the method disclosed in Example 1 in JP-A-63-239449. The emulsion thus prepared comprised monodisperse cubic silver chloride grains with a pH value of 6.2, a pAg value of 7.2 and a side length of 0.46 μm (fluctuation coefficient: 9.1%). The emulsion was then subjected to optimum chemical sensitization with sodium thiosulfate.

To the emulsion were added the compounds set forth in Table 5. The emulsion was then coated on a support in combination with the same coupler emulsion dispersion as the cyan coupler emulsion dispersion containing the cyan coupler for the 5th cyan coloring layer to prepare coat specimens set forth in Table 5. For the preparation of Specimen 4-6 in Table 5, Compound (18) was added 2 minutes before chemical sensitization with sodium thiosulfate, and Compound IV-1 was added 15 minutes after the addition of sodium thiosulfate while the other was added 45 minutes after the addition of sodium thiosulfate.

As the support there was used a polyethylene double-laminated paper. The coated amount of silver, coupler and gelatin were set at 0.35 g/m$^2$, 0.45 g/m$^2$ and 1.50 g/m$^2$, respectively. As the upper layer there was coated a protective layer containing 1.50 g/m$^2$ of gelatin. As the gelatin hardener there was used sodium salt of 2,4-dichloro-6-hydroxy-1,3,5-triazine.

These coat specimens were then divided into 3 batches. One of these batches was stored at a temperature of −30° C. in an argon-substituted sealed oxygen-impermeable bag for 1 year. Another batch was stored under the same conditions, withdrawn from the bag 3 days before reaching 1 year, and then stored at a temperature of 50° C. and a relative humidity of 80% for 3 days. The remaining batch was stored indoor under natural conditions for 1 year.

These three batches of specimens were then exposed by means of a tungsten sensitometer. In particular, Specimens 4-1 to 4-7 were exposed through a sharp cut filter transmitting light of wavelength longer than 660 nm, Specimens 4-8 to 4-15 were exposed through a sharp cut filter transmitting light of wavelength longer than 720 nm, and Specimens 4-16 to 4-26 were exposed through a sharp cut filter transmitting light of wavelength longer than 780 nm.

The specimens thus exposed were then continuously processed (running test) by means of a paper processing machine in the following processing steps until the replenishment reached twice the capacity of the color developer tank.

| Processing step | Temperature | Time | Replenishment rate* | Tank capacity |
|---|---|---|---|---|
| Color development | 35° C. | 45 sec. | 161 ml | 17 l |
| Blix | 30–35° C. | 45 sec. | 215 ml | 17 l |
| Rinse 1 | 30–35° C. | 20 sec. | — | 10 l |
| Rinse 2 | 30–35° C. | 20 sec. | — | 10 l |
| Rinse 3 | 30–35° C. | 20 sec. | 350 ml | 10 l |
| Drying | 70–80° C. | 60 sec. | | |

*per m$^2$ of light-sensitive material

The rinse step was effected in a countercurrent process wherein the rinse solution flows backward.

The various processing solutions had the following compositions:

| Color developer | | |
|---|---|---|
| | Running Solution | Replenisher |
| Water | 800 ml | 800 ml |
| Ethylenediamine-N,N,N',N'-tetraphosphonic acid | 1.5 g | 2.0 g |
| Potassium bromide | 0.015 g | — |
| Triethanolamine | 8.0 g | 12.0 g |
| Sodium chloride | 1.4 g | — |
| Potassium carbonate | 25 g | 25 g |
| N-ethyl-N-(β-methane-sulfonamidoethyl)-3-methyl-4-aminoaniline sulfate | 5.0 g | 7.0 g |
| N,N-bis(carboxymethyl) hydrazine | 5.5 g | 7.0 g |
| Fluorescent brightening agent (WHITEX 4B, available from Sumitomo Chemical Co., Ltd.) | 1.0 g | 2.0 g |
| Water to make | 1,000 ml | 1,000 ml |
| pH (25° C.) | 10.05 | 10.45 |

| Blix solution | |
|---|---|
| (Running solution was used also as replenisher) | |
| Water | 400 ml |
| Ammonium thiosulfate (700 g/l) | 100 ml |

-continued

| | |
|---|---|
| Sodium sulfite | 17 g |
| Ferric ammonium ethylenediamine-tetraacetate | 55 g |
| Disodium ethylenediaminetetraacetate | 5 g |
| Ammonium bromide | 40 g |
| Water to make | 1,000 ml |
| pH (25° C.) | 6.0 |

Rinse Solution (Running Solution was Used also as Replenisher)

Ion-exchanged water (calcium and magnesium concentration: not more than 3 ppm each)

The specimens thus processed were then measured for cyan density. The sensitivity was determined by calculating the reciprocal of the exposure required to give a color density of cyan density plus 0.5. The sensitivity values thus obtained were compared. The results are set forth in Table 5. In Table 5, the sensitivity of Specimens 4-1 to 4-7 which had been stored at a temperature of −30° C. is represented relative to that of Specimen 4-1 as 100. The sensitivity of Specimens 4-8 to 4-15 which had been stored at a temperature of −30° C. is represented relative to that of Specimen 4-8 as 100. The sensitivity of Specimens 4-16 to 4-26 which had been stored at a temperature of −30° C. is represented relative to that of Specimen 4-16 as 100. The sensitivity of specimens which had been further stored at 80%RH and 50° C. for 3 days and the specimens which had been naturally stored for 1 year is represented relative to that of the corresponding specimens which had been stored at a temperature of −30° C. as 100.

It will be appreciated from Table 5 that the specimens comprising the polymethine dyes of the present invention exhibit a small sensitivity drop even after storage at 80% RH and 50° C. or prolonged. It will be also appreciated that when used in combination with the compounds represented by the general formulae IV, V, VI and VII, the present specimens enjoy a sensitivity increase and further preservability.

TABLE 5

| Specimen No. | Additive compound and its added amount $\times 10^{-5}$ mol/molAg | | | | Argon-substituted −30° C. | | Relative sensitivity | |
|---|---|---|---|---|---|---|---|---|
| | | | | | Relative sensitivity | Fog | 80% RH, 50° C., 3 days | Natural storage 1 year |
| 4-1 | (A-14) | 12 | | | 100 (reference) | 0.07 | 65 | 81 |
| 4-2 | (14) | 12 | | | 130 | 0.07 | 84 | 95 |
| 4-3 | (A-15) | 12 | | | 131 | 0.07 | 57 | 78 |
| 4-4 | (18) | 12 | | | 150 | 0.08 | 80 | 90 |
| 4-5 | (18) | 12 | IV-1 VI-6 | 130 40 | 515 | 0.04 | 100 | 100 |
| 4-6 | (18) | 12 | IV-1 VI-6 | 130 40 | 665 | 0.04 | 100 | 99 |
| 4-7 | (18) | 12 | IV-1 VII-1 | 130 40 | 680 | 0.04 | 100 | 100 |
| 4-8 | (A-10) | 2.0 | | | 100 (reference) | 0.08 | 46 | 35 |
| 4-9 | (21) | 2.0 | | | 131 | 0.07 | 69 | 65 |
| 4-10 | (A-16) | 2.0 | | | 148 | 0.08 | 51 | 27 |
| 4-11 | (23) | 2.0 | | | 130 | 0.08 | 70 | 62 |
| 4-12 | (23) | 2.0 | V-3 | 20 | 420 | 0.07 | 90 | 65 |
| 4-13 | (23) | 2.0 | VI-6 | 40 | 651 | 0.07 | 83 | 60 |
| 4-14 | (23) | 2.0 | IV-1 | 130 | 269 | 0.04 | 83 | 84 |
| 4-15 | (23) | 2.0 | VII-1 | 40 | 650 | 0.08 | 79 | 59 |
| 4-16 | (A-17) | 0.7 | | | 100 (reference) | 0.07 | 54 | 43 |
| 4-17 | (50) | | | | 97 | 0.08 | 71 | 69 |
| 4-18 | (A-18) | | | | 139 | 0.07 | 65 | 50 |
| 4-19 | (51) | | | | 130 | 0.06 | 76 | 77 |
| 4-20 | (45) | | | | 140 | 0.06 | 80 | 74 |
| 4-21 | (A-19) | | | | 155 | 0.07 | 51 | 37 |
| 4-22 | (35) | | | | 149 | 0.07 | 72 | 68 |
| 4-23 | (35) | | V-3 | | 620 | 0.07 | 86 | 67 |
| 4-24 | (35) | | IV-1 | | 330 | 0.06 | 85 | 77 |
| 4-25 | (35) | | IV-1 VI-6 | | 1240 | 0.06 | 99 | 88 |
| 4-26 | (35) | | IV-1 VII-1 | | 1245 | 0.06 | 98 | 85 |

(Note: Specimens 4-1, 4-3, 4-8, 4-10, 4-16, 4-18, and 4-21 are comparative while the others are according to the present invention. For Specimen 4-6, Compound (18) was added to the system before chemical sensitization.)

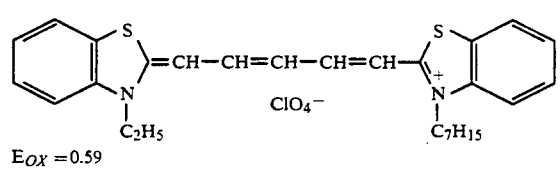

A-14

$E_{OX} = 0.59$

-continued

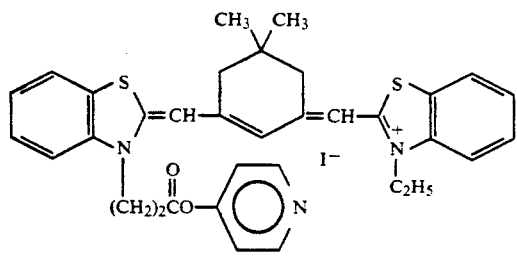

A-15

$E_{OX} = 0.511$

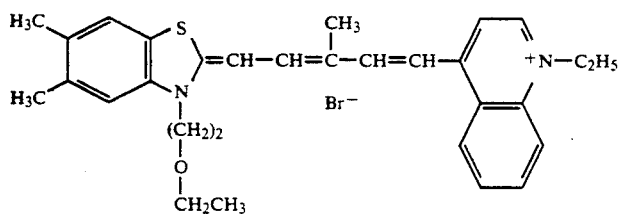

A-16

$E_{OX} = 0.40$

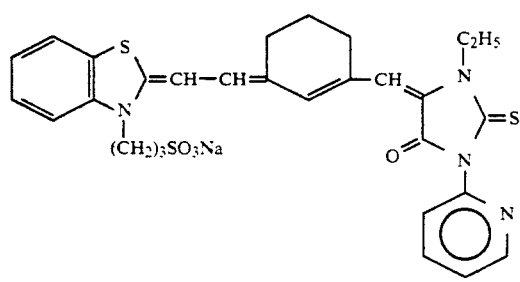

A-17

$E_{OX} = 0.35$

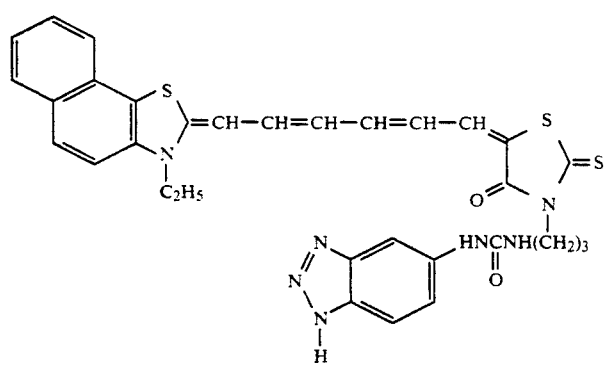

A-18

$E_{OX} = 0.32$

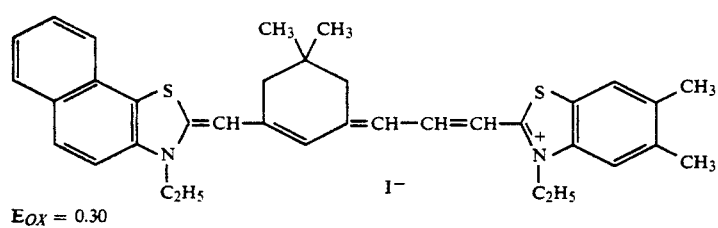

A-19

$E_{OX} = 0.30$

EXAMPLE 5

To a 3% aqueous solution of lime-treated gelatin were added 6.4 g of sodium chloride and 3.2 ml of a 1% aqueous solution of N,N'-dimethylimidazolidine-2-thione. To the solution were added an aqueous solution containing 0.2 mol of silver nitrate and an aqueous solution containing 0.08 mol of potassium bromide and 0.12 mol of sodium chloride under vigorous stirring at a temperature of 52° C. Subsequently, an aqueous solution containing 0.8 mol of silver nitrate and an aqueous solution containing 0.32 mol of silver nitrate and 0.48 mol of sodium chloride were added to the solution under vigorous stirring at a temperature of 52° C. The solution was then kept at a temperature of 52° C. for 5 minutes. The emulsion was then desalted and rinsed. The emulsion was then subjected to optimum chemical sensitization with 90.0 g of lime-treated gelatin and triethylthiourea. Thus, a silver bromochloride emulsion (silver bromide content: 40 mol %) was obtained as Emulsion A.

Then, to a 3% aqueous solution of lime-treated gelatin were added 3.3 g of sodium chloride and 3.2 ml of a 1% aqueous solution of N,N'-dimethylimidazolidine-2-thione. To the solution were added an aqueous solution containing 0.2 mol of silver nitrate and an aqueous solution containing 0.2 mol of sodium chloride under vigorous stirring at a temperature of 52° C. Subsequently, an aqueous solution containing 0.8 mol of silver nitrate and an aqueous solution containing 0.8 mol of sodium chloride were added to the solution under vigorous stirring at a temperature of 52° C. The solution was then kept at a temperature of 52° C for 5 minutes. The emulsion was then desalted and rinsed. The emulsion was then subjected to optimum chemical sensitization with 90.0 g of limetreated gelatin and triethylthiourea. Thus, a silver bromochloride emulsion was obtained as Emulsion B.

Emulsion C was then prepared in the same manner as in Emulsion B except that potassium hexacyanoferrate (II) trihydrate was added to the sodium chloride aqueous solutions which were added at first time and second time in amounts of 0.84 mg and 3.38 mg, respectively.

Emulsion D was then prepared in the same manner as in Emulsion B except that the silver nitrate aqueous solution and the sodium chloride aqueous solution which were added at second time were divided into 3:5 parts which were then added to the system, the latter part of the sodium chloride aqueous solution further containing 4.22 mg of potassium hexacyanoferrate (II) trihydrate.

These four kinds of emulsions contained substantially the same silver halide grains. The silver halide grains were cubic grains with an average side length of 0.5 μm and a grain size fluctuation coefficient of 0.08.

The halogen composition of these emulsions and the position in which iron ions are incorporated into grains are tabulated below.

TABLE 6

| Emulsion | Halogen composition | Iron (II) ion | Layer into which iron ions are incorporated |
|---|---|---|---|
| A | Cl (60 mol %) | None | — |
| B | Cl (100 mol %) | None | — |
| C | Cl (100 mol %) | $1 \times 10^{-5}$ mol/molAg | Uniformly incorporated in grains |
| D | Cl (100 mol %) | $1 \times 10^{-5}$ mol/molAg | Surface layer falling within 50% of grain volume |

Preparation of Light-Sensitive Material

Sensitizing dyes (S-1), (S-2), (S-3) and (S-4) were added to Emulsions A, B, C and D in amounts of $5 \times 10^{-6}$ mol per mol of silver, respectively, to prepare Emulsions (A-1) to (A-4), (B-1) to (B-4), (C-1) to (C-4) and (D-1) to (D-4) as set forth in Table 7. When these sensitizing dyes were added to the system, Compound (F-1) was also added in an amount of $1.8 \times 10^{-3}$ mol per mol of silver halide.

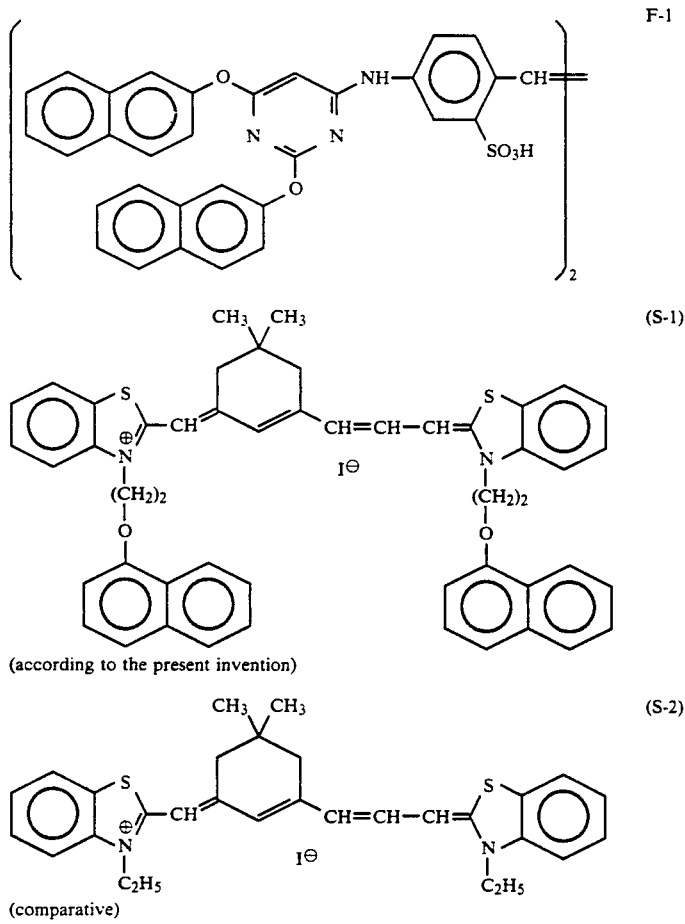

F-1

(S-1)
(according to the present invention)

(S-2)
(comparative)

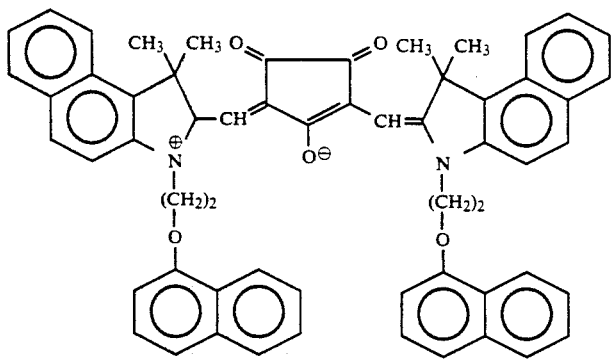

(S-3)

(comparative)

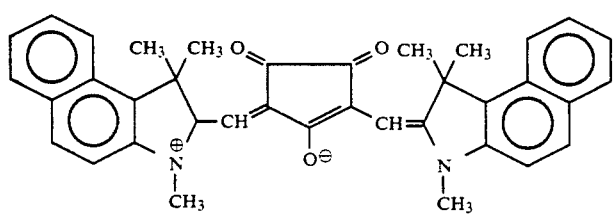

(S-4)

(comparative)

TABLE 7

| Specimen | Emulsion | Emulsion grain | Dye | Amount of dye |
|---|---|---|---|---|
| 1 | A-1 | A | S-1 | $5 \times 10^{-6}$ mol |
| 2 | A-2 | A | S-2 | $5 \times 10^{-6}$ mol |
| 3 | A-3 | A | S-3 | $5 \times 10^{-6}$ mol |
| 4 | A-4 | A | S-4 | $5 \times 10^{-6}$ mol |
| 5 | B-1 | B | S-1 | $5 \times 10^{-6}$ mol |
| 6 | B-2 | B | S-2 | $5 \times 10^{-6}$ mol |
| 7 | B-3 | B | S-3 | $5 \times 10^{-6}$ mol |
| 8 | B-4 | B | S-4 | $5 \times 10^{-6}$ mol |
| 9 | C-1 | C | S-1 | $5 \times 10^{-6}$ mol |
| 10 | C-2 | C | S-2 | $5 \times 10^{-6}$ mol |
| 11 | C-3 | C | S-3 | $5 \times 10^{-6}$ mol |
| 12 | C-4 | C | S-4 | $5 \times 10^{-6}$ mol |
| 13 | D-1 | D | S-1 | $5 \times 10^{-6}$ mol |
| 14 | D-2 | D | S-2 | $5 \times 10^{-6}$ mol |
| 15 | D-3 | D | S-3 | $5 \times 10^{-6}$ mol |
| 16 | D-4 | D | S-4 | $5 \times 10^{-6}$ mol |

A polyethylene-double-laminated paper support was corona discharged. A gelatin subbing layer containing sodium dodecylbenzenesulfonate was coated on the paper support. Layers containing various photographic emulsions as set forth in Table 7 were coated on the subbing layer to prepare the photographic paper specimens 1 to 16 having the layer structures as set forth below.

As the gelatin hardener for each of these layers, there was used sodium salt of 1-oxy-3,5-dichloro-s-triazine.

Further, Cpd-10 and Cpd-11 were added to each layer as a preservative in amounts of 25.0 mg/m$^2$ and 50.0 mg/m$^2$, respectively. To the emulsion layer was added 1-(5-methylureidophenyl)-5-mercaptotetrazole in an amount of $2.5 \times 10^{-4}$ mol per mol of silver halide.

Layer structure

The composition of the various layers is set forth below. The figures indicate the coated amount (g/m$^2$). The coated amount of silver halide emulsion is represented in terms of silver.

| Support: | |
|---|---|
| Polyethylene-laminated paper [containing a white pigment (TiO$_2$) and a bluish dye (ultramarine) on the 1st layer side] | |
| 1st Layer: red-sensitive cyan coloring layer | |
| Silver halide emulsion (see Table 7) | 0.23 |
| Gelatin | 1.34 |
| Cyan coupler (ExC) | 0.32 |
| Dye image stabilizer (Cpd-1) | 0.03 |
| Dye image stabilizer (Cpd-2) | 0.02 |
| Dye image stabilizer (Cpd-3) | 0.18 |
| Dye image stabilizer (Cpd-4) | 0.40 |
| Dye image stabilizer (Cpd-5) | 0.05 |
| Solvent (Solv-1) | 0.14 |
| 2nd Layer: protective layer | |
| Gelatin | 1.33 |
| Acryl-modified copolymer of polyvinyl alcohol (modification degree: 17%) | 0.17 |
| Liquid paraffin | 0.03 |

Cyan Coupler (ExC)

1:1 Mixture (molar ratio) of:

Dye Image Stabilizer (Cpd-1)

Dye Image Stabilizer (Cpd-2)

Dye Image Stabilizer (Cpd-3)
2:4:4 Mixture (weight ratio) of:

Dye Image Stabilizer (Cpd-4)

$+CH_2-CH+_n$
|
$CONHC_4H_9(t)$

Mean molecular weight 60,000

Color Image Stabilizer (Cpd-5)
1:1 Mixture (weight ratio) of:

Preservative (Cpd-10)

Preservative (Cpd-11)

Solvent (Solv-1)
80:20 Mixture (volumetric ratio) of:

$C_8H_{17}CHCH(CH_2)_7COOC_8H_{17}$
$\diagdown O \diagup$ and

These color photographic paper specimens were then exposed to laser light from a semiconductor laser GaAlAs (oscillation wavelength: about 810 nm). The scanning exposure apparatus was designed to scan the laser light sequentially over the specimens by means of a rotary polyhedron while the specimens were moved in a direction perpendicular to the scanning direction. The exposure was electrically controlled by adjusting the exposure time and the quantity of light from the semiconductor laser.

These specimens thus exposed were then subjected to color development with the following processing solutions by means of a paper processing machine in the following processing steps until the replenishment rate reached twice the capacity of the color developer tank (running test).

| Processing step | Temperature | Time | Replenishment rate* | Tank capacity |
|---|---|---|---|---|
| Color development | 35° C. | 45 sec. | 161 ml | 17 l |
| Blix | 30–35° C. | 45 sec. | 215 ml | 17 l |
| Rinse 1 | 30–35° C. | 20 sec. | — | 10 l |
| Rinse 2 | 30–35° C. | 20 sec. | — | 10 l |
| Rinse 3 | 30–35° C. | 20 sec. | 350 ml | 10 l |
| Drying | 70–80° C. | 60 sec. | | |

*per $m^2$ of light-sensitive material

The rinse step was effected in a countercurrent process wherein the rinse solution flows backward.

The various processing solutions had the following compositions:

Color developer

-continued

| | Running Solution | Replenisher |
|---|---|---|
| Water | 800 ml | 800 ml |
| Ethylenediamine-N,N,N',N'-tetraphosphonic acid | 1.5 g | 2.0 g |
| Potassium bromide | 0.015 g | — |
| Triethanolamine | 8.0 g | 12.0 g |
| Sodium chloride | 1.4 g | — |
| Potassium carbonate | 25 g | 25 g |
| N-ethyl-N-($\beta$-methanesulfonamidoethyl)-3-methyl-4-aminoaniline sulfate | 5.0 g | 7.0 g |
| N,N-bis(carboxymethyl)-hydrazine | 4.0 g | 5.0 g |
| N,N-di(sulfoethyl)hydroxylamine.1Na | 4.0 g | 5.0 g |
| Fluorescent brightening agent (WHITEX 4B, available from Sumitomo Chemical Co., Ltd.) | 1.0 g | 2.0 g |
| Water to make | 1,000 ml | 1,000 ml |
| pH (25° C.) | 10.05 | 10.45 |

Blix solution
(Running solution was used also as replenisher)

| | |
|---|---|
| Water | 400 ml |
| 70% Ammonium thiosulfate | 100 ml |
| Sodium sulfite | 17 g |
| Ferric ammonium ethylenediaminetetraacetate | 55 g |
| Disodium ethylenediaminetetraacetate | 5 g |
| Ammonium bromide | 40 g |
| Water to make | 1,000 ml |
| pH (25° C.) | 6.0 |

Rinse Solution (Running Solution was Used also as Replenisher)

Ion-exchanged water (calcium and magnesium concentration: not more than 3 ppm each)

(Blue sensitivity difference between exposure in vacuo and in air)

Specimens 1 to 16 thus prepared were immediately exposed to light, and then processed. Another batch of Specimens 1 to 16 were exposed to light in vacuo under $5 \times 10^{-5}$ torr, and then processed. These two batches were then measured for cyan density by means of a TCD densitometer available from Fuji Photo Film Co., Ltd. to determined sensitivity. For the evaluation of sensitivity, the logarithm of the exposure required to give a density of fog plus 0.1 on the characteristic curve was determined. The exposure was effected by xenon light for 100 seconds through an interference filter having a peak at 380 nm and a continuous wedge.

The sensitivity difference between the former batch and the latter batch was determined. The results are set forth in Table 8.

Table 8 shows that Specimens 1, 2, 5, 6, 9, 10, 13 and 14 comprising Dye S-1 or S-2 exhibit a blue sensititivity difference of 0.1 or less. On the other hand, it is also shown that Specimens 3, 4, 7, 8, 11, 12, 15 and 16 comprising Dye S-3 or S-4 exhibit a blue sensitivity difference of greater than 0.1.

TABLE 8

| Specimen No. | Emulsion | Dye No. | Blue sensitivity difference (vaccum - air) |
|---|---|---|---|
| 1 | A-1 | S-1 | +0.08 |
| 2 | A-2 | S-2 | +0.09 |
| 3 | A-3 | S-3 | +0.35 |
| 4 | A-4 | S-4 | +0.35 |
| 5 | B-1 | S-1 | +0.10 |
| 6 | B-2 | S-2 | +0.10 |

TABLE 8-continued

| Specimen No. | Emulsion | Dye No. | Blue sensitivity difference (vaccum - air) |
|---|---|---|---|
| 7 | B-3 | S-3 | +0.38 |
| 8 | B-4 | S-4 | +0.39 |
| 9 | C-1 | S-1 | +0.07 |
| 10 | C-2 | S-2 | +0.08 |
| 11 | C-3 | S-3 | +0.33 |
| 12 | C-4 | S-4 | +0.35 |
| 13 | D-1 | S-1 | +0.07 |
| 14 | D-2 | S-2 | +0.08 |
| 15 | D-3 | S-3 | +0.35 |
| 16 | D-4 | S-4 | +0.35 |

Relative Sensitivity of Spectrally Sensitized Specimens

Specimens 1 to 16 thus prepared were immediately exposed to light, processed, and then measured for cyan density by means of a TCD densitometer available from Fuji Photo Film Co., Ltd. to determine sensitivity (see Table 9). For the evaluation of sensitivity, the relative sensitivity of infrared-sensitized specimens was determined. For the relative sensitivity, the sensitivity of Specimen 13 of the present invention was used as reference as 1000. The results are set forth in Table 9.

Table 9 shows that the specimens which exhibit a blue sensitivity difference of 0.1 or less as detemined above show a remarkably higher sensitivity than the specimens which exhibit a blue sensitivity difference of greater than 0.1. It is also shown that the spcimens comprising Emulsion D which exhibits a blue sensitivity difference of 0.1 or less and comprises silver chloride grains wherein a localized phase having an iron ion concentration of 10 or more times higher than that of the other portion is present in a surface layer falling within 50% or less of the grain volume show a remarkably higher sensitivity than the specimens comprising Emulsions A, B and C.

TABLE 9

| Specimen No. | Emulsion | Dye No. | Relative sensitivity of cyan coloring layer |
|---|---|---|---|
| 1 | A-1 | S-1 | 860 |
| 2 | A-2 | S-2 | 855 |
| 3 | A-3 | S-3 | 79 |
| 4 | A-4 | S-4 | 79 |
| 5 | B-1 | S-1 | 770 |
| 6 | B-2 | S-2 | 768 |
| 7 | B-3 | S-3 | 72 |
| 8 | B-4 | S-4 | 72 |
| 9 | C-1 | S-1 | 950 |
| 10 | C-2 | S-2 | 948 |
| 11 | C-3 | S-3 | 85 |
| 12 | C-4 | S-4 | 85 |
| 13 | D-1 | S-1 | 1,000 (reference) |
| 14 | D-2 | S-2 | 1,000 |
| 15 | D-3 | S-3 | 90 |
| 16 | D-4 | S-4 | 90 |

Fluctuation of Spectral Sensitivity during Prolonged Storage

Specimens 13 and 14 were divided into 3 batches. One of these batches was stored at a temperature of $-30°$ C. for 6 months. Another was stored under natural conditions for 6 months. The remaining batch was stored at a temperature of $-30°$ C for 6 months less 3 days and then stored under conditions of 80% RH and 50° C. for 3 days. These 3 batches were then exposed through a sharp cut filter transmitting light of wavelength longer than 520 nm by means of an FWH sensitometer available from Fuji Photo Film Co., Ltd. (equipped with an ultraviolet-absorbing filter apparatus and a tungsten light source with a color temperature of 2,854° K.). Table 10 shows that the specimen comprising Dye S-1 (i.e., No. 13) exhibits much less spectral sensitivity fluctuation during prolonged storage than the specimen comprising Dye S-2 (i.e., No. 14).

TABLE 10

| Specimen No. | Sensitivity (stored at −30° C.) (reference) | Relative sensitivity (stored at −30° C. and then 80% RH, 50° C. for 3 days before exposure) | Relative sensitivity (natural storage) |
| --- | --- | --- | --- |
| 13 | 100 | 100 | 99 |
| 14 | 100 | 95 | 93 |

(Note: Specimen 13 is according to the present invention while Specimen 14 is comparative.)

The comprehensive evaluation of the spectral sensitivity and spectral sensitivity fluctuation during prolonged storage shows that Specimen 13 of the present invention is particularly excellent.

EXAMPLE 6

Preparation of Light-Sensitive Material

Multilayer color photographic paper specimens (17–32) were prepared according to the procedure of Example 3, except that Emulsion D prepared in Example 5 was used instead of Emulsion A prepared in Example 3 and Emulsions used in the first and third layers are those shown in Table 11, and as the gelatin hardener there was added to each of these layers sodium salt of 1-xoy-3,5-dichloro-s-triazine.

The coloring agents used in 3rd layer and 5th layer are shown below.

3rd Layer: Infrared-Sensitive Magenta Coloring Layer

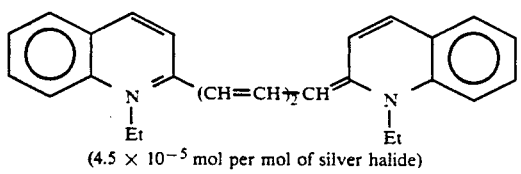

S-6

(4.5 × 10⁻⁵ mol per mol of silver halide)

5th Layer: Infrared-Sensitive Cyan Coloring Layer

One of S-1, S-2, S-3 and S-4 as used in Example 5 (0.5 × 10⁻⁵ mol per mol of silver halide).

When S-6, S-1, S-2, S-3 and S-4 were incorporated into the system, the aforementioned compound F-1 was also added in an amount of $1.8 \times 10^{-3}$ mol per mol of silver halide.

In order to inhibit irradiation, the same following dyes as in Example 3 were added to these emulsion layers.

TABLE 11

| Layer | Emulsion | Emulsion grain | Dye | Amount of dye |
| --- | --- | --- | --- | --- |
| 1st layer | D-5 | D | S-5 (Dye-1) | $1.0 \times 10^{-4}$ mol |
| 3rd layer | D-6 | D | S-6 | $4.5 \times 10^{-5}$ mol |

Layer Structure

Specimens 17 to 32 were prepared in the same manner as described in Example 3 except that the emulsions used in the 1st and 3rd layers were altered as set forth in Table 11, and emulsion used in the 5th layer (cyan coloring layer) was altered as set forth in Table 12.

Dye Image stabilizer (Cpd-8) used in Example 6 was shown below.

1:1 Mixture (by weight) of:

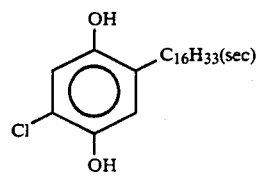

and

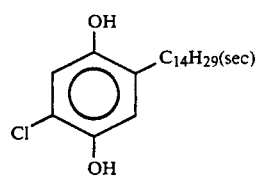

TABLE 12

| | Emulsion layer | | |
| Specimen | Yellow coloring layer | Magenta coloring layer | Cyan coloring layer |
| --- | --- | --- | --- |
| 17 | D-5 | D-6 | A-1 |
| 18 | D-5 | D-6 | A-2 |
| 19 | D-5 | D-6 | A-3 |
| 20 | D-5 | D-6 | A-4 |
| 21 | D-5 | D-6 | B-1 |
| 22 | D-5 | D-6 | B-2 |
| 23 | D-5 | D-6 | B-3 |
| 24 | D-5 | D-6 | B-4 |
| 25 | D-5 | D-6 | C-1 |
| 26 | D-5 | D-6 | C-2 |
| 27 | D-5 | D-6 | C-3 |
| 28 | D-5 | D-6 | C-4 |
| 29 | D-5 | D-6 | D-1 |
| 30 | D-5 | D-6 | D-2 |
| 31 | D-5 | D-6 | D-3 |
| 32 | D-5 | D-6 | D-4 |

These color photographic paper specimens were then exposed to laser light from semiconductor lasers AlGaInP (oscillation wavelength: about 670 nm), GaAlAs (oscillation wavelength: about 750 nm), and GaAlAs (oscillation wavelength: about 810 nm). The scanning exposure apparatus was designed to scan the laser light sequentially over the specimens by means of a rotary polyhedron while the specimens were moved in a direction perpendicular to the scanning direction. The exposure was electrically controlled by adjusting the exposure time and the quantity of light from the semiconductor laser.

These specimens 17 to 32 thus exposed were then subjected to color development by means of a paper processing machine with the same processing solutions and in the same processing steps as used in Example 5 until the replenishment rate reached twice the capacity of the color developer tank (running test). These specimens were then evaluated for spectral sensitivity and spectral sensitivity fluctuation during prolonged storage in the same manner as in Example 5. The same results as in Example 5 were obtained. It was thus confirmed that Specimen 29 of the present invention is excellent in many aspects.

In accordance with the present invention, a silver halide photographic material can be obtained which exhibits little sensitivity fluctuation during prolonged storage and a high spectral sensitizability.

In accordance with the present invention, a high sensitivity silver halide photographic material can be obtained which is hardly subject to fog increase and exhibits little sensitivity change even after storage under an elevated temperature and high humidity conditions (prolonged natural ageing).

While the invention has been described in detail and with reference to specific embodiments thereof, it will be apparent to one skilled in the art that various changes and modifications can be made therein without departing from the spirit and scope thereof.

What is claimed is:

1. A silver halide emulsion, which comprises at least one methine dye represented by the general formula (I):

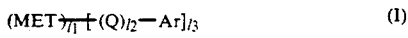
(I)

wherein MET represents an atomic group having a methine dye structure; Q represents a divalent linking group containing at least one carbon, nitrogen, sulfur or oxygen atom; $l_1$ represents an integer 1 or 2; $l_2$ represents an integer 0 or 1, $l_3$ represents an integer from 1 to 4; and Ar represents an aromatic polycyclic group formed of 10 or more ring atoms containing at least one nitrogen atom, with the proviso that said nitrogen atom is in a form such that tautomerism does not produce

2. A silver halide emulsion as claimed in claim 1, wherein the oxidation potential of said methine dye represented by the general formula (I) is 0.60 (V vs SCE) or lower.

3. A silver halide emulsion as claimed in claim 1, which further comprises at least one of compounds represented by the general formulae [IV], [V], [VI] or [VII]:

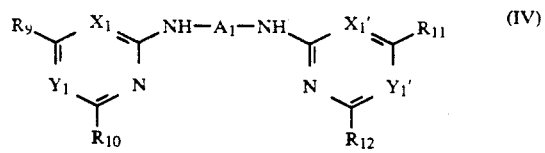
(IV)

wherein $A_1$ represents a divalent aromatic residue; $R_9$, $R_{10}$, $R_{11}$ and $R_{12}$ each represents a hydrogen atom, hydroxyl group, alkyl group, alkoxy group, aryloxy group, halogen atom, heterocyclic nucleus, heterocyclylthio group, arylthio group, amino group, alkylamino group, arylamino group, aralkylamino group, aryl group or mercapto group which may be substituted, with the proviso that at least one of $A_1$, $R_9$, $R_{10}$, $R_{11}$ and $R_{12}$ contains a sulfo group; $X_1$ and $Y_1$, and $X_1'$ and $Y_1'$ each represents —CH= and —N=, respectively; and at least one $X_1$ and $Y_1$ or $X_1'$ and $Y_1'$ represents —N=;

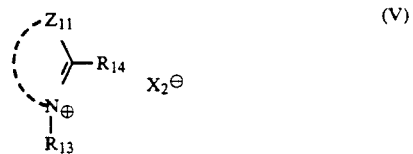
(V)

wherein $Z_{11}$ represents an atomic group required to form a 5- or 6-membered nitrogen-containing heterocyclic group which may be condensed with a benzene or naphthalene ring; $R_{13}$ represents a hydrogen atomn or alkyl group; $R_{14}$ represents a hydrogen atom or alkyl group; and $X_2-$ represents an anion;

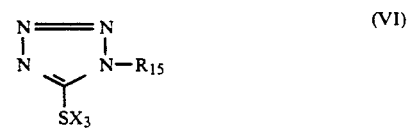
(VI)

wherein $R_{15}$ represents an alkyl group or aryl group; and $X_3$ represents a hydrogen atom, alkaline metal group, ammonium group or precursor;

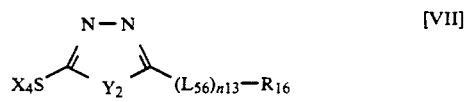
[VII]

wherein $Y_2$ represents an oxygen atom, sulfur atom, =NH or =N—$(L_{57})_{n14}$—$R_{17}$; $L_{56}$ and $L_{57}$ each represents a divalent linking group; $R_{16}$ and $R_{17}$ each represents a hydrogen atom, alkyl group or aryl group; $X_4$ represents a hydrogen atom, alkaline metal atom, ammonium group or precursor; and $n_{13}$ and $n_{14}$ each represents an integer 0 or 1.

4. A silver halide emulsion as claimed in claim 1, wherein MET is a hexamethinemerocyanine or a heptamethinecyanine.

5. A silver halide emulsion as claimed in claim 1, wherein Ar is either Compound (a) or Compound (b):

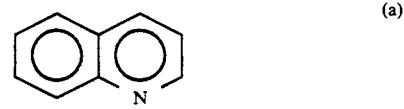
(a)

(b)

6. A silver halide emulsion as claimed in claim 1, wherein MET is a hexamethinemerocyanine compound represented by the following general formula (II):

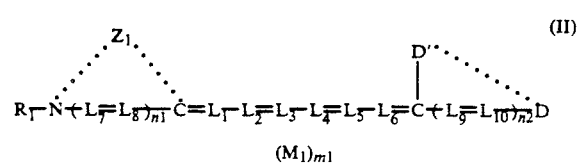
(II)

wherein $Z_1$ represents an atomic group required to form a 5- or 6-membered nitrogen-containing heterocyclic group;

D and D' each represents an atomic group required to form a noncyclic acidic nucleus or D and D' combined together represent an atomic group required to form a cyclic acidic nucleus;

$R_1$ represents an alkyl group;

$L_1$, $L_2$, $L_3$, $L_4$, $L_5$, $L_6$, $L_7$, $L_8$, $L_9$, and $L_{10}$ each represents a methine group or substituted methine group; these methine groups may form a ring with other methine groups or may form a ring with auxochromes;

the suffixes $n_1$, and $n_2$ each represents an integer 0 or 1; and $M_1$ represents a charge-neutralization paired ion, and $m_1$ represents an integer 0 or higher required to neutralize the charge in the molecule.

7. A silver halide emulsion as claimed in claim 1, wherein MET is a heptamethinecyanine compound represented by the following general formula (III):

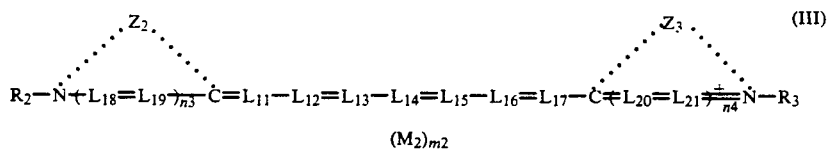

wherein $Z_2$ and $Z_3$ each represents an atomic group required to form a 5- or 6-membered nitrogen-containing heterocyclic group;

$R_2$ and $R_3$ each represents an alkly group;

$L_{11}$, $L_{12}$, $L_{13}$, $L_{14}$, $L_{15}$, $L_{16}$, $L_{17}$, $L_{18}$, $L_{19}$, $L_{20}$, and $L_{21}$ each represents a methine group or substituted methine group; these methine groups may form a ring with other methine groups or may form a ring with auxochromes;

the suffixes $n_3$ and $n_4$ each represents an integer 0 or 1; and $M_2$ represents a charge-neutralization paired ion, and $m_2$ represents an integer 0 or higher required to neutralize the charge in the molecule.

* * * * *